(12) United States Patent
Zhao et al.

(10) Patent No.: US 12,219,289 B2
(45) Date of Patent: Feb. 4, 2025

(54) INTELLIGENT VIDEO RECORDING METHOD AND APPARATUS

(71) Applicant: Huawei Technologies Co., Ltd., Shenzhen (CN)

(72) Inventors: Yang Zhao, Shanghai (CN); Zhiming Pi, Shanghai (CN); Xianjun Chi, Hangzhou (CN); Fang Qiu, Shanghai (CN); Li Liu, Shanghai (CN); Xiao Huang, Shanghai (CN); Xinjiang Sun, Shenzhen (CN); Huidong Dai, Nanjing (CN); Bin Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 17/636,541

(22) PCT Filed: Aug. 11, 2020

(86) PCT No.: PCT/CN2020/108316
§ 371 (c)(1),
(2) Date: Feb. 18, 2022

(87) PCT Pub. No.: WO2021/031915
PCT Pub. Date: Feb. 25, 2021

(65) Prior Publication Data
US 2022/0301351 A1    Sep. 22, 2022

(30) Foreign Application Priority Data

Aug. 22, 2019   (CN) .......................... 201910780567.8

(51) Int. Cl.
G06V 40/20    (2022.01)
G06T 7/215    (2017.01)
(Continued)

(52) U.S. Cl.
CPC ............. *H04N 5/772* (2013.01); *G06T 7/215* (2017.01); *G06V 10/454* (2022.01); *G06V 10/82* (2022.01);
(Continued)

(58) Field of Classification Search
CPC ........ H04N 5/772; H04N 5/915; H04N 23/62; H04N 23/632; H04N 23/667; H04N 5/144;
(Continued)

(56) References Cited

U.S. PATENT DOCUMENTS

2010/0040344 A1    2/2010  Mizuno et al.
2010/0290538 A1*  11/2010  Xu .......................... G06T 13/40
                                                         375/E7.026
(Continued)

FOREIGN PATENT DOCUMENTS

CN    101651783 A    2/2010
CN    102708571 A    10/2012
(Continued)

OTHER PUBLICATIONS

Li Tianqing et al, "Morphing-based Algorithm for Making Slow Motion," Computer Engineering, vol. 1, No. 23, Dec. 2005, with an English Abstract, 3 pages.

*Primary Examiner* — Edward F Urban
*Assistant Examiner* — Jongbong Nah
(74) *Attorney, Agent, or Firm* — Conley Rose, P.C.

(57) ABSTRACT

A video shooting method includes: enabling a camera application on a terminal and in a slow-motion video recording mode of the camera application, when a motion detection function of the camera application is enabled, starting to capture video frames after a video recording instruction input by a user is detected, recording a second video frame set at a first frame rate automatically when a motion of a
(Continued)

human body in a captured first video frame set is a preset motion, and generating a target video, wherein the target video includes a slow-motion video clip, and wherein the slow-motion video clip includes video frames in the second video frame set.

20 Claims, 68 Drawing Sheets

(51) Int. Cl.
| | |
|---|---|
| *G06V 10/44* | (2022.01) |
| *G06V 10/82* | (2022.01) |
| *G06V 20/40* | (2022.01) |
| *H04N 5/232* | (2006.01) |
| *H04N 5/77* | (2006.01) |
| *H04N 5/915* | (2006.01) |
| *H04N 23/62* | (2023.01) |
| *H04N 23/63* | (2023.01) |
| *H04N 23/667* | (2023.01) |

(52) U.S. Cl.
CPC .............. *G06V 20/41* (2022.01); *G06V 40/23* (2022.01); *H04N 5/915* (2013.01); *H04N 23/62* (2023.01); *H04N 23/632* (2023.01); *H04N 23/667* (2023.01)

(58) Field of Classification Search
CPC ........ H04N 5/783; H04N 23/60; H04N 23/61; H04N 23/631; H04N 23/635; H04N 23/80; H04N 5/76; H04N 5/77; H04N 21/8456; G06T 7/215; G06V 10/454; G06V 10/82; G06V 20/41; G06V 40/23
See application file for complete search history.

(56) References Cited

U.S. PATENT DOCUMENTS

| | | | |
|---|---|---|---|
| 2015/0098691 A1* | 4/2015 | Avrahami | G11B 27/28 386/241 |
| 2015/0154452 A1* | 6/2015 | Bentley | G11B 27/022 386/201 |
| 2016/0293209 A1 | 10/2016 | Tang et al. | |
| 2017/0180653 A1* | 6/2017 | Kang | H04N 5/2621 |
| 2018/0007283 A1 | 1/2018 | El Choubassi et al. | |
| 2018/0035075 A1* | 2/2018 | Lee | H04N 23/80 |
| 2018/0213166 A1* | 7/2018 | Kim | H04N 23/951 |
| 2018/0270445 A1 | 9/2018 | Khandelwal et al. | |

FOREIGN PATENT DOCUMENTS

| | | |
|---|---|---|
| CN | 104618656 A | 5/2015 |
| CN | 105493187 A | 4/2016 |
| CN | 107040714 A | 8/2017 |
| CN | 107396019 A | 11/2017 |
| CN | 108347550 A | 7/2018 |
| CN | 108566527 A | 9/2018 |
| CN | 108573246 A | 9/2018 |
| CN | 108875708 A | 11/2018 |
| CN | 109410198 A | 3/2019 |
| CN | 110086905 A | 8/2019 |
| EP | 3188473 A1 | 7/2017 |
| JP | 2005318618 A | 11/2005 |
| KR | 20180013325 A | 2/2018 |
| WO | 2016175003 A1 | 11/2016 |

* cited by examiner

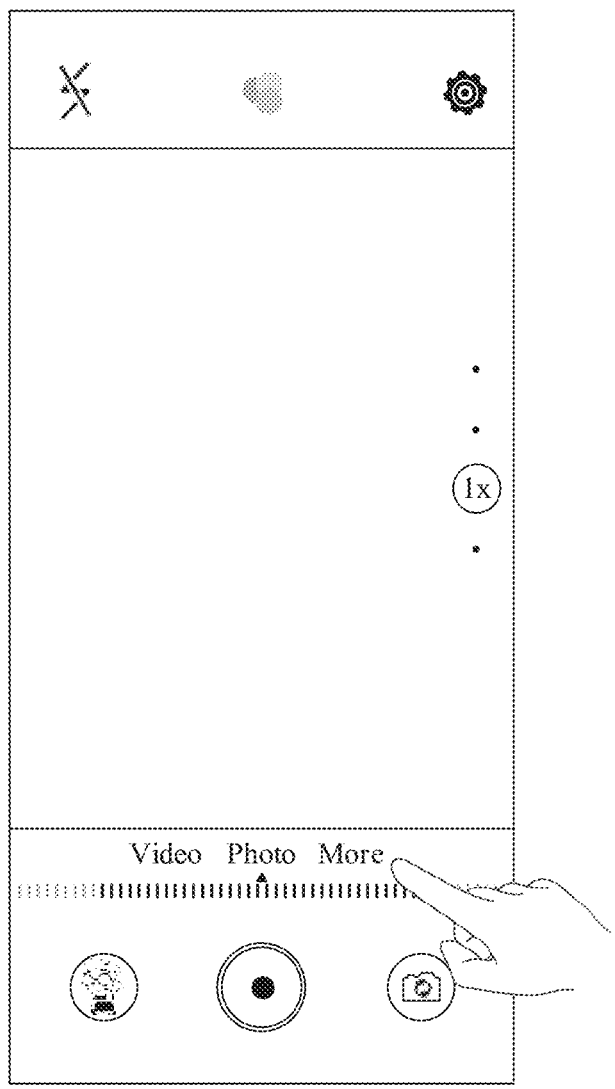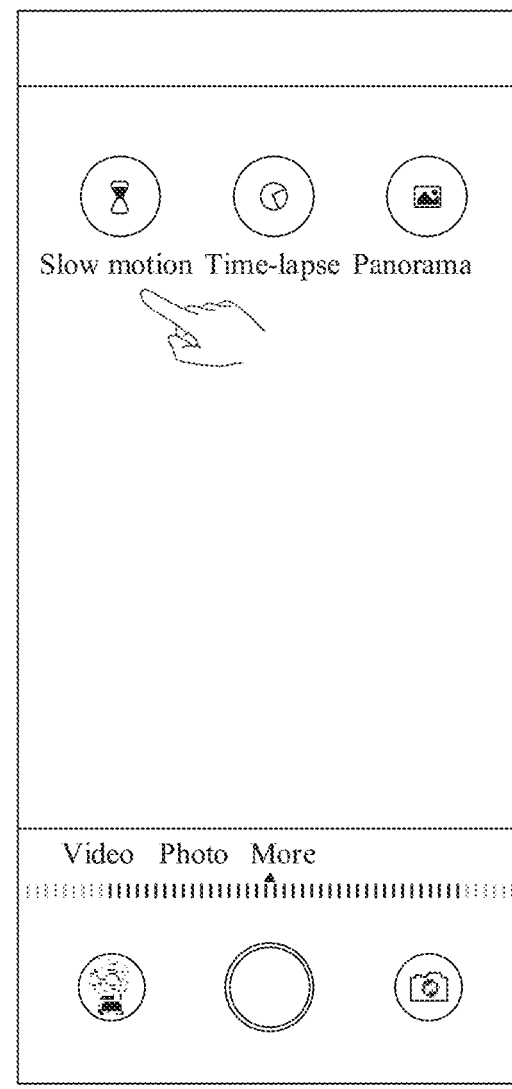
FIG. 6(a)                    FIG. 6(b)

INTELLIGENT VIDEO RECORDING METHOD AND APPARATUS

CROSS-REFERENCE TO RELATED APPLICATIONS

This is a U.S. National Stage of International Patent Application No. PCT/CN2020/108316 filed on Aug. 11, 2020, which claims priority to Chinese Patent Application No. 201910780567.8 filed on Aug. 22, 2019. Both of the aforementioned applications are hereby incorporated by reference in their entireties.

TECHNICAL FIELD

This application relates to the fields of electronic technologies and artificial intelligence, and in particular, to an intelligent video recording method and apparatus.

BACKGROUND

During video playback, if a quantity of frames played back per second by an electronic device such as a mobile phone is less than a quantity of frames recorded per second during video recording, there is a slow-motion playback effect. For example, when a video is played back at a playback frame rate of 30 frames per second (frames per second, fps), if the electronic device records the video at a video recording frame rate of 60 fps, there is a two-times slow-motion playback effect, or if the electronic device records the video at a video recording frame rate of 960 fps, there is a 32-times slow-motion playback effect.

It is found from big data statistics that, people often fail to capture fleeting splendid moments in time during slow-motion recording, and consequently a start point and an end point of recorded slow motions do not satisfy the users' expectation, resulting in a waste of the users' time and even deterioration in the users' shooting experience. In an existing solution in which a terminal device automatically records a slow-motion video, a most common manner is to detect whether there is a sudden change in a detection box on a screen. When a grayscale value change of a corresponding pixel in two adjacent frames of images is greater than a preset threshold, a slow-motion video is recorded automatically to implement an automatic slow-motion function. In a slow-motion recording solution in a conventional technology, accidental triggering occurs extremely easily in a complex scenario due to relatively large impact of a background environment factor. In addition, in a slow-motion video shot by using the conventional technology, when it is detected that an object moves in the detection box, slow-motion video recording is triggered. In this case, it is highly possible that a complete human body motion cannot be captured. As shown in FIG. 1, a current shoaling scenario is a process in which a motion of a user changes from "running" to "jumping". During slow-motion recording performed by using the conventional technology, when the running motion of the user is detected in a detection box, slow-motion recording is triggered. Therefore, it is highly possible that an electronic device cannot capture a complete splendid jumping motion of the user.

SUMMARY

Embodiments of this application provide an intelligent video recording method and apparatus. In a slow-motion recording process, motion recognition can be performed on a shot human body, and when a preset motion of the human body is recognized, slow-motion video recording is automatically triggered. In addition, an electronic device can recognize a start point and an end point of a human body motion, and encode video frames between the start point of the human body motion and the end point of the human body motion to obtain a slow-motion video. The electronic device can recommend different slow-motion recording frame rates based on different human body motion types, so as to improve user experience of slow-motion video recording.

To achieve the foregoing objective, the following technical solutions are used in the embodiments of this application.

According to one aspect, an embodiment of this application provides a video shooting apparatus, including one or more cameras for image or video capturing, a touchscreen including a touch panel and a display, one or more processors, one or more memories, and one or more computer programs. The one or more computer programs are stored in the memory, and the one or more computer programs include instructions. When the instructions are executed by an electronic device, the electronic device is enabled to perform the following steps:

enabling a camera application; and in a slow-motion video recording mode of the camera application, when a motion detection function of the camera application is enabled: starting to capture video frames after a video recording instruction input by a user is detected;

obtaining human skeleton point information of a human body in a video frame based on a captured first video frame;

determining a motion of the human body based on the human skeleton point information in the first video frame;

recording a second video frame set automatically when the motion of the human body is a preset motion; and generating a target video, where the target video includes a slow-motion video clip, and the slow-motion video clip includes some video frames in the second video frame set.

According to another aspect, an embodiment of this application provides a video shooting apparatus, including one or more cameras for image or video capturing, a touchscreen including a touch panel and a display, one or more processors, one or more memories, and one or more computer programs. The one or more computer programs are stored in the memory, and the one or more computer programs include instructions. When the instructions are executed by an electronic device, the electronic device is enabled to perform the following steps:

enabling a camera application; and in a slow-motion video recording mode of the camera application, when a motion detection function of the camera application is enabled: starting to capture video frames after a video recording instruction input by a user is detected; recording a second video frame set at a first frame rate automatically when a motion of a human body in a captured first video frame set is a preset motion, and generating a first target video, where the first target video includes a first slow-motion video clip, and the first slow-motion video clip includes some video frames in the second video frame set. When the motion of the human body is a first preset motion, duration for playback of the first slow-motion video clip at a first playback speed is first duration; and when the motion of the human body is a second preset motion, the duration for playback of the first slow-motion video clip at the first playback speed is second duration. The first preset motion is different from the second preset motion, and the first duration is different from the second duration.

The enabling a camera application may be switching the camera application from a background running mode to a foreground running mode, or may be creating a process for the camera application when no process has been created for the camera application. A first human body and a second human body may be identical or different. The first target video and a second target video are slow-motion videos. A slow-motion video or a low-speed video means: When a playback frame rate of a video is less than a recording frame rate of the video, there is a slow-motion effect, or in other words, the video is a slow-motion video. In the first video frame set, each video frame includes a human body, or some video frames include the human body. In this solution, the electronic device may perform motion recognition on the shot human body, and can automatically trigger slow-motion video recording only when determining, through recognition, that the motion of the human body is the preset motion, so as to capture a fleeting splendid motion of the human body for the user. In this way, user experience of slow-motion video shooting is improved. Different human body motions may correspond to different slow-motion video duration. The electronic device may generate different slow-motion video duration based on different human body motions. For example, when detecting a human body motion, the electronic device triggers slow-motion video recording, and records a 1 s video at 960 fps. When the video is encoded at 30 fps, a 32-times low-speed video is generated. For example, if a motion speed of a shot object in the original video is v0, a speed of the shot object in the generated low-speed video is v0/32, or in other words, a playback speed of the generated low-speed video is ⅟₃₂ of a playback speed of the original video. When the electronic device determines that the human body motion is jumping, a 0.5 s video may be selected from the 1 s video to generate a slow-motion video clip, and a 1 s normal-speed video may be generated both before and after the slow-motion video clip through frame extraction. When the slow-motion video clip is encoded at 30 fps, a finally generated slow-motion video is a video in a form of "1 s normal speed+16 s low speed+1 s normal speed", or in other words, playback duration of a first slow-motion clip is 16 s. When the electronic device determines that the human body motion is basketball shooting, a 0.3 s video may be selected from the 1 s video to generate a slow-motion video clip, and a 1 s normal-speed video may be generated both before and after the slow-motion video clip through frame extraction. When the slow-motion video clip is encoded at 30 fps, a finally generated slow-motion video is a video in a form of "1 s normal speed+0.3×32 s low speed+1 s normal speed=1 s normal speed+9.6 s low speed+1 s normal speed", or in other words, playback duration of a second slow-motion clip is 16 s.

In an implementation, after enabling the camera application, the electronic device displays a slow-motion preview interface, and the slow-motion preview interface includes a motion detection control.

In this solution, after enabling the camera application, the electronic device may display the slow-motion preview interface. In a possible manner, the camera application includes a control for entering the slow-motion preview interface, and the slow-motion preview interface may be displayed after the user taps the control. In a possible implementation, after the camera application is enabled, the slow-motion preview interface may be directly displayed. The slow-motion preview interface includes the motion detection control, and the user may trigger the motion detection control to enable or disable a motion detection function. In a possible implementation, after the electronic device displays the slow-motion preview interface, the motion detection function is in an enabled state by default, and the user may manually disable this function.

In an implementation, the electronic device performs the starting to capture video frames after a video recording instruction input by a user is detected, including: displaying the captured video frames on the slow-motion preview interface.

In this solution, the electronic device starts to capture the video frames after the video recording instruction input by the user is detected, and a video captured by the electronic device may be displayed on the slow-motion preview interface in real time. The "capturing" process means: The electronic device obtains video frames from a preview window in real time, and stores the video frames in a volatile storage medium. This may be understood as that, a process in which the electronic device obtains the video frames from the slow-motion preview interface after the user presses a slow-motion video shooting button and before slow-motion video shooting is triggered is "capturing". In an implementation, the electronic device may perform frame extraction on the captured video frames, and display, in the preview window, video frames obtained after frame extraction.

In an implementation, the electronic device performs the recording a second video frame set at a first frame rate automatically when a motion of a human body in a captured first video frame set is a preset motion, including: obtaining human skeleton point information based on the first video frame set; determining the motion of the human body based on the human skeleton point information in the first video frame set; and recording the second video frame set at the first frame rate automatically when the motion of the human body is the preset motion.

In this solution, the electronic device may perform real-time posture point estimation and motion type recognition on the shot human body by using a preset network inference module in a neural-network processing unit (neural-network processing unit, NPU). The network inference module includes a key point detection model that is used to recognize feature points (including a plurality of joints such as a head, hands, and legs) of a human body posture and that is established in advance based on a convolutional neural network (Convolutional Neural Network, CNN), and a motion detection model used to recognize human body motions (including common motions such as jumping, basketball shooting, and ball kicking). Therefore, the electronic device may estimate, by using the key point detection model, postures of the human body in video frames obtained by a camera in real time, to obtain the human skeleton point information. Then, the electronic device analyzes, by using the motion detection model, the human skeleton point information output from the key point detection model, to obtain a motion type of the human body. When recognizing the motion type of the human body, the electronic device automatically triggers slow-motion video recording. "Recording" means: After triggering slow-motion video shooting, the electronic device stores, in a non-volatile storage medium, the video frames obtained from the slow-motion preview window.

In an implementation, before the electronic device obtains the human skeleton point information based on the first video frame set, the electronic device further performs the following step: determining, based on the first video frame set, to obtain the human skeleton point information when a shot object is a human body.

In this solution, when obtaining the human skeleton point information, the electronic device needs to perform determining on the shot object; and the electronic device obtains the human skeleton point information only when the shot object is a human body.

In an implementation, the electronic device performs the generating a target video, where the first target video includes a first slow-motion video clip, including: generating the first slow-motion video clip in the first target video based on a part of the second video frame; or generating the first slow-motion video clip in the first target video based on a part of the first video frame and a part of the second video frame.

In this solution, after obtaining the second video frame, the electronic device may encode a part of the second video frame to generate the first slow-motion clip. Alternatively, the electronic device may select a part of the second video frame and a part of the first video frame to generate the first slow-motion clip.

The first target video may further include a normal-speed video clip or a high-speed video clip. The normal-speed video clip may be generated by the electronic device by performing frame extraction on the first video frame set or the second video frame set, and a motion speed of the human body in the normal-speed video clip is the same as a real motion speed of the shot human body. A high-speed video or a quick-motion video means: When a playback frame rate of a video is greater than a recording frame rate of the video, there is a fast-motion effect; or in other words, a motion speed of a shot human body in the high-speed video is greater than a real motion speed of the shot human body. For example, a 1 s video is recorded at 960 fps, 960 video frames may be obtained from the 1 s video, and a 1 s normal-speed video may be generated by performing frame extraction on the 960 video frames. The 960 video frames in the 1 s video may be encoded at a frame rate lower than 960 fps, for example, 30 fps. In this case, a 32 s 32-times low-speed video is generated. The 960 video frames in the 1 s video may be encoded at a frame rate greater than 960 fps, for example, 1920 fps, and a 0.5-second two-times high-speed video is generated.

The first target video further includes a normal-speed video clip or a high-speed video clip.

In an implementation, the electronic device further performs the following steps: using a video frame that is in the second video frame set and that includes a start motion of the preset motion as a start frame of the first slow-motion video clip; and using a video frame that is in the second video frame set and that includes an end motion of the preset motion as an end frame of the first slow-motion video clip.

In this solution, after determining, through recognition, that the motion of the shot human body is the first preset motion, the electronic device may recognize a start point and an end point of the first preset motion so that the electronic device encodes video frames including a human body motion type to obtain a slow-motion video, and presents the slow-motion video to the user. This brings relatively good slow-motion video shooting experience to the user.

The preset motion includes rotation, cheering, jumping, basketball shooting, dribbling, split jumping, laying up a shot, skateboarding, and golf hitting. In a possible implementation, the electronic device may perform pre-determining on a motion of the human body based on speeds, displacement, posture changes, and the like of a plurality of joints of the human body such as a head, hands, and legs, and may determine, based on the speeds, the displacement, the posture changes, and the like of the plurality of joints of the human body such as the head, the hands, and the legs, a condition for triggering slow-motion video shooting.

In an implementation, the electronic device performs the generating a first target video, including: when a preset motion of the human body appears in a target video frame in the second video frame set, using the target video frame as a cover of the first target video.

In this solution, the electronic device may use, as an optimal frame, a video frame that is in the second video and in which a motion of the human body is most stretching or the human body jumps highest, and present the video frame to the user as the cover of the slow-motion video. Compared with an existing solution in which the first frame or the last frame of a slow-motion video is used as a cover of the slow-motion video, this solution can bring better visual experience to the user. The preset motion may be understood as a motion that is in the first preset motion and that is corresponding to an optimal video frame recommended by the electronic device to the user, for example, an instant dunking motion or a motion of jumping highest by the human body in a basketball shooting motion. The cover of the slow-motion video may be understood as a video frame that is presented to the user in the slow-motion video in a gallery and that is seen when the slow-motion video is stored in the gallery and the user has not played back the slow-motion video.

In an embodiment, the electronic device further performs the following steps: generating a first target image based on some video frames in the second video frame set, where a motion of the human body in the first target image is the preset motion: and storing the first target image.

In this solution, the electronic device may use, as an optimal frame, the video frame that is in the second video and in which the motion of the human body is most stretching or the human body jumps highest, to generate a target image; and store the target image in the gallery. "Store" may be understood as storing the first target image in a non-volatile storage medium.

In an embodiment, the electronic device further performs the following steps: generating a second target image based on some video frames in the second video frame set, where the second target image includes a motion track of the preset motion; and storing the second target image.

In this solution, the electronic device may separate each of human body images and a background in second video frames from each other to generate a motion track image of the human body, and store the motion track image in the gallery.

In an embodiment, the electronic device further performs the following steps: when the motion detection function of the camera application is enabled: recording a fourth video frame set automatically when a motion of a human body in a captured third video frame set is the preset motion; and generating a second target video, where the second target video includes a second slow-motion video clip, the second slow-motion video clip includes some video frames in the fourth video frame set, and a playback speed of the second slow-motion video clip is automatically determined as a first speed when the motion of the human body is a third preset motion.

The third preset motion may be the same as or different from the first preset motion. In this solution, the electronic device may recommend a more appropriate frame rate to the user based on a motion type of the human body. Different frame rates are recommended based on different motions, and playback speeds of generated slow-motion video clips are different, so as to achieve a better slow-motion effect.

According to another aspect, an embodiment of this application provides an intelligent video recording apparatus, including one or more cameras for image or video capturing, a touchscreen including a touch panel and a display, one or more processors, one or more memories, and one or more computer programs. The one or more computer programs are stored in the memory, and the one or more computer programs include instructions. When the instructions are executed by an electronic device, the electronic device is enabled to perform the following steps: enabling a camera application; and in a slow-motion video recording mode of the camera application, when a motion detection function of the camera application is enabled: starting to capture video frames after a video recording instruction input by a user is detected; recording a second video frame set automatically when a motion of a human body in a captured first video frame set is a preset motion; and generating a target video, where the target video includes a slow-motion video clip, and the slow-motion video clip includes some video frames in the second video frame set. When the motion of the human body is a first preset motion, a playback speed of the slow-motion video clip is automatically determined as a first speed; and when the motion of the human body is a second preset motion, the playback speed of the slow-motion video clip is automatically determined as a second speed. The first preset motion is different from the second preset motion; and the first speed is different from the second speed.

In this solution, when the user does not know which frame rate needs to be selected for recording a slow-motion video, the electronic device may recommend a more appropriate frame rate to the user based on different motions of the human body, so as to bring better slow-motion video recording experience to the user. When an encoding frame rate is fixed, different video playback speeds may be generated by recommending different frame rates. For example, for a jumping motion, if a frame rate recommended by the electronic device is 480 fps, and encoding is performed at 30 fps, a 16-times low-speed video may be generated, or in other words, a playback speed of the slow-motion video is 1/16 of a speed of an original video. For a basketball shooting motion, if a frame rate recommended by the electronic device is 960 fps, and encoding is performed at 30 fps, a 32-times low-speed video may be generated, or in other words, a playback speed of the slow-motion video is 1/32 of a speed of air original video.

In an embodiment, after enabling the camera application, the electronic device displays a slow-motion preview interface, and the slow-motion preview interface includes a motion detection control.

In an implementation, the electronic device performs the starting to capture video frames after a video recording instruction input by a user is detected, including: displaying the captured video frames on the slow-motion preview interface.

In an implementation, the electronic device performs the recording a second video frame set automatically when a motion of a human body in a captured first video frame set is a preset motion, including: obtaining human skeleton point information based on the first video frame set; determining the motion of the human body based on the human skeleton point information in the first video frame set; and recording the second video frame set automatically when the motion of the human body is the preset motion.

In an implementation, before the electronic device obtains the human skeleton point information based on the first video frame set, the electronic device further performs the following step: determining, based on the first video frame set, to obtain the human skeleton point information when a shot object is a human body.

In an implementation, the electronic device performs the generating a target video, where the target video includes a slow-motion video clip, including: generating the slow-motion video clip in the target video based on a part of the second video frame; or generating the slow-motion video clip in the target video based on a part of the first video frame and a part of the second video frame.

The target video further includes a normal-speed video clip or a high-speed video clip.

In an implementation, the electronic device further performs the following steps: using a video frame that is in the second video frame set and that includes a start motion of the preset motion as a start frame of the slow-motion video clip; and using a video frame that is in the second video frame set and that includes an end motion of the preset motion as an end frame of the slow-motion video clip.

The preset motion includes rotation, cheering, jumping, basketball shooting, dribbling, split jumping, laying up a shot, skateboarding, and golf hitting.

In an implementation, the electronic device performs the generating a target video, including: when a preset motion of the human body appears in a target video frame in the second video frame set, using the target video frame as a cover of the target video.

In an embodiment, the electronic device further performs the following step: generating a first target image based on some video frames in the second video frame set, where a motion of the human body in the first target image is the preset motion; and storing the first target image.

In an embodiment, the electronic device further performs the following step: generating a second target image based on some video frames in the second video frame set, where the second target image includes a motion track of the preset motion; and storing the second target image.

According to another aspect, an embodiment of this application provides a video shooting method, including: enabling a camera application; and in a slow-motion video recording mode of the camera application, when a motion detection function of the camera application is enabled: starting to capture video frames after a video recording instruction input by a user is detected; recording a second video frame set at a first frame rate automatically when a motion of a first human body in a captured first video frame set is a first preset motion; generating a first target video, where the first target video includes a first slow-motion video clip, the first slow-motion video clip includes some video frames in the second video frame set, and duration for playback of the first slow-motion video clip at a first playback speed is first duration;

starting to capture video frames after a video recording instruction input by the user is detected; recording a fourth video frame set at the first frame rate automatically when a motion of a second human body in a captured third video frame set is a second preset motion; and generating a second target video, where the second target video includes a second slow-motion video clip, and the second slow-motion video clip includes some video frames in the fourth video frame set; duration for playback of the second slow-motion video clip at the first playback speed is second duration; the first preset motion is different from the second preset motion; and the first duration is different from the second duration.

In an embodiment, after enabling the camera application, the method may further include: displaying a slow-motion preview interface, where the slow-motion preview interface includes a motion detection control.

In an implementation, the starting to capture video frames after a video recording instruction input by a user is detected includes: displaying the captured video frames on the slow-motion preview interface.

In an implementation, the recording a second video frame set at a first frame rate automatically when a motion of a human body in a captured first video frame set is a first preset motion includes: obtaining human skeleton point information based on the first video frame set; determining the motion of the human body based on the human skeleton point information in the first video frame set; and recording the second video frame set at the first frame rate automatically when the motion of the human body is the preset motion.

In an implementation, before obtaining the human skeleton point information based on the first video frame set, an electronic device may determine, based on the first video frame set, to obtain the human skeleton point information when a shot object is a human body.

In an implementation, the generating a target video, where the first target video includes a first slow-motion video clip includes: generating the first slow-motion video clip in the first target video based on a part of the second video frame; or generating the first slow-motion video clip in the first target video based on a part of the first video frame and a part of the second video frame.

The first target video further includes a normal-speed video clip or a high-speed video clip.

In an implementation, the first preset motion includes a start motion and an end motion, and the electronic device uses a video frame that is in the second video frame set and that includes the start motion as a start frame of the first slow-motion video clip, and uses a video frame that is in the second video frame set and that includes the end motion as an end frame of the first slow-motion video clip.

The preset motion includes rotation, cheering, jumping, basketball shooting, dribbling, split jumping, laying up a shot, skateboarding, and golf hitting.

In an implementation, the generating a first target video includes: when a preset motion of the human body appears in a target video frame in the second video frame set, using the target video frame as a cover of the first target video.

In an embodiment, the electronic device generates a first target image based on some video frames in the second video frame set, where a motion of the human body in the first target image is the preset motion; and stores the first target image.

In an embodiment, the electronic device generates a second target image based on some video flames in the second video frame set, where the second target image includes a motion track of the preset motion; and stores the second target image.

In an embodiment, the method further includes: when the motion detection function is enabled: starting to capture video frames after a video recording instruction input by the user is detected; recording a sixth video frame set automatically when a motion of a third human body in a captured fifth video frame set is a third preset motion; and generating a third target video, where the third target video includes a third slow-motion video clip, the third slow-motion video clip includes some video frames in the sixth video frame set, and a playback speed of the third slow-motion video clip is automatically determined as a first speed.

According to another aspect, an embodiment of this application provides a video shooting method, including: enabling a camera application; and in a slow-motion video recording mode of the camera application, when a motion detection function of the camera application is enabled: starting to capture video frames after a video recording instruction input by a user is detected; recording a second video frame set automatically when a motion of a first human body in a captured first video frame set is a first preset motion; generating a first target video, where the first target video includes a first slow-motion video clip, and the first slow-motion video clip includes some video frames in the second video frame set; and a playback speed of the first slow-motion video clip is automatically determined as a first speed;

starting to capture video flumes after a video recording instruction input by the user is detected; recording a fourth video frame set automatically when a motion of a second human body in a captured third video frame set is a second preset motion; and generating a second target video, where the second target video includes a second slow-motion video clip, and the second slow-motion video clip includes some video frames in the fourth video frame set; a playback speed of the second slow-motion video clip is automatically determined as a second speed; the first preset motion is different from the second preset motion; and the first speed is different from the second speed.

In an embodiment, after the enabling a camera application, the method may further include: displaying a slow-motion preview interface, and the slow-motion preview interface includes a motion detection control.

In an implementation, the starting to capture video frames after a video recording instruction input by a user is detected includes: displaying the captured video frames on the slow-motion preview interface.

In an implementation, the recording a second video frame set at a first frame rate automatically when a motion of a human body in a captured first video frame set is a first preset motion includes: obtaining human skeleton point information based on the first video frame set; determining the motion of the human body based on the human skeleton point information in the first video frame set; and recording the second video frame set at the first frame rate automatically when the motion of the human body is the preset motion.

In an implementation, before obtaining the human skeleton point information based on the first video frame set, an electronic device may determine, based on the first video frame set, to obtain the human skeleton point information when a shot object is a human body.

In an implementation, the generating a target video, where the first target video includes a first slow-motion video clip includes: generating the first slow-motion video clip in the first target video based on a part of the second video frame; or generating the first slow-motion video clip in the first target video based on a part of the first video frame and a part of the second video frame.

The first target video further includes a normal-speed video clip or a high-speed video clip.

In an implementation, the first preset motion includes a start motion and an end motion, and the electronic device uses a video frame that is in the second video frame set and that includes the start motion as a start frame of the first slow-motion video clip, and uses a video frame that is in the second video frame set and that includes the end motion as an end frame of the first slow-motion video clip.

The preset motion includes rotation, cheering, jumping, basketball shooting, dribbling, split jumping, laying up a shot, skateboarding, and golf hitting.

In an implementation, the generating a first target video includes: when a preset motion of the human body appears in a target video frame in the second video frame set, using the target video frame as a cover of the first target video.

In an embodiment, the electronic device generates a first target image based on some video frames in the second video frame set, where a motion of the human body in the first target image is the preset motion; and stores the first target image.

In an embodiment, the electronic device generates a second target image based on some video frames in the second video frame set, where the second target image includes a motion track of the preset motion; and stores the second target image.

According to another aspect, an embodiment of this application provides a computer storage medium, including computer instructions. When the computer instructions are run on an electronic device, the electronic device is enabled to perform the video shooting method in any possible design of any one of the foregoing aspects.

According to another aspect, an embodiment of this application provides a computer program product. When the computer program product is run on a computer, the computer is enabled to perform the video shooting method in any possible design of any one of the foregoing aspects.

BRIEF DESCRIPTION OF DRAWINGS

FIG. 6(a) and FIG. 6(b) are a schematic diagram of another group of display interfaces according to an embodiment of this application;

DESCRIPTION OF EMBODIMENTS

For ease of understanding, example descriptions of some concepts related to the embodiments of this application are provided for reference. Details are described as follows:

Frame rate (Frame rate): a frequency (rate) at which bitmap images in a unit of frame continuously appear on a display.

FPS (Frames Per Second): a quantity of frames displayed per second (frames per second). A larger quantity of frames per second indicates that a picture displayed by an electronic device is smoother.

Video frame: Using 960 fps as an example, if the electronic device may continuously capture 960 frames of shot pictures in a shooting time of one second, each shot picture may be referred to as one video frame.

Video recording frame rate/Recording frame rate/Shooting frame rate: a quantity of video frames recorded/shot by the electronic device in a unit time.

Playback frame rate: a quantity of video frames played back by the electronic device per second during video playback.

Display frame rate: a quantity of video frames displayed on a preview interface of a camera application of the electronic device in a unit time. When the display frame rate of the electronic device is greater than 16 fps, it may be considered that pictures seen by human eyes are coherent.

The following describes technical solutions in the embodiments of this application with reference to accompanying drawings in the embodiments of this application. In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

A recording method provided in the embodiments of this application may be applied to any electronic device that can perform video recording by using a camera, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, and a personal digital assistant (personal digital assistant, PDA). This is not limited in the embodiments of this application.

Figure 1:
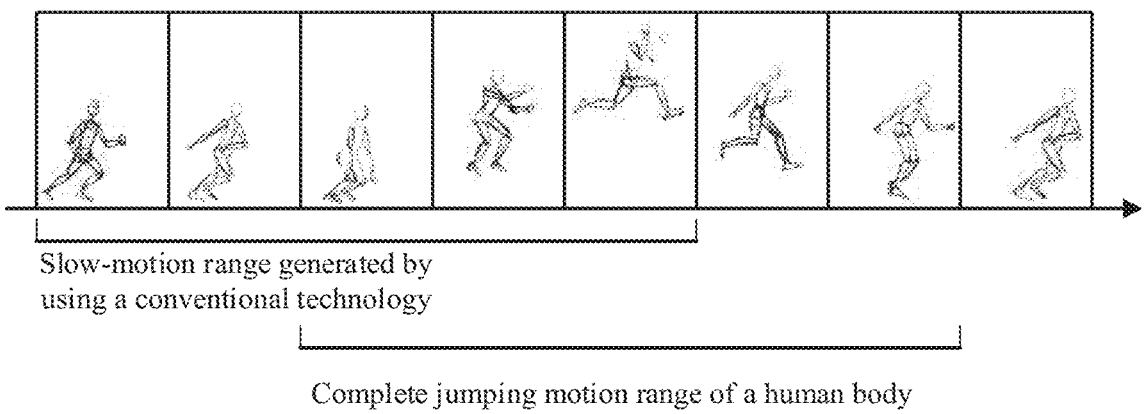
FIG. 1 is a schematic diagram of recording a slow-motion video of a motion of a human body in a conventional technology.
Figure 2:
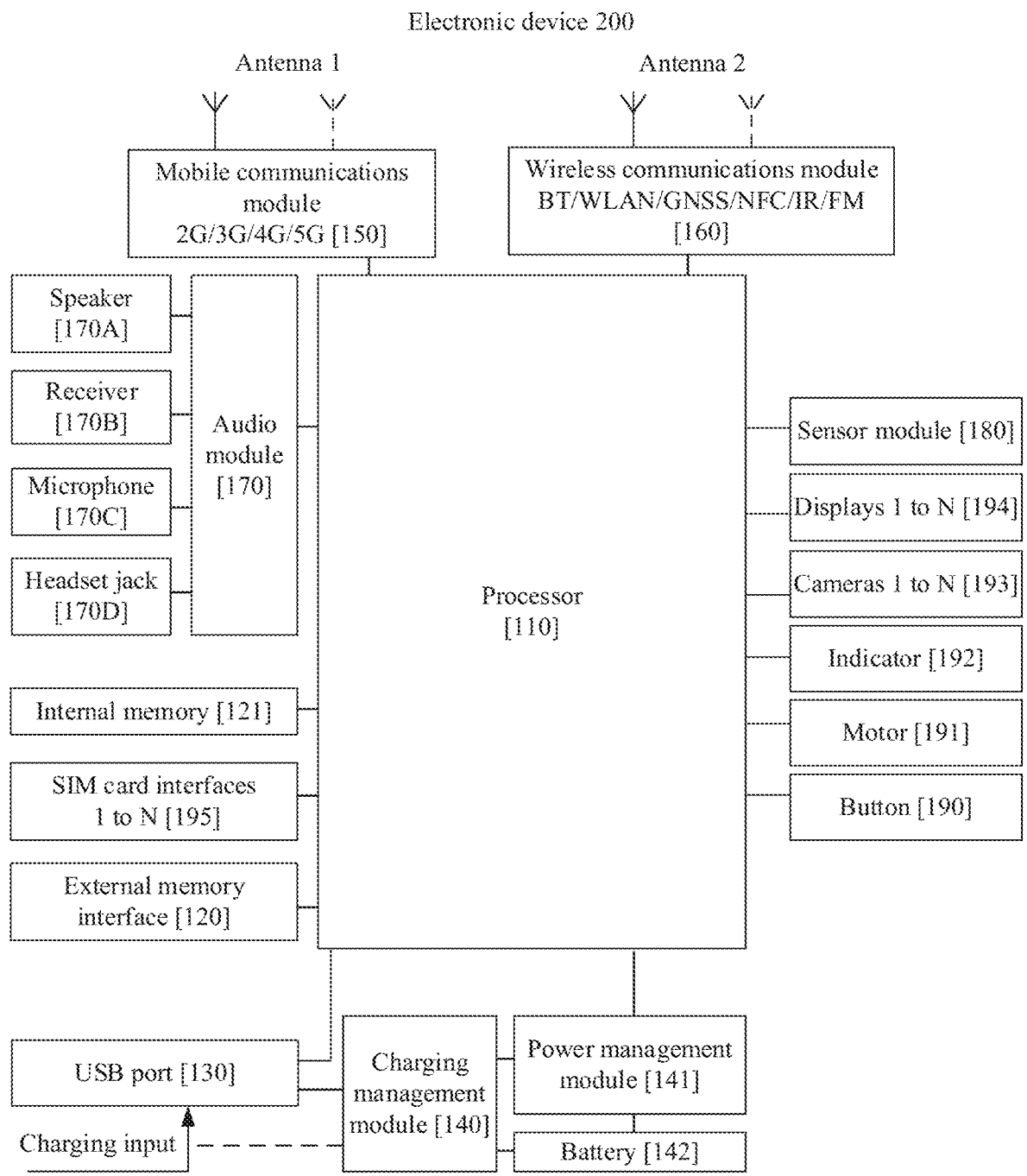
FIG. 2 is a schematic diagram of a hardware structure of an electronic device according to an embodiment of this application.

For example, FIG. 2 is a schematic diagram of a structure of an electronic device 200.

The electronic device 200 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

It can be understood that the structure shown in this embodiment of the present invention does not constitute a specific limitation on the electronic device 100. In other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, DART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) port, and/or the like.

The charging management module 140 is configured to receive a charging input from a charger. The charger may be a wireless charger or a wired charger. In some embodiments in which wired charging is used, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 may receive an input of the battery 142 and/or an input of the charging management module 140, and supply power to the processor 110, the internal memory 121, the display 194, the camera 193, the wireless communications module 160, and the like.

The power management module 141 may be configured to monitor performance parameters such as a battery capacity, a battery cycle count, a battery charging voltage, a battery discharge voltage, and a battery health status (for example, electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include one or more filters, one or more switches, one or more power amplifiers, one or more low noise amplifiers (low noise amplifier, LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 and at least some modules in the processor 110 may be disposed in a same device.

The wireless communications module 160 may provide a solution for wireless communications including a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like applied to the electronic device 100. The wireless communications module 160 may be one or more components integrated with one or more communication processing modules. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

Figure 3:
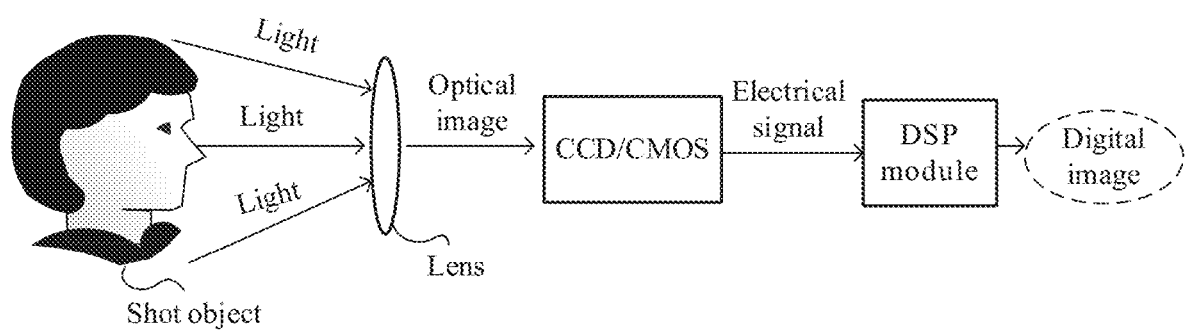
FIG. 3 is a schematic diagram of a shooting principle according to an embodiment of this application.

The camera 193 is configured to capture a static image or a video. In some embodiments, the mobile phone 100 may include one or N cameras, where N is a positive integer greater than 1. The camera 193 may be a front-facing camera or a rear-facing camera. As shown in FIG. 3, the camera 193 usually includes a lens (lens) and a photosensitive element (sensor). The photosensitive element may be any photosensitive element such as a CCD (charge-coupled device, charge-coupled device) or a CMOS (complementary metal-oxide-semiconductor, complementary metal-oxide-semiconductor).

Still referring to FIG. 3, in a photo shooting process, an optical image may be generated after reflected light of a shot object passes through a lens, and the optical image is projected onto a photosensitive element; the photosensitive element converts the received optical signal into an electrical signal; and then the camera 193 sends the obtained electrical signal to a DSP (Digital Signal Processing, digital signal processing) module for digital signal processing to finally obtain one frame of digital image.

Similarly, in a video shooting process, the camera 193 may continuously shoot a plurality of frames of digital images at a specific frame rate, and the plurality of frames of continuous digital images may form a video after being encoded. Due to a special physiological structure of human eyes, when a frame rate of pictures seen by the human eyes is higher than 16 frames per second (fps), it may be considered that the pictures seen by the human eyes are coherent. This phenomenon may be referred to as visual retention. To ensure continuity of viewing a video by a user, during shooting of a video, a mobile phone may capture all flames of image at a frame rate higher than 16 frames per second (for example, 30 fps or 60 fps). In this way, when watching the video shot by the mobile phone, the user senses that pictures in the video are coherent.

The image or video shot by the camera 193 may be output on the mobile phone 100 by using the display 194, or the digital image may be stored in the internal memory 121 (or the external memory 120). This is not limited in this embodiment of this application.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, to enable the electronic device 100 to perform a method for intelligently recommending a contact provided in some embodiments of this application, various function applications, data processing, and the like. The internal memory 121 may include a program storage area and a data storage area. The program storage area may store an operating system. The program storage area may further store one or more applications (for example, Gallery and Contacts), and the like. The data storage area may store data (for example, a photo and a contact) created during use of the electronic device 101, and the like. In addition, the internal memory 121 may include a high-speed random access memory, and may further include a non-volatile memory, such as one or more disk storage components, a flash memory component, or a universal flash storage (universal flash storage, UFS). In some other embodiments, the processor 110 runs the instructions stored in the internal memory 121 and/or an instruction stored in a memory disposed in the processor, to enable the electronic device 100 to perform a method for intelligently recommending a number provided in the embodiments of this application, various function applications, and data processing.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode audio signals. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be configured to listen to music or answer a call in a hands-free mode over the speaker 170A.

The receiver 170B, also referred to as an "earpiece", is configured to convert an audio electrical signal into a sound signal. When a call is answered or a voice message is listened to by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound by moving a human mouth close to the microphone 170C to input a sound signal to the microphone 170C. One or more microphones 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, or the like. This is not limited in this embodiment of this application.

Certainly, the electronic device 100 provided in this embodiment of this application may further include one or more devices of a button 190, a motor 191, an indicator 192, a SIM card interface 195, and the like. This is not limited in this embodiment of this application.

For ease of understanding the following embodiments clearly, a brief description of a related technology is given first.

Figure 4:
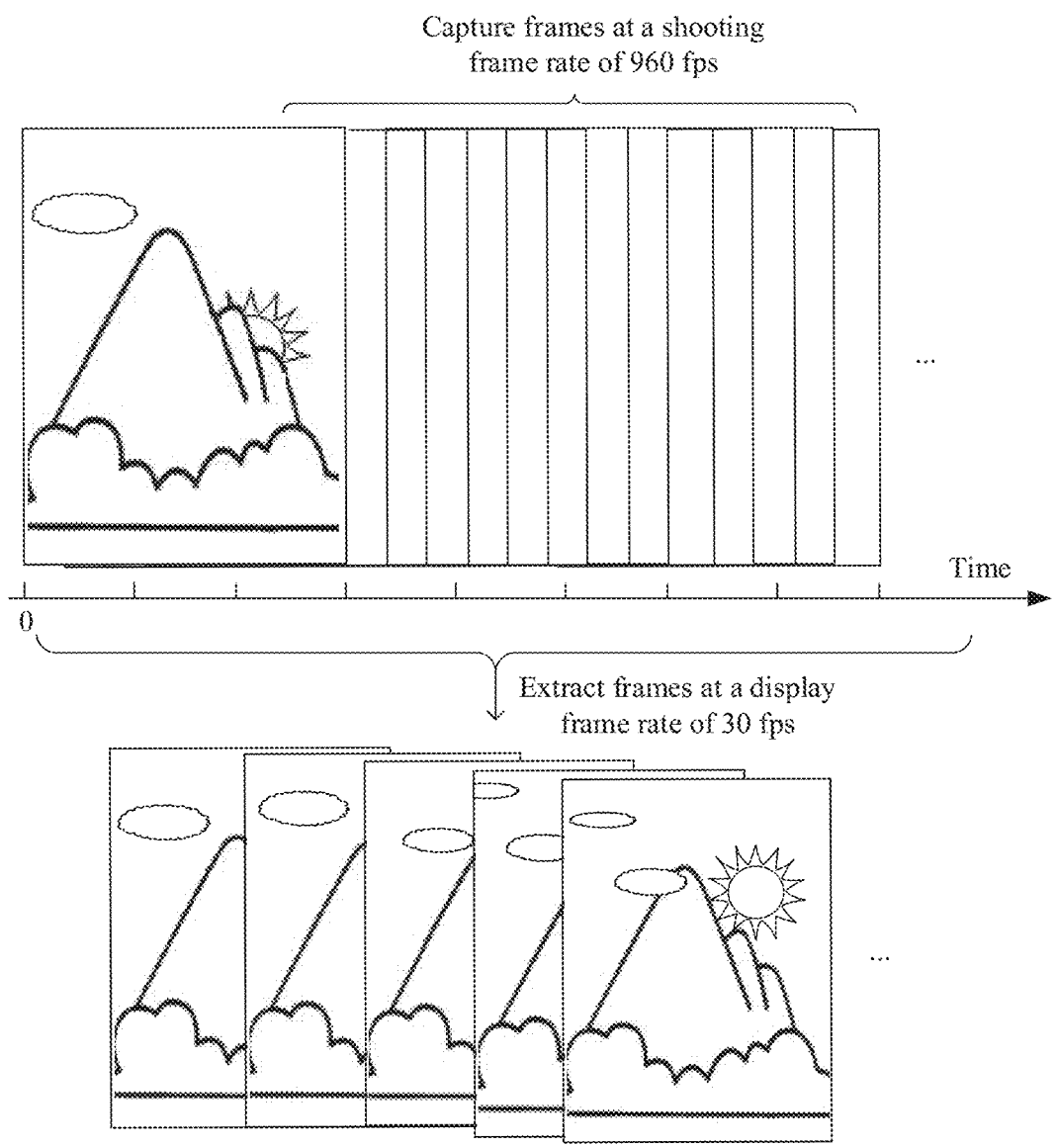
FIG. 4 is a schematic diagram of a principle for recording a slow-motion video according to an embodiment of this application.

Slow-motion shooting, also referred to as high-frame-rate shooting, can implement slow playback of content of shot pictures. Usually, a shooting frame rate used by an electronic device for slow-motion shooting is relatively high. For example, after slow-motion shooting is enabled, as shown in FIG. 4, a user may select a shooting frame rate of 960 fps to record a short video. In this case, an electronic device may capture all frames of shot pictures at the shooting frame rate of 960 fps. In other words, the electronic device may continuously capture 960 frames of short pictures in a shooting time of one second. In addition, during the one-second shooting process, the user may preview in real time on a preview interface of a camera application, the pictures that are being shot. For example, still referring to FIG. 4, the electronic device may extract frames at a display frame rate of 30 fps and display the shot pictures. In other words, the electronic device may extract 30 frames of shot pictures from the captured 960 frames of shot pictures per second and display the extracted pictures in a framing window of a shooting interface, so as to ensure that pictures seen by the user in the framing window during shooting of a slow-motion video are coherent.

Subsequently, during playback of the one-second slow-motion video, the electronic device may encode the 960 frames of shot pictures at an encoding rate lower than 960 fps. For example, the electronic device may encode the captured 960 frames of shot pictures at an encoding rate of 30 fps. In this case, original one-second video content may be slowly played back as a 32-second (that is, 960 fps/32×) video clip, that is, a 32-times (32×) slow-motion video, to implement a slow-motion playback function.

For another example, the user may select a shooting frame rate of 240 fps to record a short video. In this case, the electronic device may capture all frames of shot pictures at the shooting frame rate of 240 fps. In other words, the electronic device may continuously capture 240 frames of short pictures in a shooting time of one second. During playback of the one-second slow-motion video, the electronic device may encode the 240 frames of shot pictures at an encoding rate lower than 240 fps. For example, the electronic device may encode the captured 240 frames of shot pictures at an encoding rate of 30 fps. In this case, original one-second video content may be slowly played back as an 8-second (that is, 240 fps/8×) video, that is, an 8-times (8×) slow-motion video clip, to implement a slow-motion playback function.

Figure 5A:
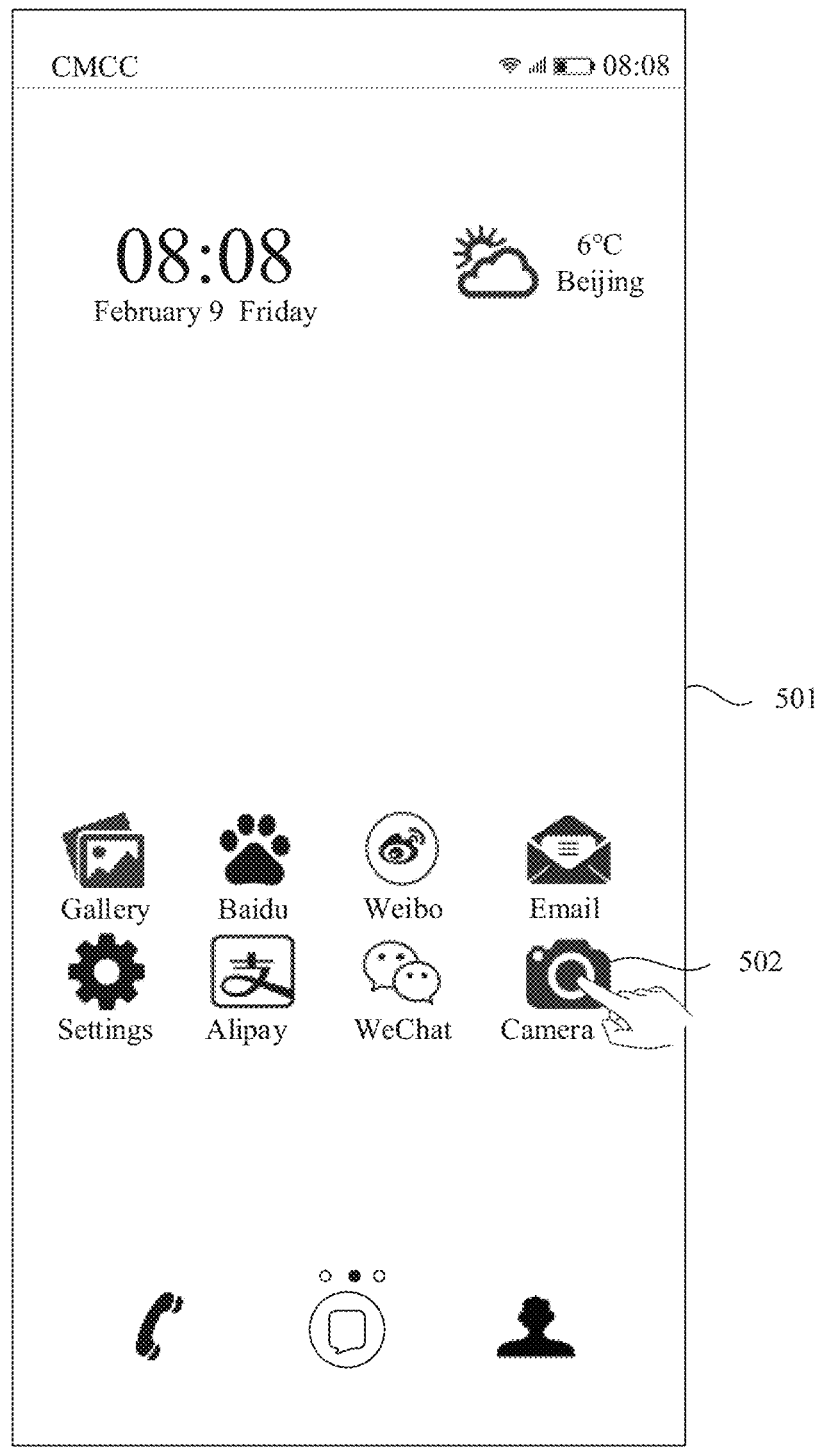
FIG. 5(a) and FIG. 5(b) are a schematic diagram of a group of display interfaces according to an embodiment of this application.
Figure 5B:
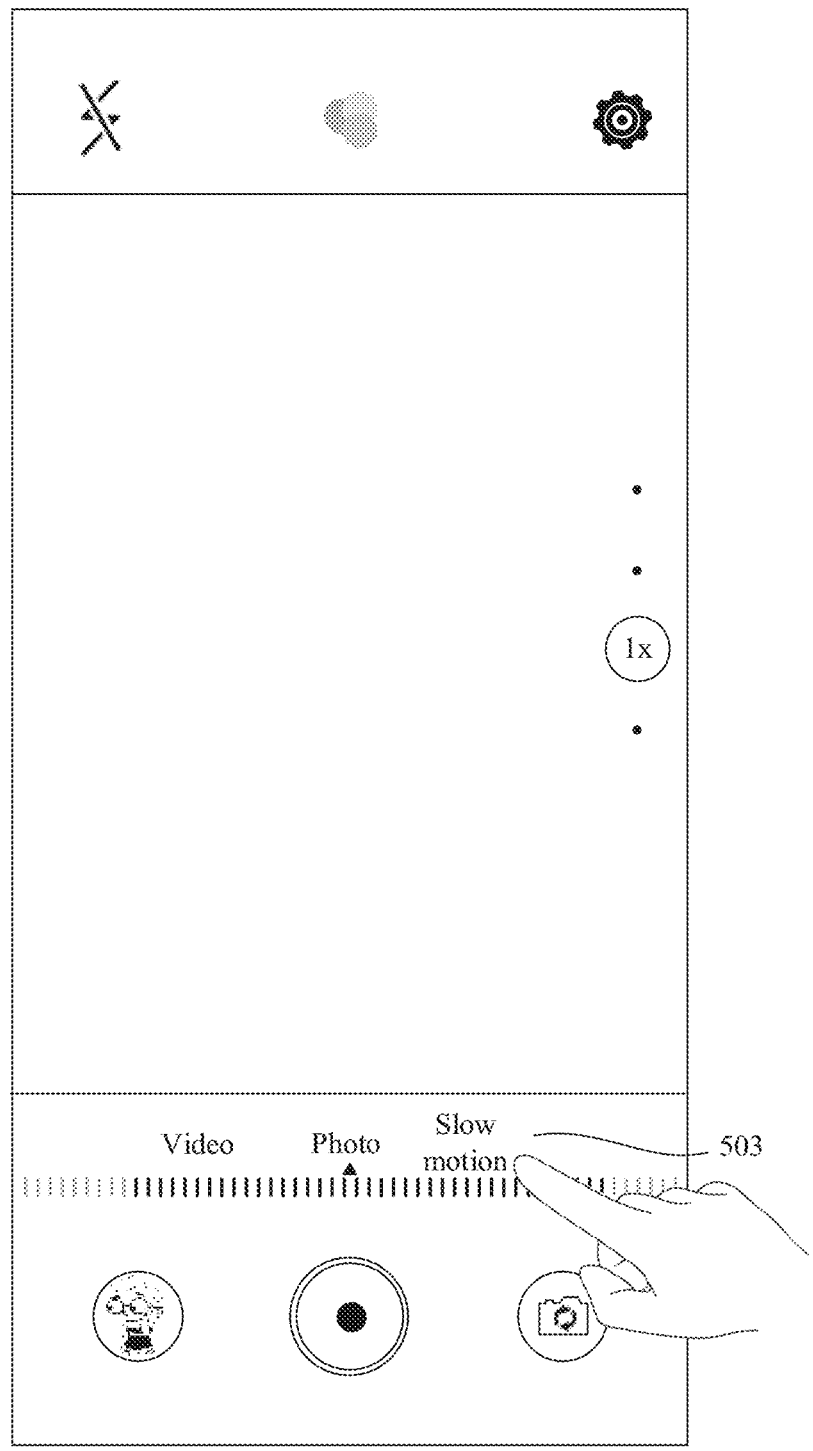

For example, FIG. 5(a) and FIG. 5(b) show a graphical user interface (graphical user interface, GUI) of a mobile phone. The GUI is a home screen 501 of the mobile phone. Referring to FIG. 5(a), after detecting an operation of tapping an icon 502 of a camera application (application, APP) on the home screen 501 by a user, the mobile phone may enable the camera application, and display another GUI shown in FIG. 5(b). The GUI may be referred to as a camera preview interface. The preview interface includes a video recording control for entering a video recording mode, and further includes a slow-motion control 503 for entering a slow-motion (slow-motion) video recording mode.

It should be noted that, the user may instruct, in a plurality of manners, the electronic device to enable the camera application. For example, the user may tap the camera icon to instruct the electronic device to enable the camera application, the user may use a voice mode to instruct the electronic device to enable the camera application, or the user may draw a "C"-shaped track on a screen in a screen-off state to instruct the electronic device to enable the camera application. A manner of triggering the electronic device to enable the camera application is not limited in this embodiment of this application.

For another example, after detecting an operation of tapping the icon of the camera application on the home screen by the user, the mobile phone enables the camera application, and may alternatively display a GUI shown in FIG. 6(a) and FIG. 6(b). The user may tap more controls to enter an interface shown in FIG. 6(b), and tap a slow-motion control to enter a slow-motion video recording mode.

For another example, if the electronic device may directly enter a slow-motion video recording mode after enabling the camera application (for example, the electronic device is in the slow-motion video recording mode by default after enabling the camera application, or the electronic device is in the slow-motion video recording mode when the user uses the camera application last time), the electronic device directly displays the slow-motion preview interface.

Figures 7A, 7B:
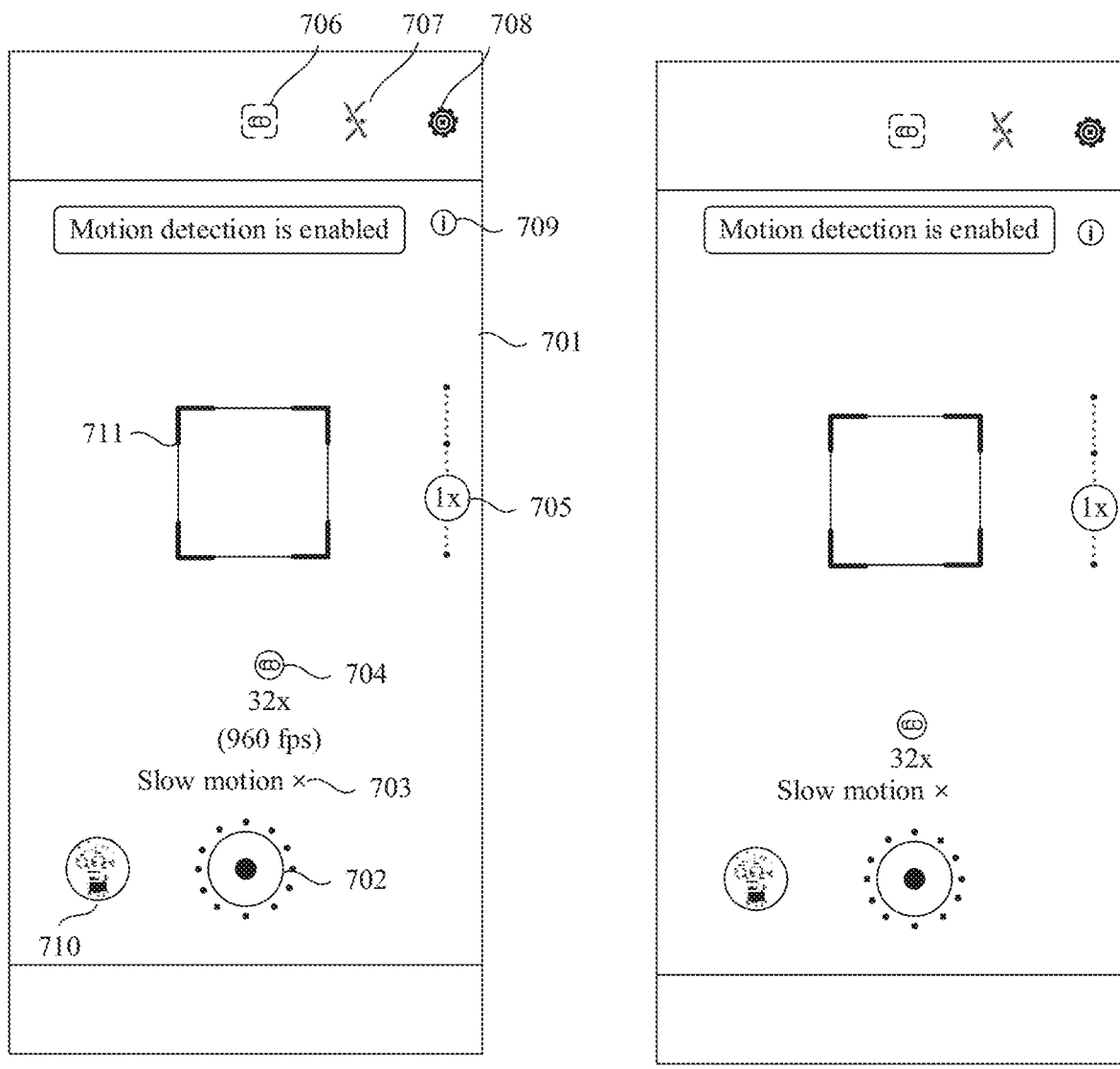
FIG. 7(a) and FIG. 7(b) are a schematic diagram of another group of display interfaces according to an embodiment of this application.

For example, after entering a slow-motion video recording mode, the electronic device displays a GUI shown in FIG. 7(a). In this case, the electronic device displays a slow-motion preview interface 701. The slow-motion preview interface 701 includes a recording control 702 for enabling slow-motion video recording, a control 703 for exiting the slow-motion video recording mode, a control 704 for switching a slow-motion playback speed (speed), a control 705 for zooming of a camera, and a motion detection control 706 for enabling/disabling a motion detection function. In this case, the motion detection control 706 is in an enabled state by default. The slow-motion preview interface 701 further includes a control 707 for enabling/disabling a flash, a control 708 for enabling setting, a control 709 for displaying prompt information, and a control 710 for associating with a gallery application. The slow-motion preview interface may further include a detection box 711. The user may perform dragging on the entire preview interface to change a location of the detection box or change a size of the detection box. For example, the slow-motion preview interface may not include the detection box 711.

It should be noted that, the motion detection control 706 is used for enabling/disabling motion detection. When the motion detection function is enabled (Motion detection on), after the user taps the slow-motion video recording control, the electronic device does not immediately trigger slow-motion video recording, but automatically triggers slow-motion video recording only when the electronic device detects that a motion of a shot object in the preview interface satisfies a preset triggering condition. When the motion detection function is disabled, slow-motion video recording is triggered after the user manually taps the shooting control 702.

In a possible design, after displaying a slow-motion preview interface, the electronic device displays a GUI shown in FIG. 7(b). In this case, the GUI may not include a prompt "(960 frames per second)", but display only a frame rate multiple, for example, "32×".

Figure 8A:
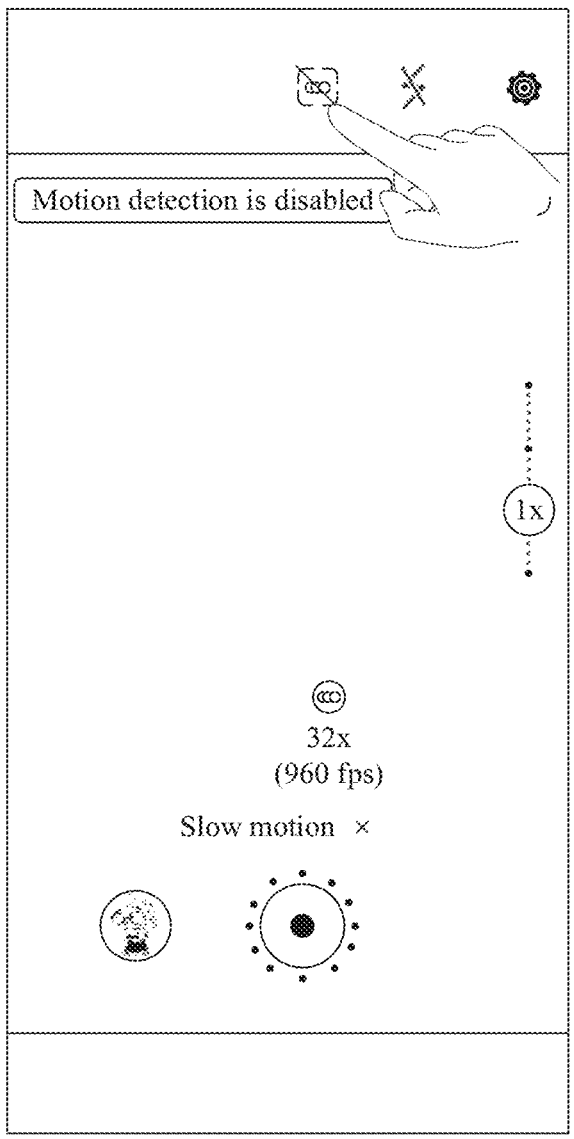
FIG. 8(a) and FIG. 8(b) are a schematic diagram of another group of display interfaces according to an embodiment of this application.
Figure 8B:
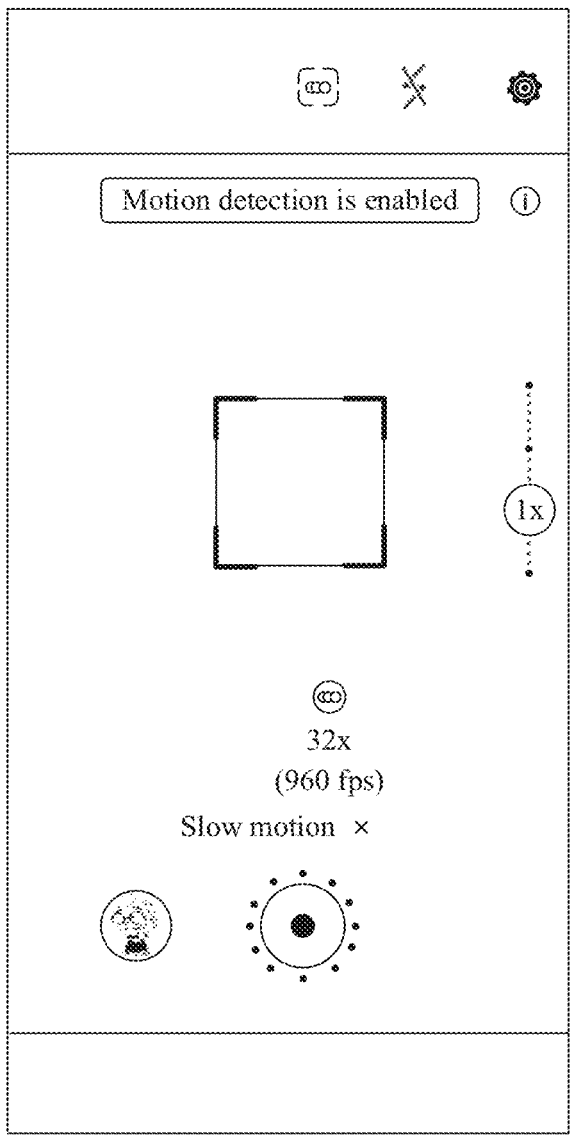

In a possible implementation, after the electronic device displays a slow-motion preview interface, the motion detection control may be in a disabled state by default. As shown in FIG. 8(a), the user may manually enable the motion detection function, and a GUI shown in FIG. 8(b) is displayed.

In a possible implementation, after the electronic device displays a slow-motion preview interface, the slow-motion preview interface may alternatively not include a motion detection control. In this case, the electronic device enables the motion detection function by default, and enters an intelligent automatic slow-motion video recording mode. The user can disable this function in settings or by using another mobile phone control.

Figure 9A:
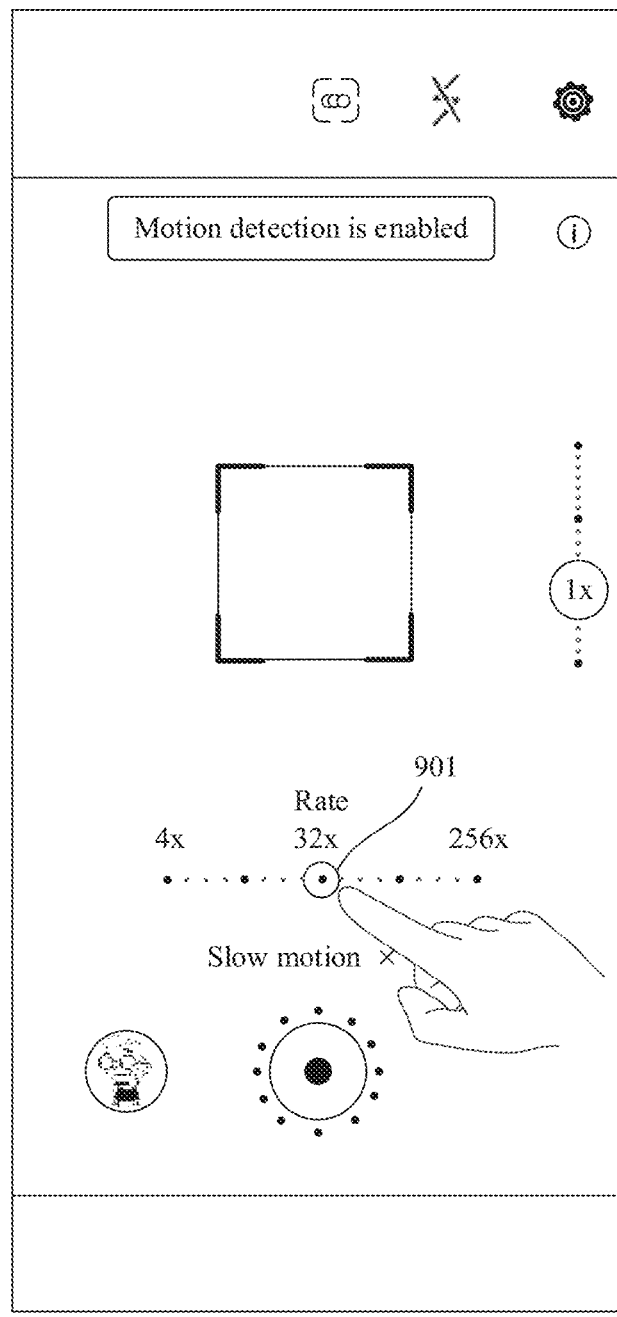
FIG. 9(a), FIG. 9(b), and FIG. 9(c) are a diagram of a proportional relationship between a recording time and a playback time of a slow-motion video according to an embodiment of this application.
Figure 9B:
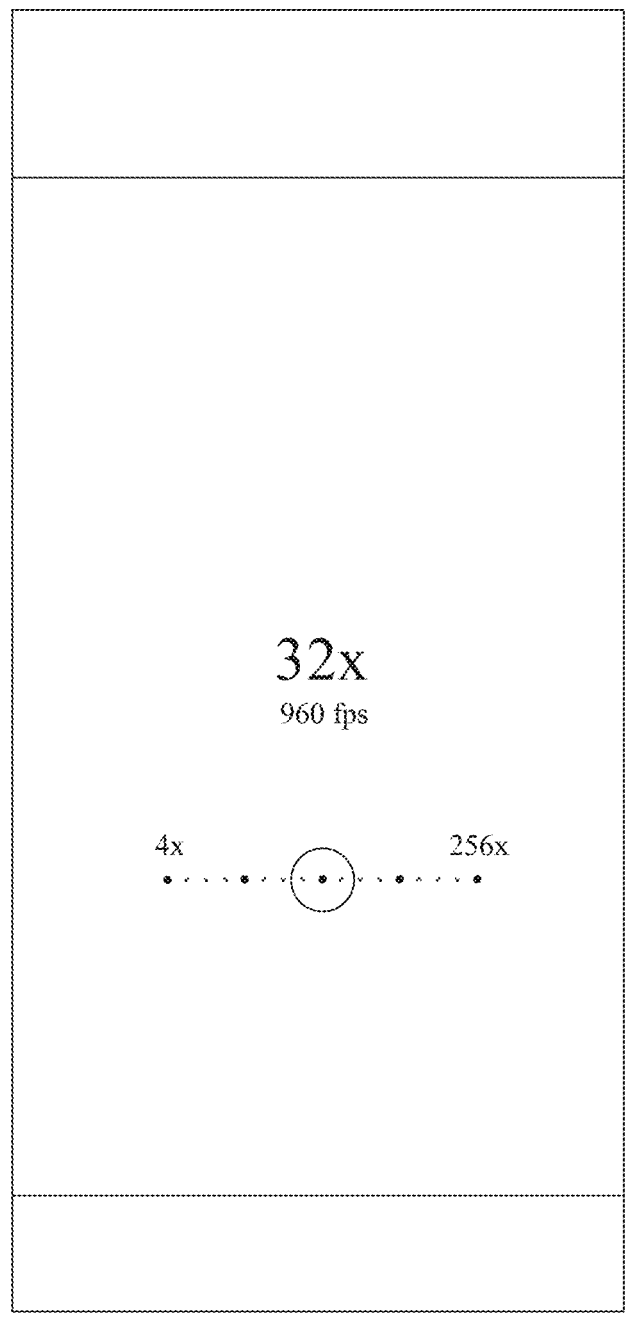
Figure 9C:
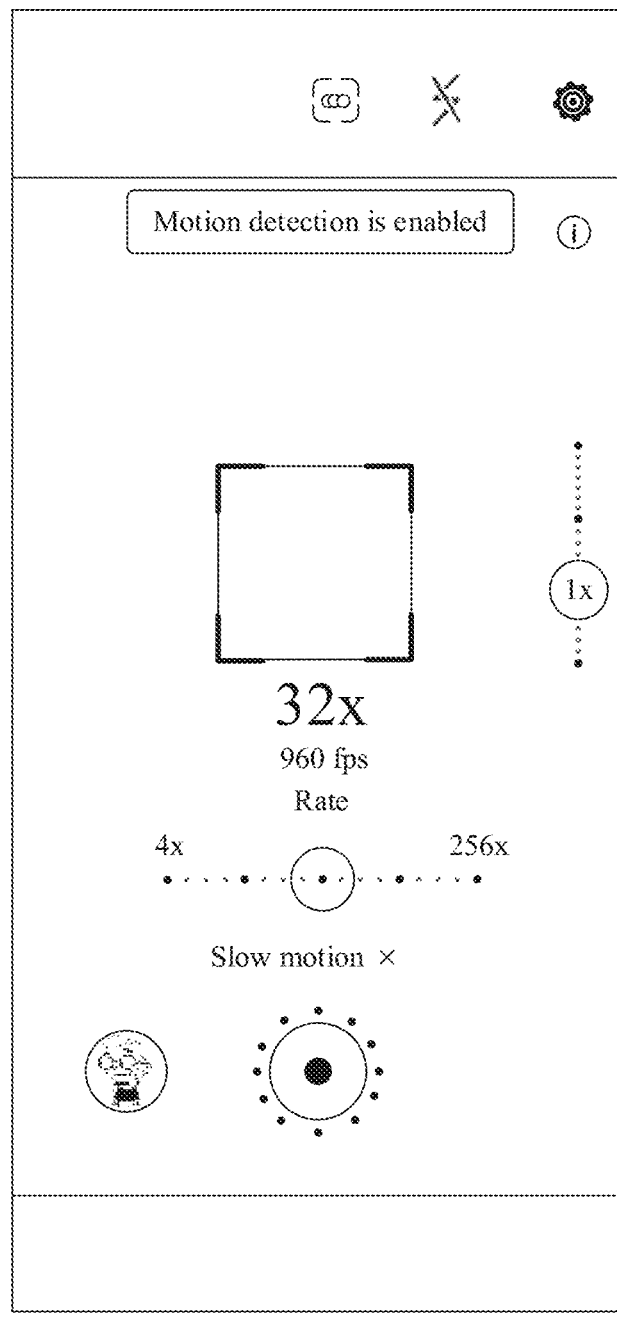

In an embodiment, the user may select a frame rate for slow-motion video recording by using the control 704. For example, as shown in FIG. 7(a), a default recording frame rate of the system is 960 frames per second (32×) in this case, or in other words, the electronic device performs video recording at 960 frames per second, and may encode captured 960 frames of shot images at an encoding rate of 30 frames per second. Original one-second video content may be slowly played back as a 32-second slow-motion video, that is, a 32× slow-motion video. For example, after detecting an operation of tapping the control 704 by the user, the electronic device displays a GUI shown in FIG. 9(a). In this case, a slow-motion preview interface displays a control 901 for selecting different recording frame rates. For example, an optional rate may be 4× to 256×. It should be noted that, in this embodiment of this application, a rate 4×, 32×, or 256× is relative to 30 frames per second. Therefore, an optional range of recording frame rates may be 120 frames per second to 7680 frames per second, for example, 120 frames per second (4×), 240 frames per second (8×), 480 frames per second (16×), 960 frames per second (32×), 1920 frames per second (64×), and 7680 frames per second (256×). For example, as shown in FIG. 9(a), the user may select a recording frame rate by dragging, sliding, or tapping a control 801. When the user selects a frame rate by using a sliding operation, a GUI shown in FIG. 9(b) may be displayed. In this case, the display interface may display the currently selected frame rate in a form of a large icon, so as to indicate the currently selected frame rate to the user. When the user selects a frame rate by using a tapping operation, a GUI shown in FIG. 9(c) may be displayed.

In an embodiment, when the user selects frame rates: 4× and 8×, a slow-motion preview interface may not include a motion detection control.

It should be noted that, different frame rates may correspond to different slow-motion video recording duration. In a possible design, duration of a slow-motion video recorded by the electronic device may be preset duration, and the preset length may be preset at delivery of the electronic device. Usually, a higher recording frame rate indicates that more image frames need to be processed by an image sensor per second. Therefore, a higher requirement is imposed on a processing capability of the image sensor. In addition, if a recording time is excessively long, a time of a generated slow-motion video is excessively long. This also affects user experience. For example, a 1 s video is recorded at 1920 fps. If the 1 s video is encoded at 30 fps, a 64 s slow-motion video is generated. Apparently, an excessively long slow-motion video affects user experience. In real life, a high frame rate mode such as 7680 fps usually needs to be used for recording a scenario such as firecracker blasting or bullet shooting, while firecracker blasting, bullet shooting, or the like usually occurs in a split second (for example, 0.1 s).

Therefore, to ensure good user experience, fixed recording duration corresponding to different frame rate modes may be set in the electronic device for a user before delivery of the electronic device.

As listed in Table 1, when the user selects the recording frame rate of 120 fps for shooting an ordinary-speed motion scenario such as hand clapping or walking, the electronic device records a 4 s video at 120 fps; encodes captured 480 frames of shot pictures at an encoding speed of 30 fps to generate a 1bs low-speed video; and generates, outside a slow-motion range, a 1 s normal-speed video both before and after the 16 s low-speed video by performing frame extraction on buffered video frames. In this case, total video duration is 18 s. In this application document, a low-speed video range in a slow-motion video may be referred to as a slow-motion range or a slow-motion video clip.

When the user selects the recording frame rate of 240 fps for shooting an ordinary-speed motion scenario such as hand clapping or walking, the electronic device records a 2 s video at 240 fps; encodes captured 480 frames of shot pictures at an encoding speed of 30 fps to generate a 16 s low-speed video; and generates, outside a slow-motion range, a 1 s normal-speed video both before and after the 16 s low-speed video by performing frame extraction on buffered video frames. In this case, total video duration is 18 s.

The electronic device records a 1 s video at 480 fps when the user selects the recording frame rate of 480 fps; generates a 16 s low-speed video when encoding captured 480 frames of shot pictures at an encoding speed of 30 fps; and generates, outside a slow-motion range, a 1 s normal-speed video both before and after the 16 s low-speed video by performing frame extraction on buffered video frames. In this case, total video duration is 18 s. When the user selects the recording frame rate of 960 fps for shooting an ordinary high-speed motion scenario such as a natural scenario (a waterfall, a fountain, splashing water formed after raindrops splash on a water surface/ground, a wave, or the like), a sport scenario (running, swimming, dart shooting, or the like), an animal scenario (pet running or the like), a flame scenario (a lighter flame, a match flame, or the like), or a breaking scenario (falling/hitting of a glass cup, an egg, fruit, or the like), the electronic device records a 0.5 s video at 960 fps; encodes captured 480 frames of shot pictures at an encoding rate of 30 fps to generate a 16 s low-speed video; and generates, outside a slow-motion range, a 1 s normal-speed video both before and after the 16 s low-speed video by performing frame extraction on buffered video frames. In this case, total video duration is 18 s. In a possible implementation, the electronic device may buffer a 1 s video at 960 fps; select a 0.5 s video from the buffered 1 s video for slow encoding to generate a 16 s low-speed video; and generates, outside a slow-motion range, a 1 s normal-speed video both before and after the 16 s low-speed video by performing frame extraction on buffered video frames. In this case, total video duration is 18 s.

When the user selects the recording frame rate of 1920 fps for shooting a high-speed motion scenario such as a natural scenario (lightning or the like), a sport scenario (conjuring, boxing, rope skipping, fencing, or the like), an animal scenario (horse riding, insect wings, or the like), a high-pressure scenario (balloon bursting, kaleidoscope, or the like), or a cool play scenario (a drone, fireworks, or the like), the electronic device records a 0.5 s video at 1920 fps; encodes captured 960 frames of shot pictures at an encoding rate of 30 fps to generate a 32 s low-speed video; and generates, outside a slow-motion range, a 1 s normal-speed video both before and after the 32 s low-speed video by performing frame extraction on buffered video frames. In this case, total video duration is 34 s. In a possible implementation, the electronic device may buffer a 1 s video at 1920 fps; select a 0.5 s video from the buffered 1 s video for slow encoding, to generate a 32 s low-speed video; and generates, outside a slow-motion range, a 1 s normal-speed video both before and after the 32 s low-speed video clip by performing frame extraction on buffered video frames. In this case, total video duration is 34 s.

When the user selects the recording frame rate of 7680 fps for shooting an ultra-high-speed motion scenario such as blasting (firecracker blasting or the like) or shooting (arrow shooting, air rifle shooting, slingshot shooting, bullet shooting, or the like), the electronic device records a 0.125 s video at 7680 fps; encodes captured 960 frames of shot pictures at an encoding rate of 30 fps to generate a 32 s low-speed video; and generates, outside a slow-motion range, a 1 s normal-speed video both before and after the 32 s low-speed video clip by performing frame extraction on buffered video frames. In this case, total video duration is 34 s.

For example, when recording a video at 7680 fps, the electronic device may first record original video frames at 960 fps or 1920 fps, and then interpolate frames between adjacent original video frames based on the original video frames to generate a slow-motion effect corresponding to 7680 fps. Specifically, when recording a slow-motion video, the electronic device may perform frame interpolation to increase a video recording frame rate. In a possible implementation, the electronic device may buffer a 1 s video at 1920 fps, select a 0.125 s video (240 frames) from the buffered 1 s video, and then perform 4-fold frame interpolation on the selected 240 frames of shot pictures to generate 960 frames; encode, at the encoding rate of 30 fps, 960 frames of shot pictures obtained after frame interpolation, to generate a 32 s low-speed video; and generate, outside a slow-motion range, a 1 s normal-speed video both before and after the 32 s low-speed video by performing frame extraction on buffered video frames. In this case, total video duration is 34 s.

In addition, in this embodiment of this application, video recording duration may alternatively be unlimited. Using the recording frame rates of 120 fps and 240 fps as examples, the user may determine video recording duration.

Figure 10:
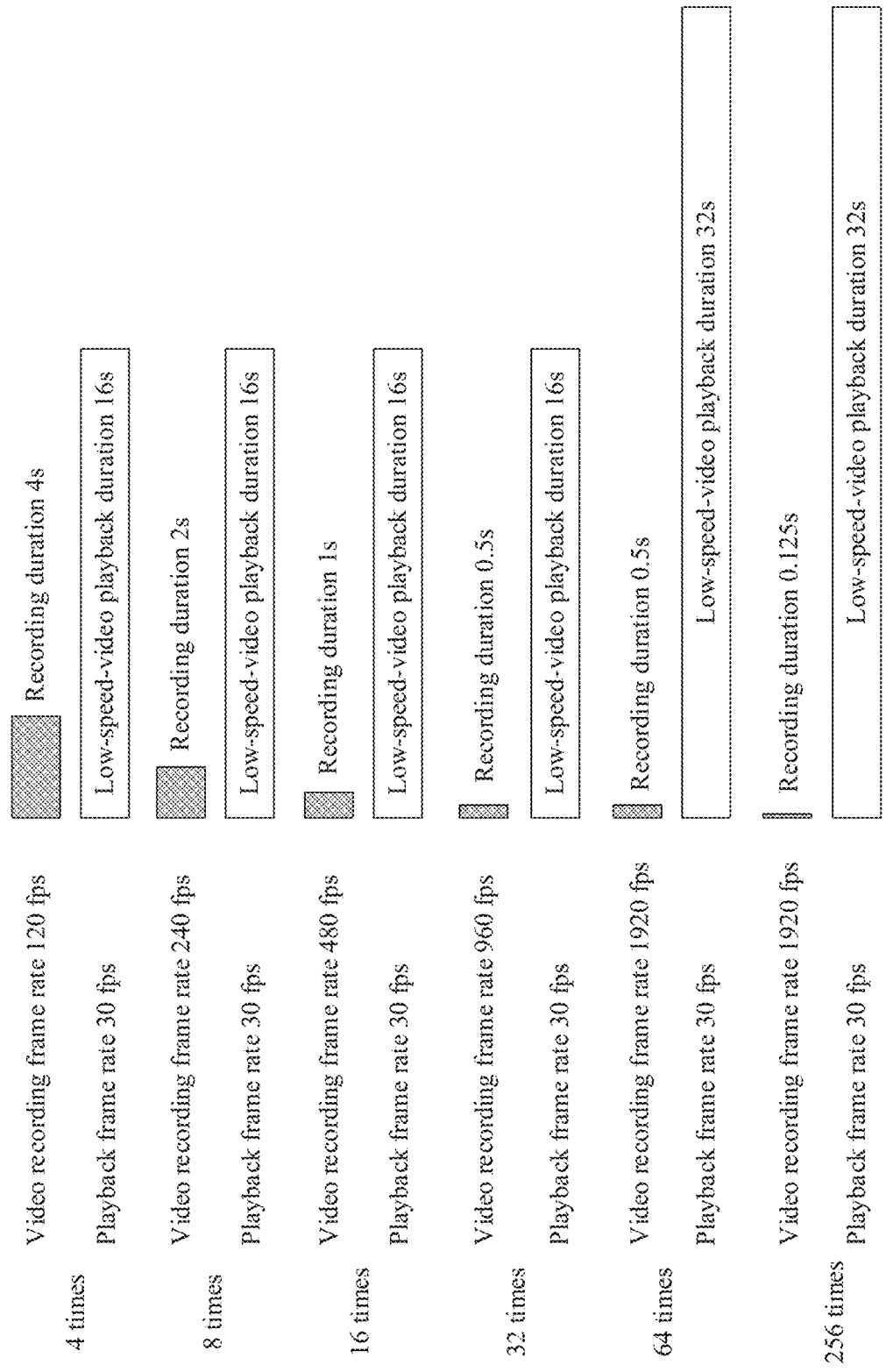
FIG. 10 is a schematic diagram of a group of display interfaces according to an embodiment of this application.

For example, FIG. 10 shows a proportional relationship between recording duration and duration of a generated low-speed video when encoding is performed at 30 fps when different recording frame rates are used.

TABLE 1

| Frame rate (fps) | Recording duration (s) | Slow-motion video duration (s) |
| --- | --- | --- |
| 120 | 4 s | 1 s normal-speed video + 16 s low-speed video + 1 s normal-speed video |
| 240 | 2 s | 1 s normal-speed video + 16 s low-speed video + 1 s normal-speed video |
| 480 | 1 s | 1 s normal-speed video + 16 s low-speed video + 1 s normal-speed video |
| 960 | 0.5 s | 1 s normal-speed video + 16 s low-speed video + 1 s normal-speed video |
| 1920 | 0.5 s | 1 s normal-speed video + 32 s low-speed video + 1 s normal-speed video |
| 7680 | 0.125 s | 1 s normal-speed video + 32 s low-speed video + 1 s normal-speed video |

For example, as shown in FIG. 8(a), after detecting an operation of triggering the motion detection control by the user, the electronic device displays a GUI shown in FIG. 8(b). In this case, the electronic device enters an intelligent automatic slow-motion video recording mode, and the electronic device may automatically trigger slow-motion video recording. In the intelligent automatic slow-motion video recording mode, a human body detection model is preset in the electronic device, and the electronic device may detect, in real time on an entire preview interface by using a front-facing camera or a rear-facing camera, whether there is a human body.

Figure 11:
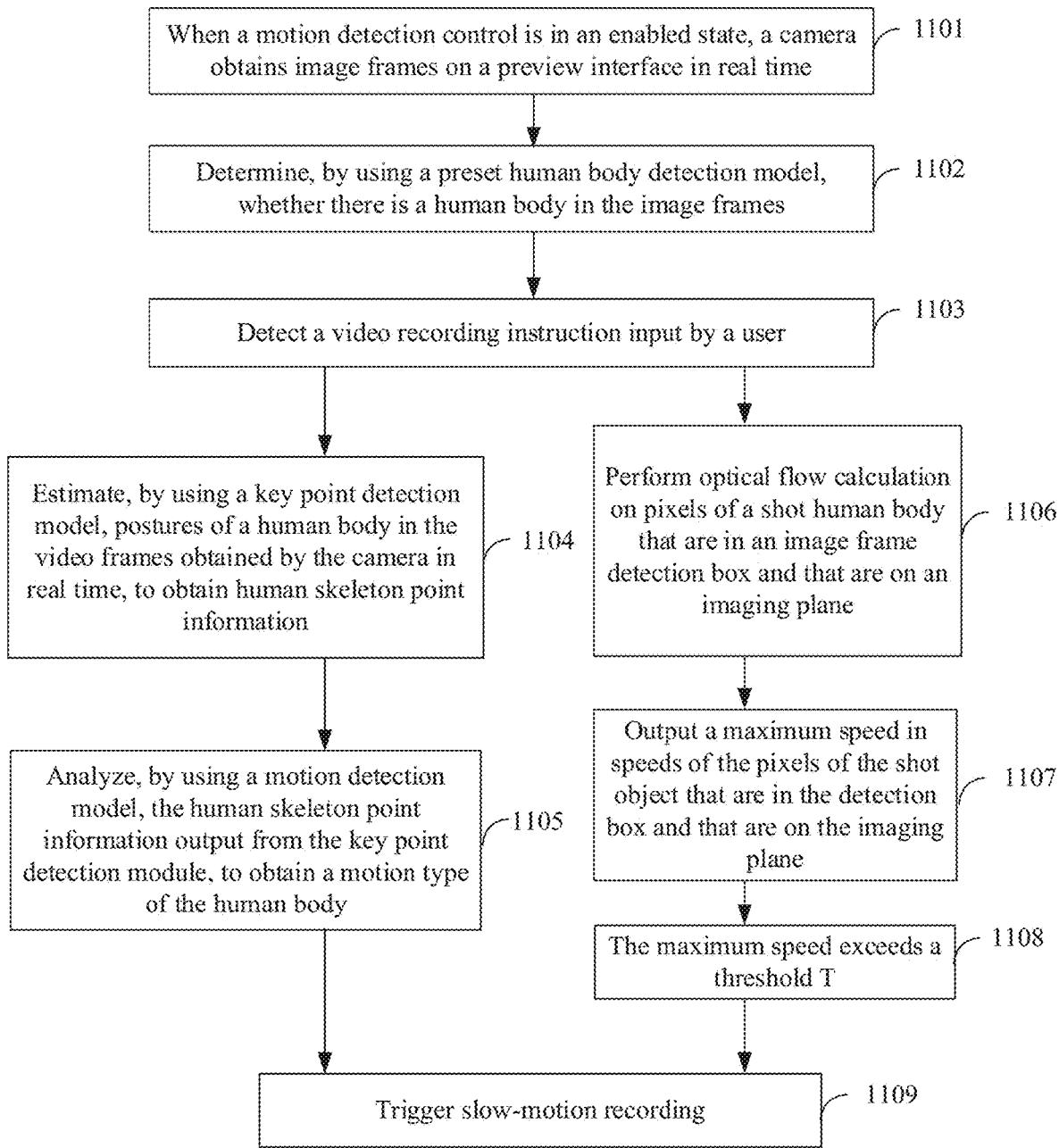
FIG. 11 is a flowchart of a slow-motion video recording method according to an embodiment of this application.

FIG. 11 is a flowchart of automatically triggering slow-motion video recording by an electronic device after a motion detection function of the electronic device is enabled.

1101. When a motion detection control is in an enabled state, a camera may obtain image frames on a preview interface in real time.

1102. The electronic device may determine, by using a preset human body detection model, whether there is a human body in the image frames captured by the camera.

The preset human body detection model may be obtained through training by using a convolutional neural network (Convolutional Neural Network, CNN), and stored in the electronic device before delivery of the electronic device. When there is a human body in the image frame captured by the camera, it may be determined, by using the human body detection model, that a shot object in this case is a human body; or when there is no human body in the image frame captured by the camera, it may be determined that a shot object in this case is a non-human subject.

1103. The electronic device detects a video recording instruction input by a user. Then, the electronic device may trigger slow-motion video recording based on different subjects of shot objects by using different methods.

When detecting that a shot object is a human body, the electronic device determines, according to steps 1104 and 1105 (motion recognition), a condition for triggering slow-motion video recording, and the electronic device may perform motion detection on the shot human body on the entire preview interface in real time. Specifically, the electronic device may perform real-time posture point estimation and motion type recognition on the human body by using a preset network inference module in a neural-network processing unit (neural-network processing unit, NPU). The network inference module includes a key point detection model that is used to recognize feature points (including a plurality of joints such as a head, hands, and legs) of a human body posture and that is established in advance based on a convolutional neural network (Convolutional Neural Network, CNN), and a motion detection model used to recognize human body motions (including common motions such as jumping, basketball shooting, and ball kicking). Therefore, the electronic device may estimate, by using the key point detection model, postures of the human body in video frames obtained by the camera in real time, to obtain joint information of the human body. Then, the electronic device analyzes, by using the motion detection model, the joint information of the human body output from the key point detection model, to obtain a motion type of the human body. When recognizing the motion type of the human body, the electronic device automatically triggers slow-motion video recording.

In a possible implementation, the electronic device may perform pre-determining on a motion of the human body based on speeds, displacement, posture changes, and the like of a plurality of joints of the human body such as a head, hands, and legs, and may determine, based on the speeds, the displacement, the posture changes, and the like of the plurality of joints of the human body such as the head, the hands, and the legs, the condition for triggering slow-motion video shooting.

When the electronic device does not detect a preset motion of the shot human body, the electronic device performs optical flow calculation on the shot human body by using a detection box, and triggers slow-motion video recording according to steps 1106 to 1108 (an optical flow method).

An optical flow refers to instantaneous motion speeds of pixels of a spatially moving object on an observed imaging plane. The optical flow method is a method in which a correspondence between a previous frame and a current frame is found based on a time-domain change of a pixel in an image sequence and a correlation between the adjacent frames to obtain motion information of an object between the adjacent frames through calculation. In general, the optical flow is generated due to a motion of a foreground object, a motion of a camera, or motions of both the foreground object and the camera in a scenario. If there is no moving object in an image, an optical flow vector changes continuously in an entire region of the image. When there is a moving object in an image, there is a relative motion between the object and a background. A speed vector of the moving object is necessarily different from a speed vector of the background, so that a location of the moving object can be obtained through calculation.

Because a large amount of calculation is required in the optical flow method, optical flow calculation may be performed on a shot human body only in a detection box on a preview interface. Specifically, the electronic device may perform, frame by frame, optical flow calculation on pixels of the shot human body that are on an imaging plane and that are in the detection box in a preview window, to obtain instantaneous speeds of all pixels of the shot human body that are on the imaging plane and that are in the detection box; and use a maximum speed in the calculated instantaneous speeds of all the pixels as a speed output of a current frame. When the maximum speed exceeds a threshold T, the electronic device is automatically triggered to start slow-motion video recording.

When detecting that a shot object is a non-human subject, the electronic device directly triggers slow-motion video recording according to steps 1106 to 1108 (the optical flow method). However, a preset threshold S for a case that the shot object is not a human body is less than the preset threshold T for a case that the shot object is a human subject. When a maximum speed exceeds the preset threshold S, slow-motion recording is automatically triggered. In other words, when the shot object is a human body, the optical flow method is not easily triggered; and when the shot object is not a human body, the preset threshold is smaller, and in this case, the optical flow method is more easily triggered.

It should be noted that, for a process from enabling the motion detection function to automatically triggering slow-motion video recording, there may be a plurality of implementations.

In an embodiment, when the motion detection function is enabled, the electronic device may perform subject recognition on a shot object on a preview interface in real time by using the preset human body detection model, and determine whether the shot object on the preview interface is a human subject or a non-human subject. After the user taps a slow-motion recording control, the electronic device does not immediately trigger slow-motion video recording, but performs motion recognition on the shot human body in real time by using the key point detection model and the motion detection model. When detecting that a motion of the shot human body on the preview interface is a preset motion, the electronic device automatically triggers slow-motion video recording.

In an embodiment, when the motion detection function is enabled, the electronic device starts to load the human body detection model and the motion detection model. After the user taps a slow-motion recording control, the electronic device may perform subject recognition on a shot object on a preview interface in real time by using the human body detection model, and determine whether the shot object on the preview interface is a human subject or a non-human subject. When detecting that the shot object is a human body, the electronic device performs motion type recognition on the shot human body in real time by using the key point detection model and the motion detection model. When detecting that a motion of the shot human body on the preview interface is a preset motion, the electronic device automatically triggers slow-motion video recording.

In an embodiment, when the motion detection function is enabled, the electronic device may perform subject recognition on a shot object on a preview interface in real time, and determine whether the shot object on the preview interface is a human subject or a non-human subject. When detecting that the shot object is a human body, the electronic device performs motion type recognition on the shot human body in real time by using the key point detection model and the motion detection model. After the user taps a slow-motion recording control, when detecting that a motion of the shot human body on the preview interface is a preset motion, the electronic device automatically triggers slow-motion video recording.

In a possible implementation, after the electronic device enters an automatic slow-motion video recording mode, the user does not need to perform an operation of inputting a video recording instruction (step 1103). When detecting a preset motion of a shot human body, the electronic device automatically triggers slow-motion video recording.

It should be noted that, there are a plurality of software algorithm implementations and algorithm implementation procedures that can implement human body recognition, human body motion recognition, and automatic triggering of slow-motion video recording by the electronic device in this embodiment of this application. This is not limited in this embodiment of this application.

Figure 12A:
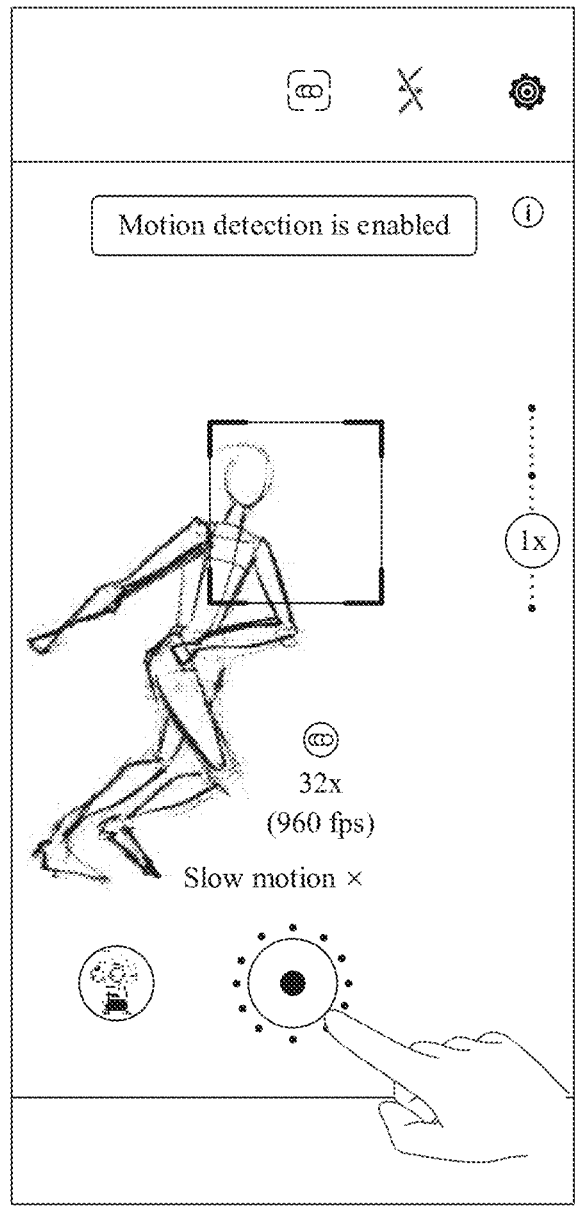
FIG. 12(a), FIG. 12(b), FIG. 12(c), FIG. 12(d), and FIG. 12(e) are a schematic diagram of a process of automatically recording a slow-motion video according to an embodiment of this application.
Figure 12B:
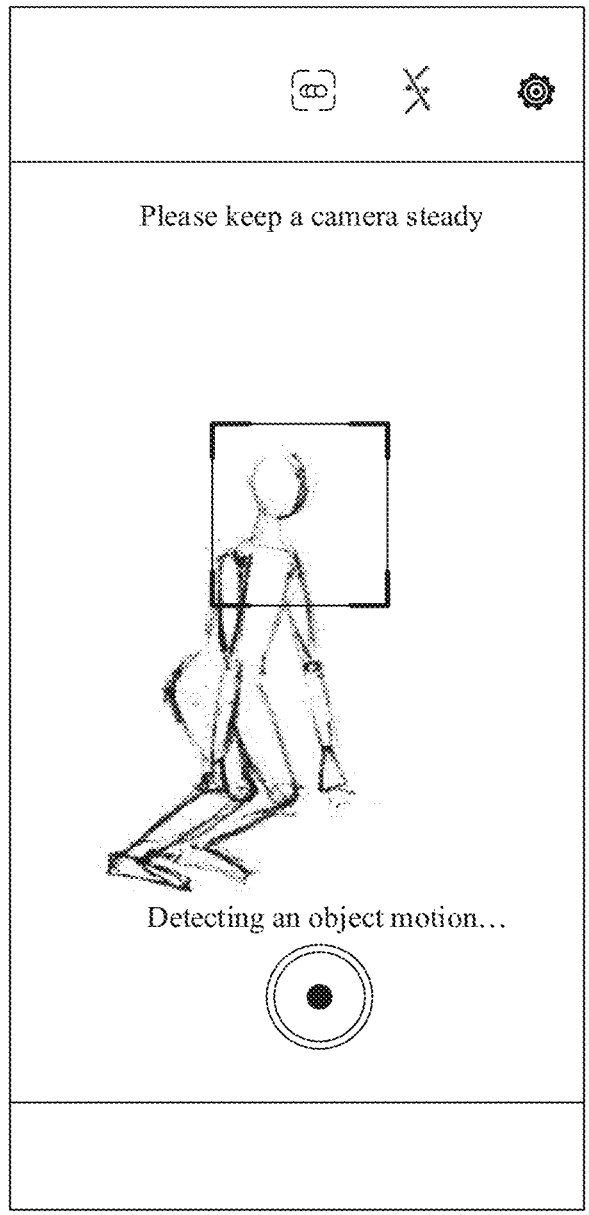
Figure 12C:
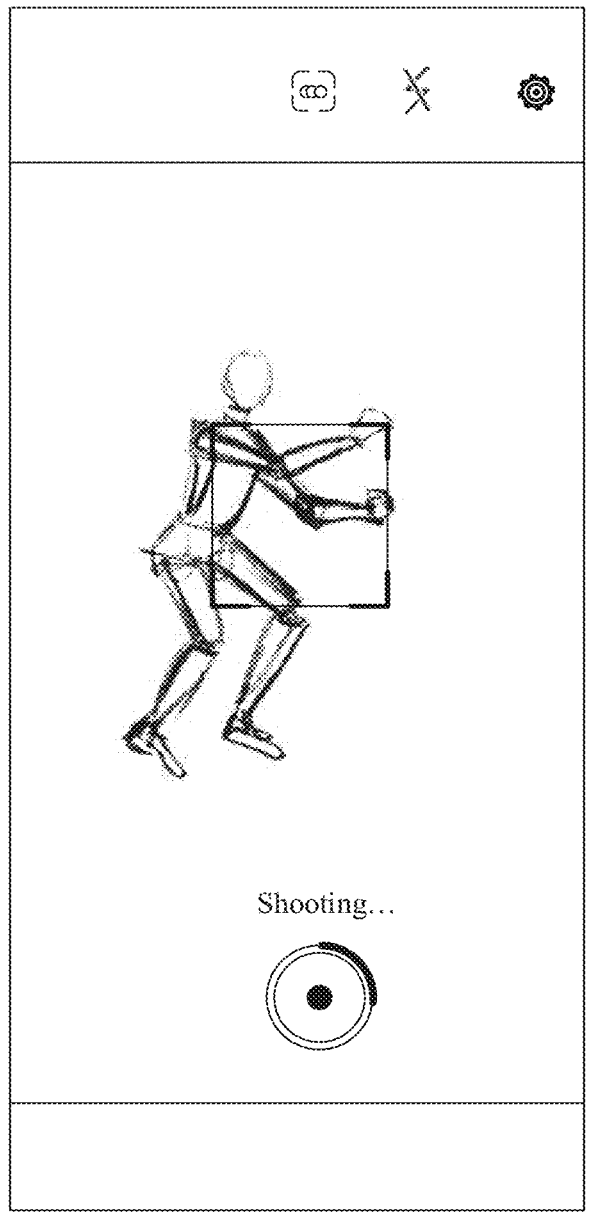

For example, as shown in FIG. 12(a), FIG. 12(b), FIG. 12(c), FIG. 12(d), and FIG. 12(e), in this case, the user wants to record, by using an intelligent automatic slow-motion function of the electronic device, a scenario in which a good friend suddenly jumps while running. As shown in FIG. 12(a), in this case, the electronic device has enabled the motion detection function, and a displayed recording frame rate is a default frame rate of 960 fps. The user may select different recording frame rates by using a control for switching a slow-motion recording frame rate. As shown in FIG. 12(a), in this case, a person who is running is displayed in the preview window, and the electronic device may detect, by using the motion detection function, that a shot object in the preview window of the camera in this case is a human body. It should be noted that, in this embodiment of this application, walking and running of the human body are not used as human body motions that trigger slow-motion shooting. After detecting an operation of triggering a video recording control by the user, the electronic device displays a GUI shown in FIG. 12(b). In this case, slow-motion video recording is not triggered. The electronic device may estimate a posture of the shot person in real time by using the preset key point detection model, to obtain joint information of the human body, and send the joint information to the motion detection model to determine a motion type of the human body in the preview window in real time. As shown in FIG. 12(c), when the shot person suddenly jumps, the electronic device may predict that a motion trend of the human body at this time is "jump", so as to automatically trigger slow-motion video recording.

Figure 13A:
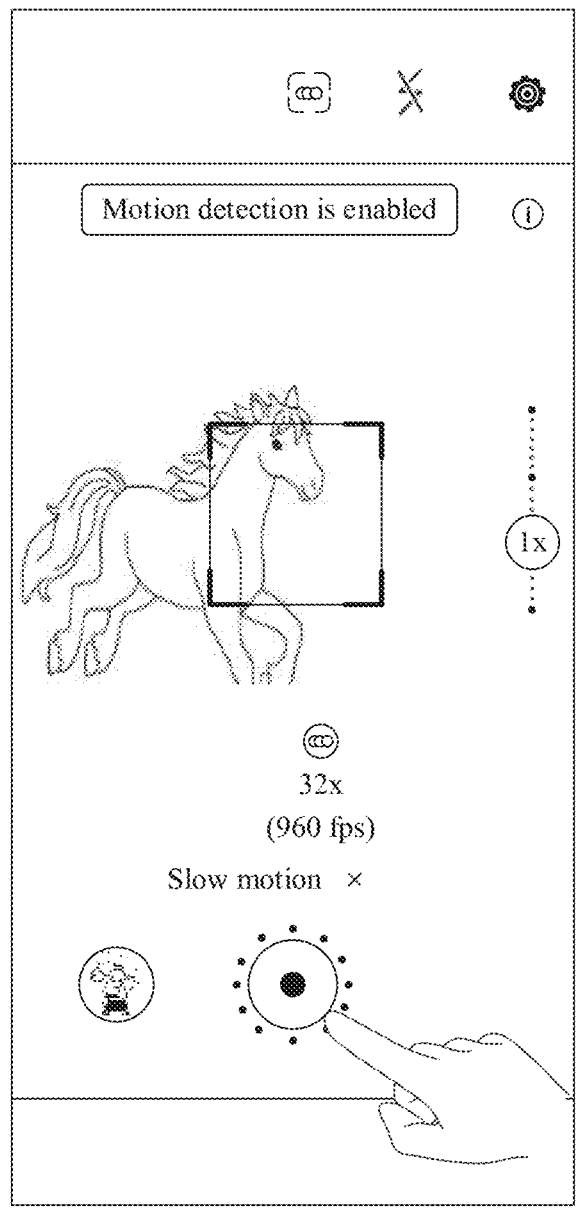
FIG. 13(a), FIG. 13(b), FIG. 13(c), FIG. 13(d), and FIG. 13(e) are a schematic diagram of another process of automatically recording a slow-motion video according to an embodiment of this application.
Figure 13B:
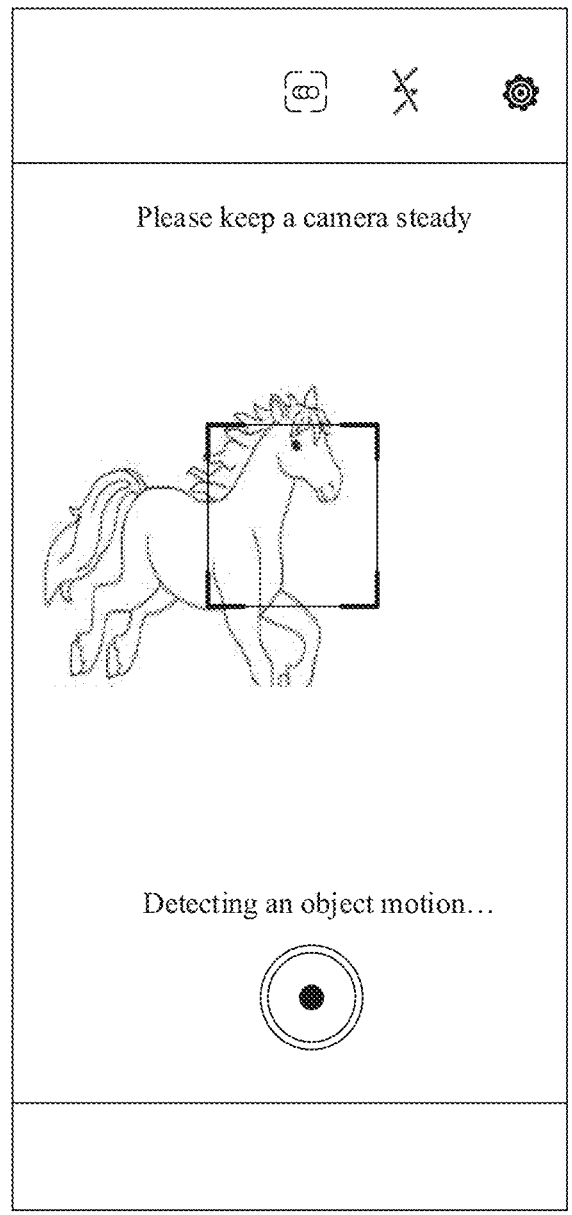
Figure 13C:
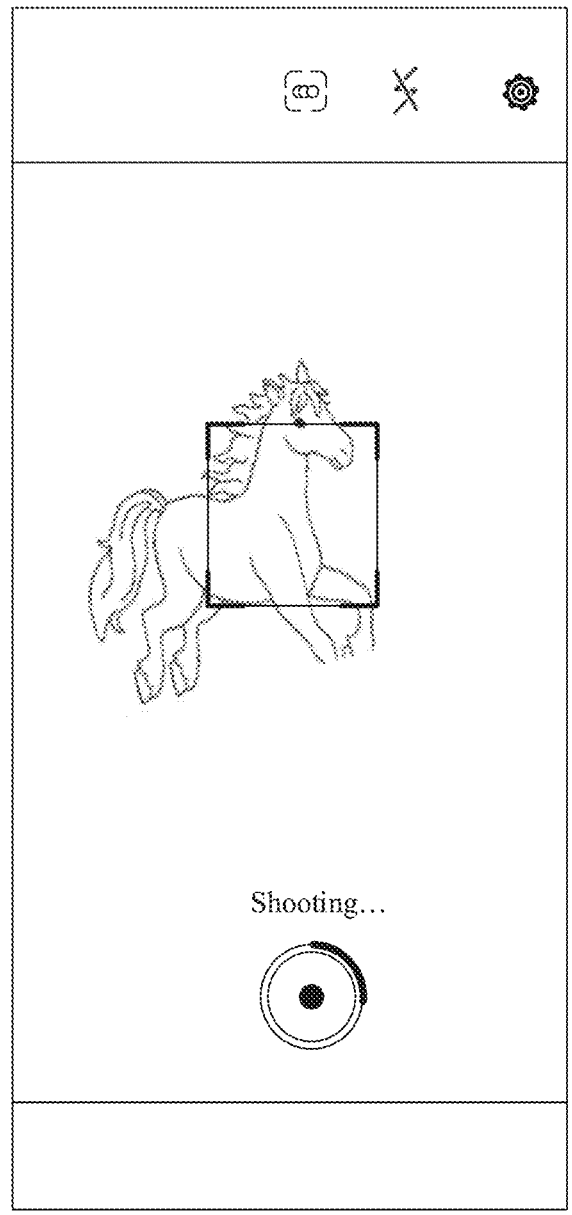

For another example, as shown in FIG. 13(a), FIG. 3(b), FIG. 13(c), FIG. 13(d), and FIG. 13(e), in this case, the user wants to record, by using the intelligent automatic slow-motion function of the electronic device, a scenario in which a pony suddenly jumps while running. As shown in FIG. 13(a), the user may select different recording frame rates by using the control for switching a slow-motion recording frame rate. In this case, a recording frame rate displayed by the camera is a default frame rate of 960 fps. As shown in FIG. 13(a), in this case, the electronic device has enabled the motion detection function, and the electronic device may detect, by using the motion detection function, that a shot object in the preview window of the camera is a non-human subject. After detecting an operation of tapping a shooting control by the user, the mobile phone displays an interface shown in FIG. 13(b), and the electronic device may perform optical flow calculation on the shot object in the detection box in real time, but does not trigger slow-motion video recording. As shown in FIG. 13(c), when learning, through calculation, that a maximum speed of the shot object in the detection box in a current video frame exceeds the threshold T, the electronic device automatically triggers intelligent slow-motion recording.

In the foregoing embodiment, when the motion detection function is enabled, the electronic device enters an intelligent automatic slow-motion video recording mode. When the shot object is a human body, the electronic device may recognize a motion type of the shot human body, and trigger slow-motion video recording once a motion trend of the human body is detected. When the motion type of the human body is not applicable to the preset motion detection model, or the detection object is a non-human subject, slow-motion video recording is triggered by using the optical flow method.

In this embodiment of this application, an AI (Artificial Intelligence, artificial intelligence) algorithm is used to recognize a motion type of a human body. Slow-motion video recording is triggered only when the motion type of the human body is recognized. In this way, a wonderful clip that the user is concerned about is more easily captured. In addition, compared with a conventional technology in which slow-motion video recording is triggered in a manner such as detecting whether there is a sudden picture change, the method in this embodiment of this application is more stable, and can reduce a rate of accidental triggering.

In an embodiment, the electronic device may further recommend a more appropriate slow-motion recording frame rate to the user based on a recording object or a recording scenario that the user chooses to record, to generate a slow-motion video, thereby achieving a better slow-motion playback effect.

Figure 14A:
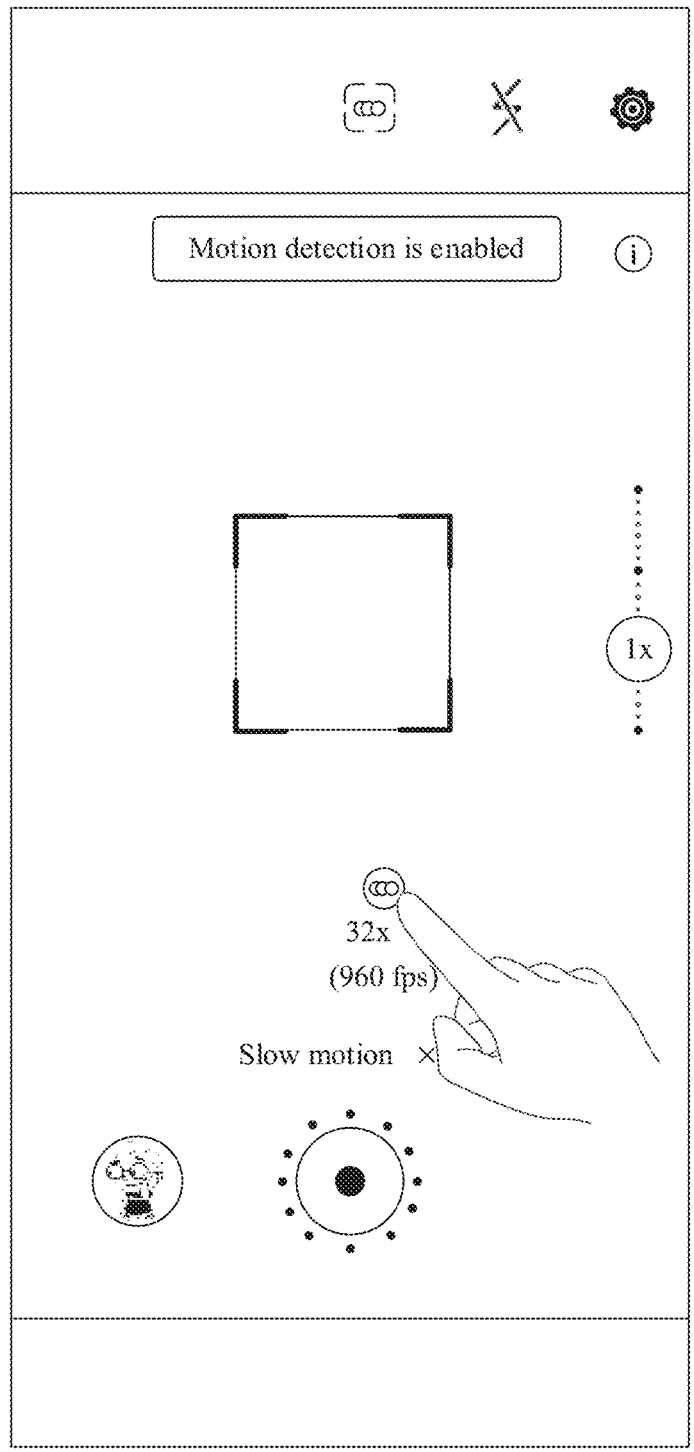
FIG. 14(a), FIG. 14(b), and FIG. 14(c) are a schematic diagram of a group of display interfaces according to an embodiment of this application.
Figure 14B:
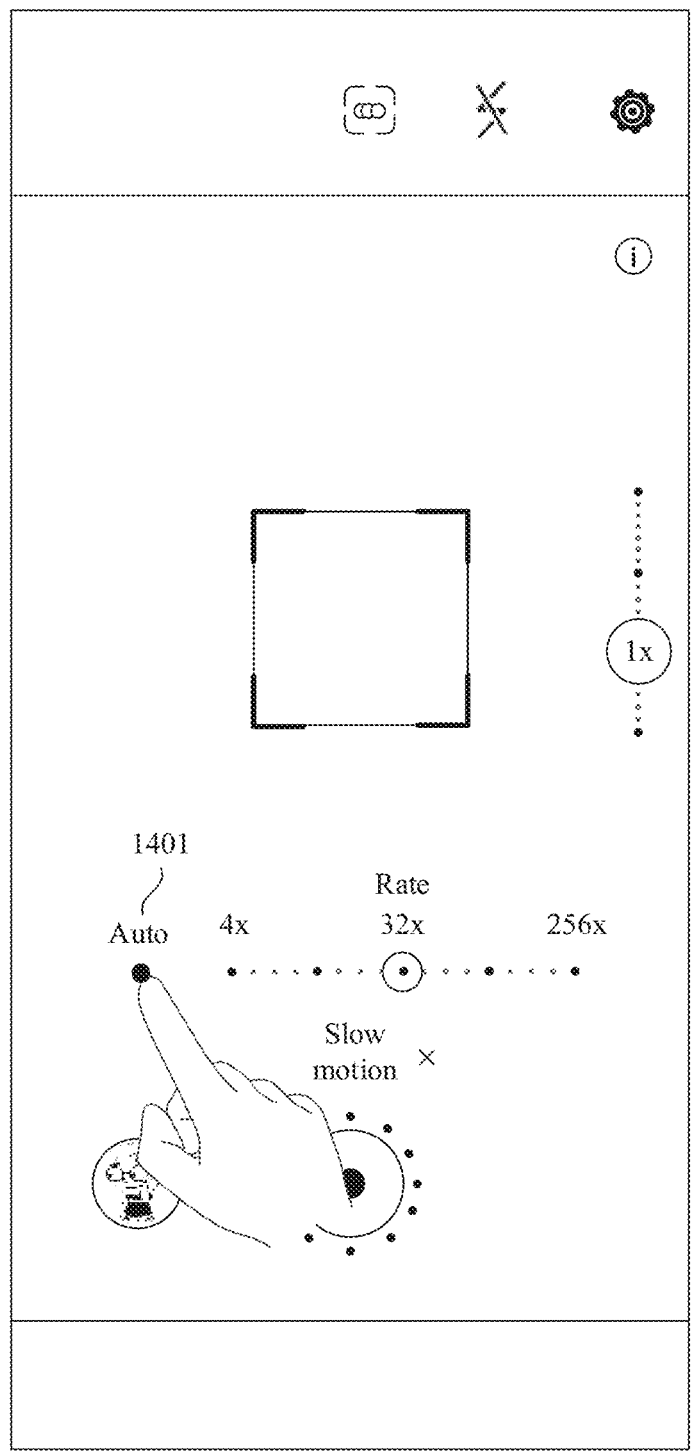
Figure 14C:
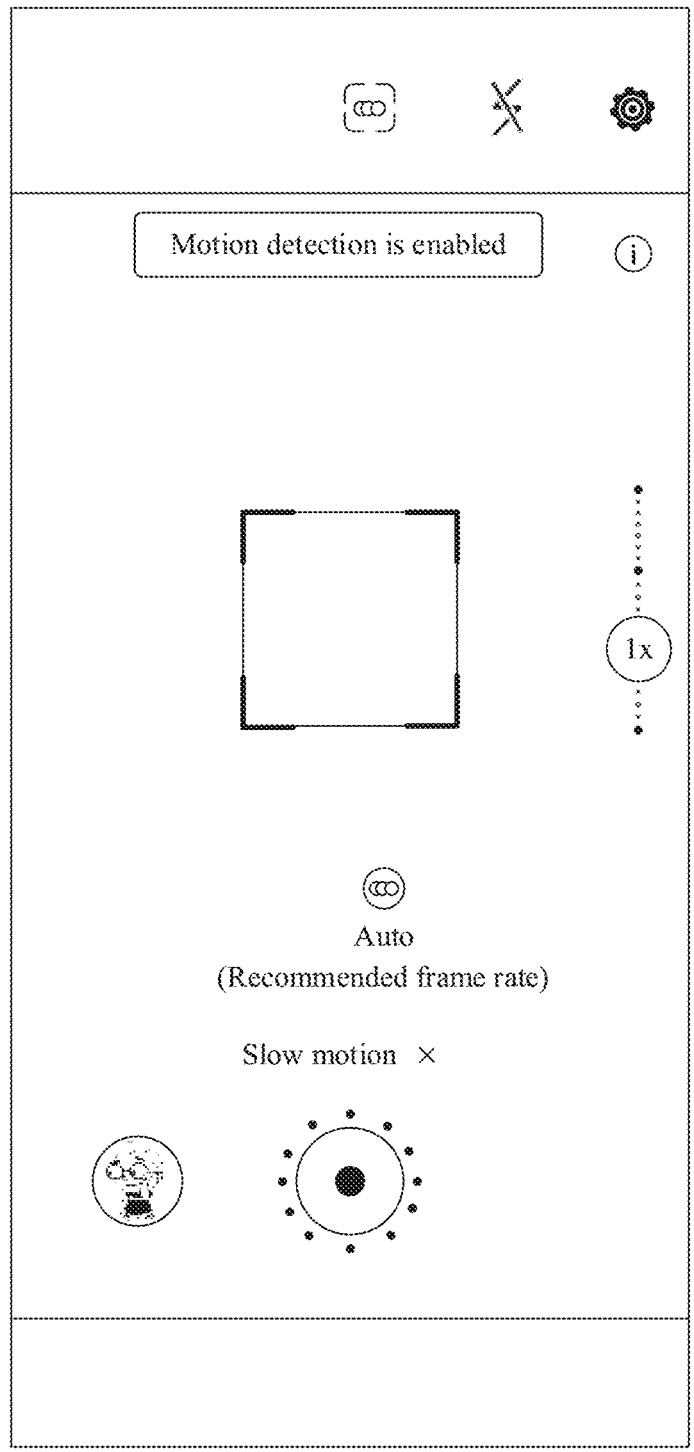

For example, referring to FIG. 14(a), after detecting an operation of tapping, by the user, the control for switching a slow-motion recording frame rate, the electronic device displays a GUI shown in FIG. 14(b). The GUI includes a control 1401 for recommending a frame rate. After detecting an operation of tapping the control 1401 by the user, the electronic device displays a GUI shown in FIG. 14(c). In this case, the electronic device enters an automatic (auto) frame rate mode. In the auto mode, the electronic device may recommend a more appropriate slow-motion recording frame rate to the user based on a recording object or a recording scenario to generate a slow-motion video.

It should be noted that, in a scenario in which motion recognition on a human body triggers slow-motion video recording, most appropriate recording frame rates that are corresponding to different human body motion types and that are obtained from big data statistics may be preset in the electronic device. For example, recommended frame rates corresponding to rotation and cheering are 240 fps, recommended frame rates corresponding to jumping, basketball shooting, and dribbling are 480 fps, and recommended frame rates corresponding to split jumping, laying up a shot, skateboarding, and golf hitting are 960 fps. Therefore, after recognizing a motion type of the human body, the electronic device may recommend a corresponding recording frame rate, and encode a captured video frame in the preview window at the recommended frame rate to obtain a slow-motion video.

In a scenario in which the optical flow method is used to trigger slow-motion video recording, the electronic device may first perform frame extraction on a buffered video frame sequence, for example, may perform frame extraction at 30 fps; and then perform optical flow calculation on pixels of a moving object that are on an imaging plane and that are in a sequence obtained after frame extraction, to obtain motion speed changes of the pixels of the moving object on the imaging plane. Optimal slow-motion frame rates corresponding to different motion speeds are preset in the electronic device. Therefore, the electronic device may read a preset slow-motion frame rate based on a maximum speed corresponding to the sequence obtained after frame extraction.

Figure 15:
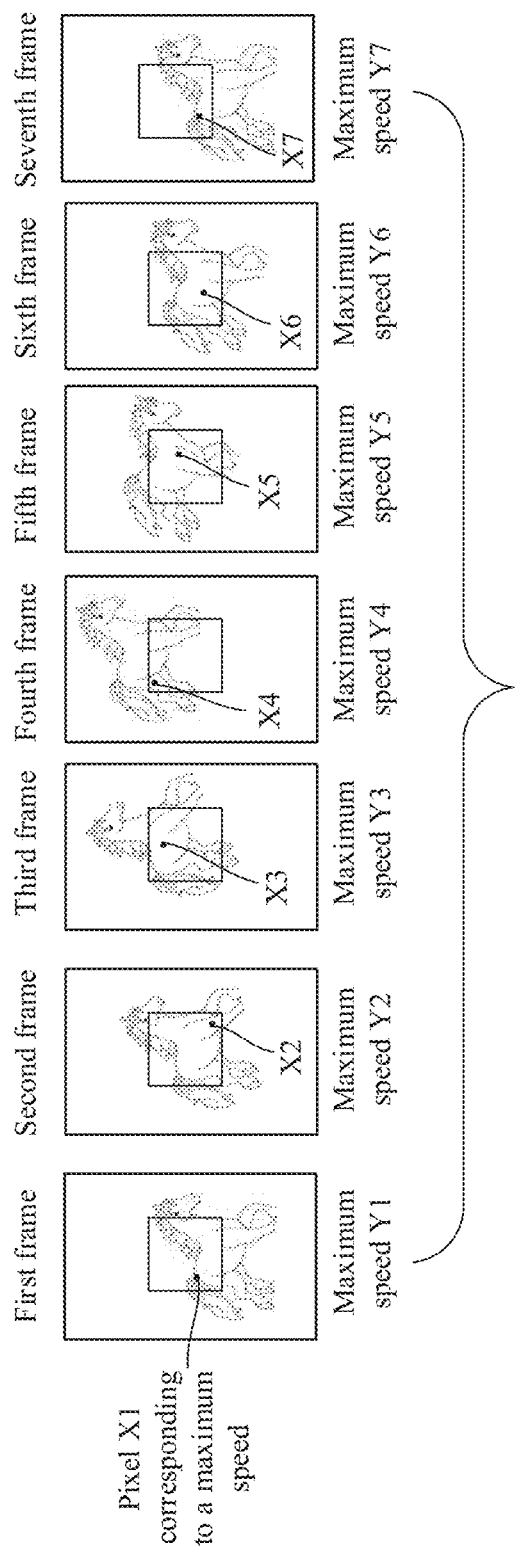
FIG. 15 is a schematic diagram of a principle for recording a slow-motion video according to an embodiment of this application.

For example, as shown in FIG. 15, the electronic device performs frame extraction on a buffered video to obtain seven video frames. Further, the electronic device may calculate speeds of all pixels of the first frame of shot picture in the detection box, where a speed of a point X1 is the highest, and output a maximum speed Y1; calculate speeds of all pixels of the second frame of shot picture in the detection box, where a speed of a point X2 is the highest, and output a maximum speed Y2; calculate speeds of all pixels of the third frame of shot picture in the detection box, where a speed of a point X3 is the highest, and output a maximum speed Y3; . . . ; and calculate speeds of all pixels of the seventh frame of shot picture in the detection box, where a speed of a point X7 is the highest, and output a maximum speed Y7. Units of an optical flow and a speed are not limited in this embodiment of this application. It is learned through comparison that a value of Y4 is the largest. In this case, the electronic device reads a slow-motion frame rate corresponding to the value of Y4, and encodes recorded video frames to obtain a slow-motion video; generates, outside a slow-motion range, normal-speed videos by performing frame extraction on buffered video frames; and finally generates a slow-motion video in a format of "normal-speed video+low-speed video+normal-speed video" and stores the slow-motion video in a gallery.

In a possible implementation, in the auto mode, the electronic device may first buffer video frames at a default frame rate of 960 fps, and read a preset slow-motion frame rate when recognizing a motion type of a human body. For example, a recommended frame rate corresponding to jumping is 480 fps. Then, the electronic device triggers slow-motion shooting to record a slow-motion video at the recommended frame rate. This implements switching to the recommended frame rate at a motion start point for recording, and implements restoring to the default frame rate at a motion end point for recording.

In a possible implementation, in the auto mode, the electronic device may buffer a 1 s video at a default frame rate, for example, 1920 fps, or in other words, the electronic device may capture 1920 frames of shot pictures in 1 s. After completing recording, the electronic device performs post-processing on the buffered video, and reads a recommended frame rate.

When the recommended frame rate read by the electronic device is 7680 fps, the electronic device selects a 0.125 s video (240 frames) from the buffered 1 s video, and then performs 4-fold frame interpolation to generate 960 frames; encodes the 960 frames at 30 fps to generate a 32-second low-speed video; and generates, outside a slow-motion range, a 1 s normal-speed (30 fps) video both before and after the 32-second low-speed video by performing frame extraction on the buffered video. In this case, total video duration is 34 seconds.

When the recommended frame rate read by the electronic device is 1920 fps, the electronic device selects a 0.5 s video (960 frames) from the buffered 1 s video; encodes the 960 frames at 30 fps to generate a 32-second low-speed video; and generates, outside a slow-motion range, a 1 s normal-speed (30 fps) video both before and after the 32-second low-speed video by performing frame extraction on the buffered video. In this case, total video duration is 34 seconds.

When the recommended frame rate read by the electronic device is 960 fps, the electronic device first performs 1-fold frame extraction on the buffered 1 s video frames to obtain 960 frames; selects 480 frames (0.5 s) from the 960 frames (1 s); encodes the 480 frames at 30 fps to generate a 16-second low-speed video; and generates, outside a slow-motion range, a 1 s normal-speed (30 fps) video both before and after the 16-second low-speed video by performing frame extraction on the buffered video. In this case, total video duration is 18 seconds.

When the recommended frame rate read by the electronic device is 480 fps, the electronic device first performs 4-fold frame extraction on the buffered 1 s video frames to obtain 480 frames; encodes the 480 frames at 30 fps to generate a 16-second low-speed video; and generates, outside a slow-motion range, a 1 s normal-speed (30 fps) video both before and after the 16-second low-speed video by performing frame extraction on the buffered video. In this case, total video duration is 18 seconds.

When the recommended frame rate read by the electronic device is 240 fps, the electronic device first performs 8-fold frame extraction on the buffered 1 s video frames to obtain 240 frames; encodes the 240 frames at 30 fps to generate an 8-second low-speed video; and generates, outside a slow-motion range, a 1 s normal-speed (30 fps) video both before and after the 8-second low-speed video by performing frame extraction on the buffered video. In this case, total video duration is 10 seconds.

When the recommended frame rate read by the electronic device is 120 fps, the electronic device first performs 16-fold frame extraction on the buffered 1 s video frames to obtain 120 frames; encodes the 120 frames at 30 fps to generate a 4-second low-speed video; and generates, outside a slow-motion range, a 1 s normal-speed (30 fps) video both before and after the 4-second low-speed video by performing frame extraction on the buffered video. In this case, total video duration is 6 seconds.

In an embodiment, after the electronic device generates a slow-motion video at a recommended frame rate in the auto mode, if the user is not satisfied with the recommended frame rate, the user may edit the generated slow-motion video to reselect a frame rate. The electronic device may generate a new slow-motion video based on the frame rate selected by the user.

In a possible implementation, in the auto mode, the electronic device records a slow-motion video at a high frame rate (for example, 1920 fps) and buffers the high-frame video in the electronic device; and generates a slow-motion video at a recommended frame rate, and displays the slow-motion video to the user. After shooting the slow-motion video, the user may view the slow-motion video in a timely manner. Before tapping to save the slow-motion video, the user may change a playback speed of the slow-motion video.

Figure 16A:
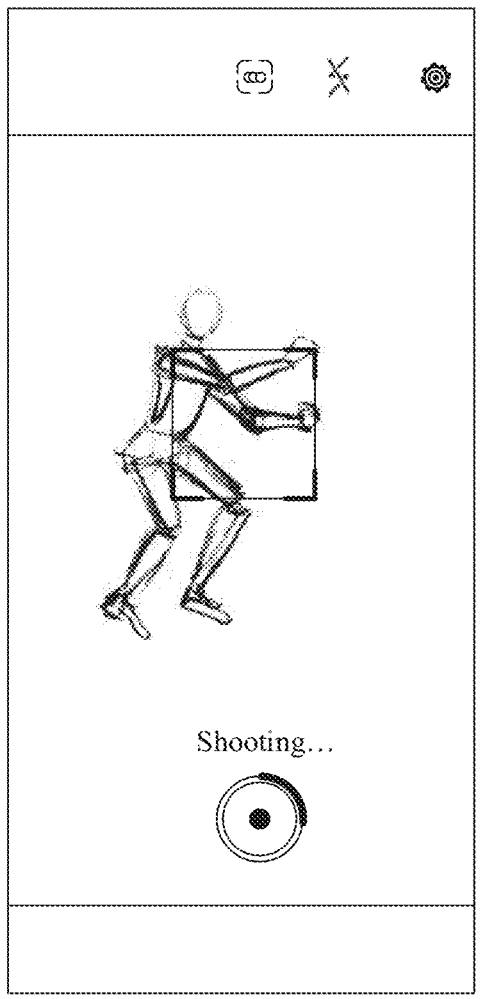
FIG. 16(a), FIG. 16(b), FIG. 16(c), and FIG. 16(d) are a schematic diagram of a process of recording a slow-motion video according to an embodiment of this application.
Figure 16B:
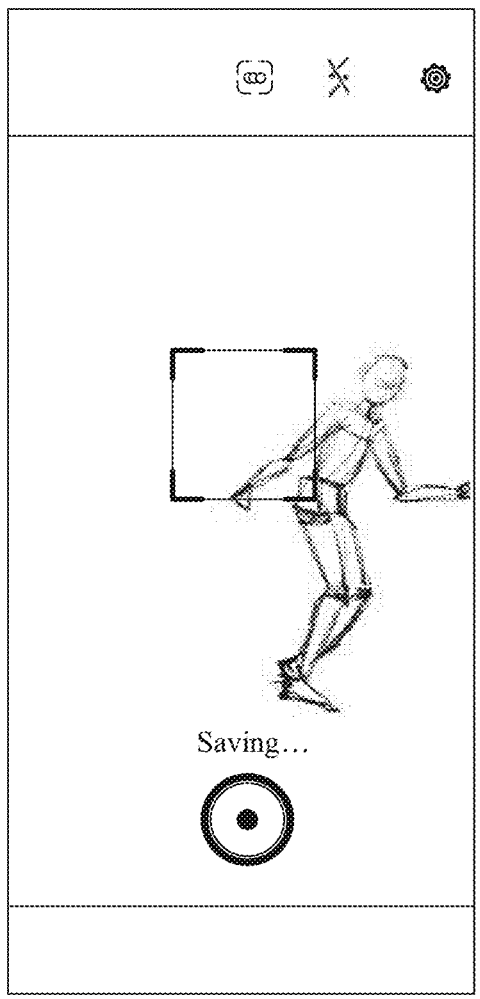
Figure 16C:
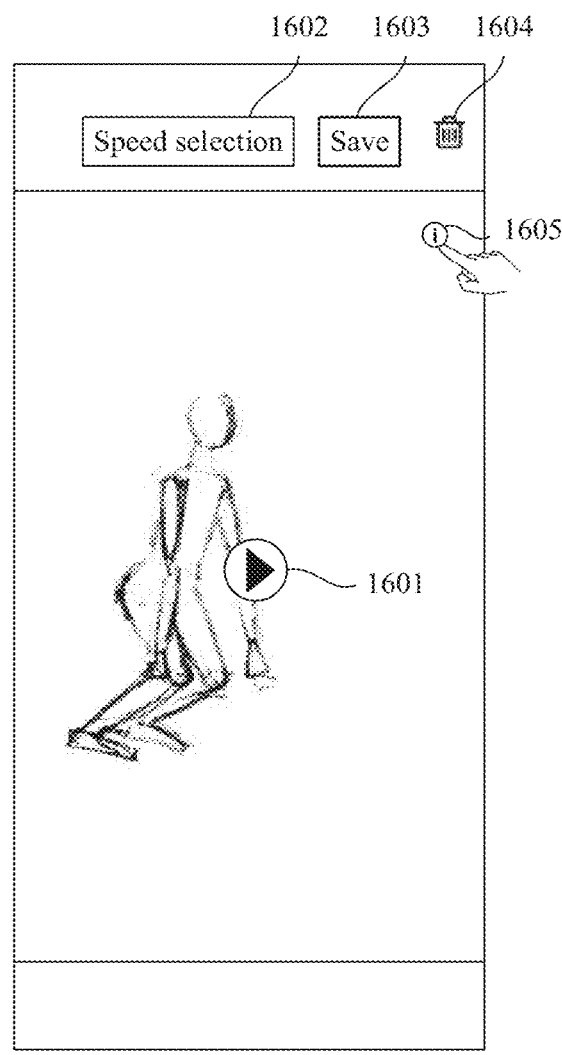
Figure 16D:
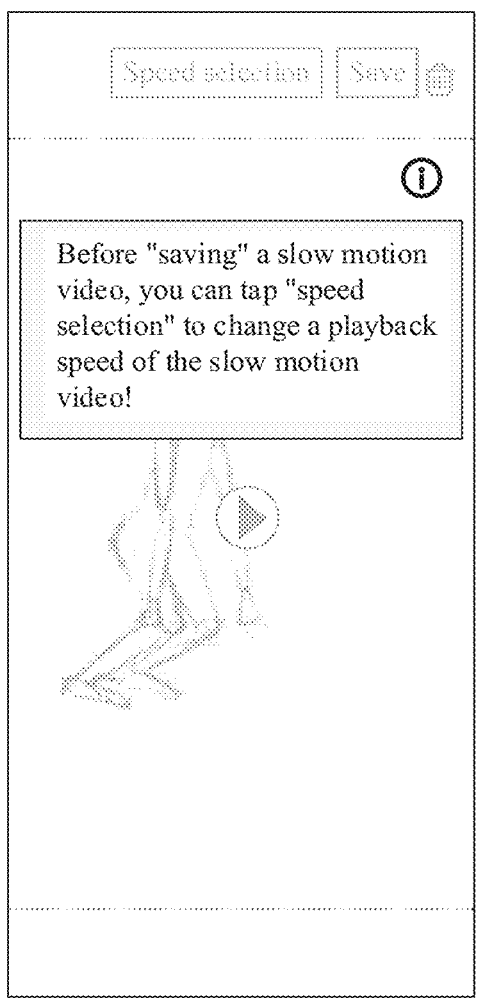

For example, as shown in FIG. 16(a), after the user shoots a slow-motion video, a GUI shown in FIG. 16(b) is displayed, and displays "saving". In this case, the electronic device may generate a slow-motion video at a recommended frame rate. After generating the slow-motion video, the electronic device does not immediately store the slow-motion video in the gallery, but directly displays the slow-motion video in a display window of the electronic device, for example, a GUI in FIG. 16(c). The GUI includes a playback control 1601 for playing back a video, a speed selection control 1602 for selecting a playback speed of a slow-motion video, a storage control 1603 for storing a video, a deletion control 1604 for deleting a video, and a control 1605 for viewing prompt information. The user may tap the playback control 1601 to view the slow-motion video. Afterwards, if the user is satisfied with the video, the user may tap the storage control 1603 to store the slow-motion video shot at the recommended frame rate in the gallery. Before tapping the storage control 1603 to store the slow-motion video, the user may alternatively tap the speed selection control 1602 to change the playback speed of the slow-motion video to generate a new slow-motion video. As shown in the GUI in FIG. 16(c), the GUI may include the control 1605 for viewing prompt information. After the user taps the control 1605, a GUI shown in FIG. 16(d) is displayed. In this case, a display of the electronic device displays prompt information "before storing the slow-motion video, you can tap the speed selection control to change the playback speed of the slow-motion video", to indicate that the user may further change the playback speed of the slow-motion video before storing the slow-motion video. It should be noted that, when the user uses the electronic device for the first time and when a corresponding operation is performed, the prompt information mentioned in this application document may be directly displayed on the display to provide a prompt for the user.

Figure 17A:
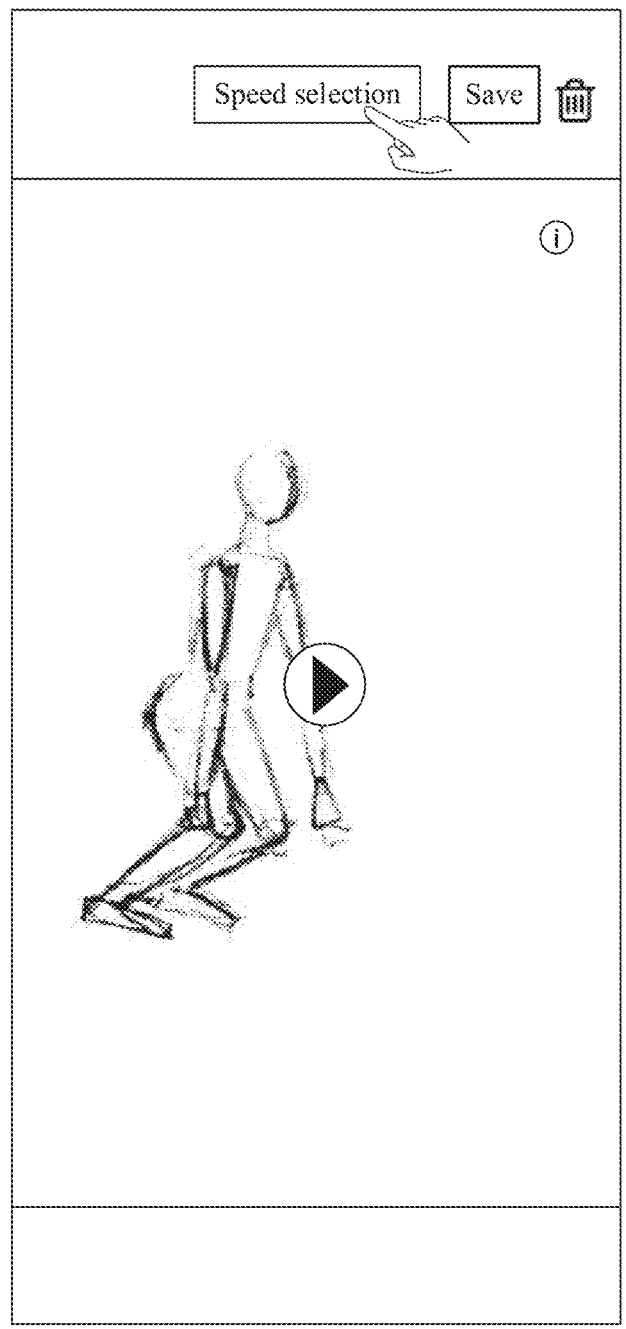
FIG. 17(a), FIG. 17(b), FIG. 17(c), and FIG. 17(d) are a schematic diagram of a group of display interfaces according to an embodiment of this application.
Figure 17B:
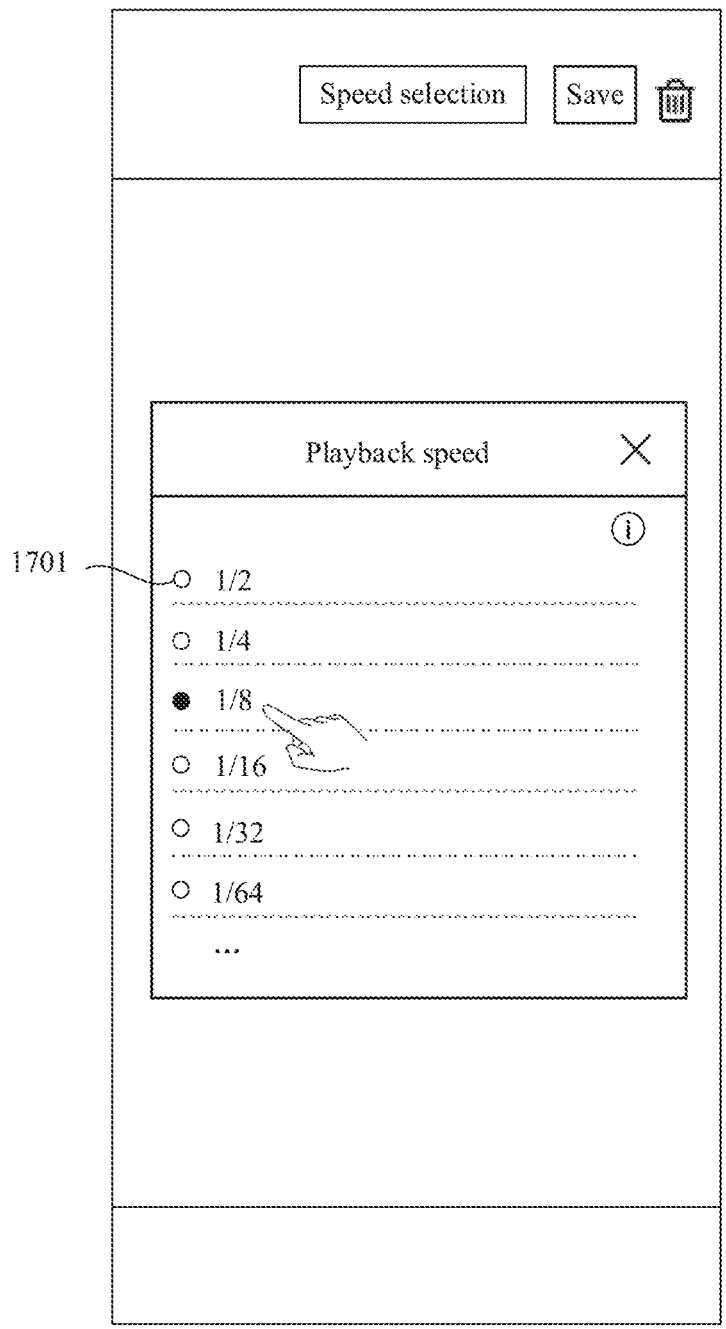
Figure 17C:
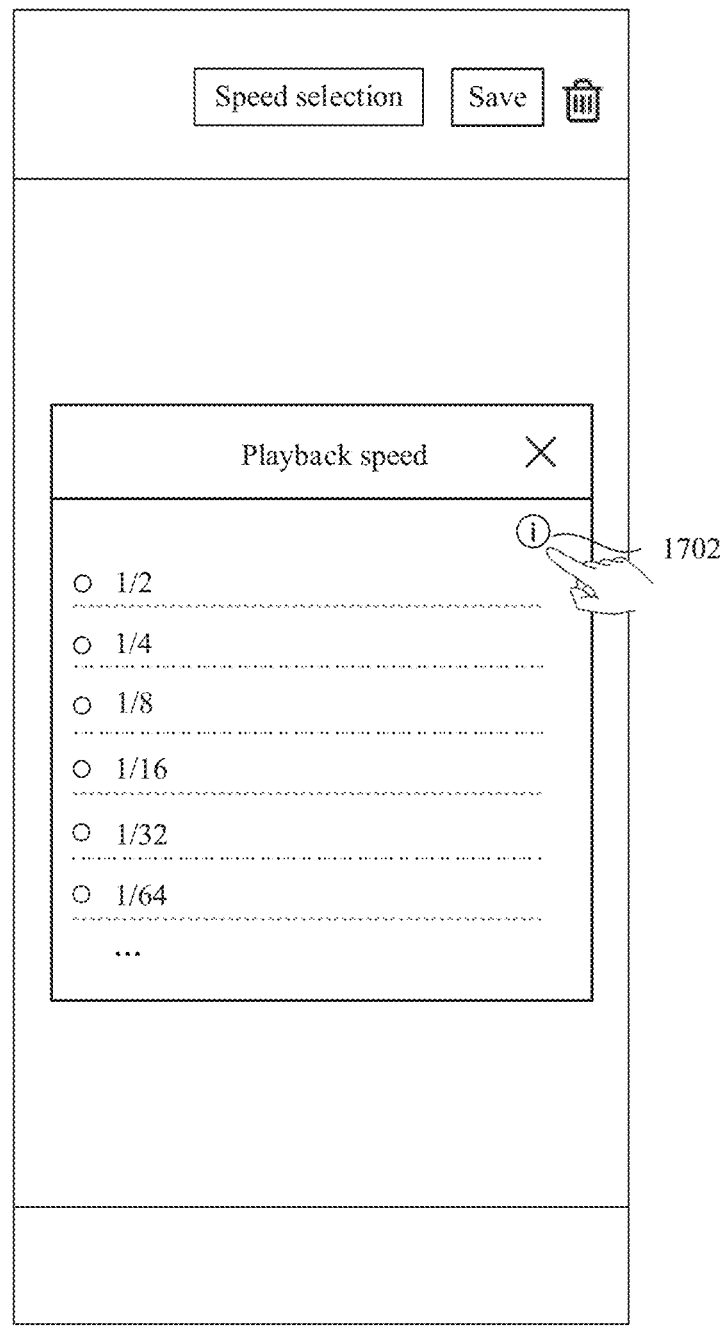
Figure 17D:
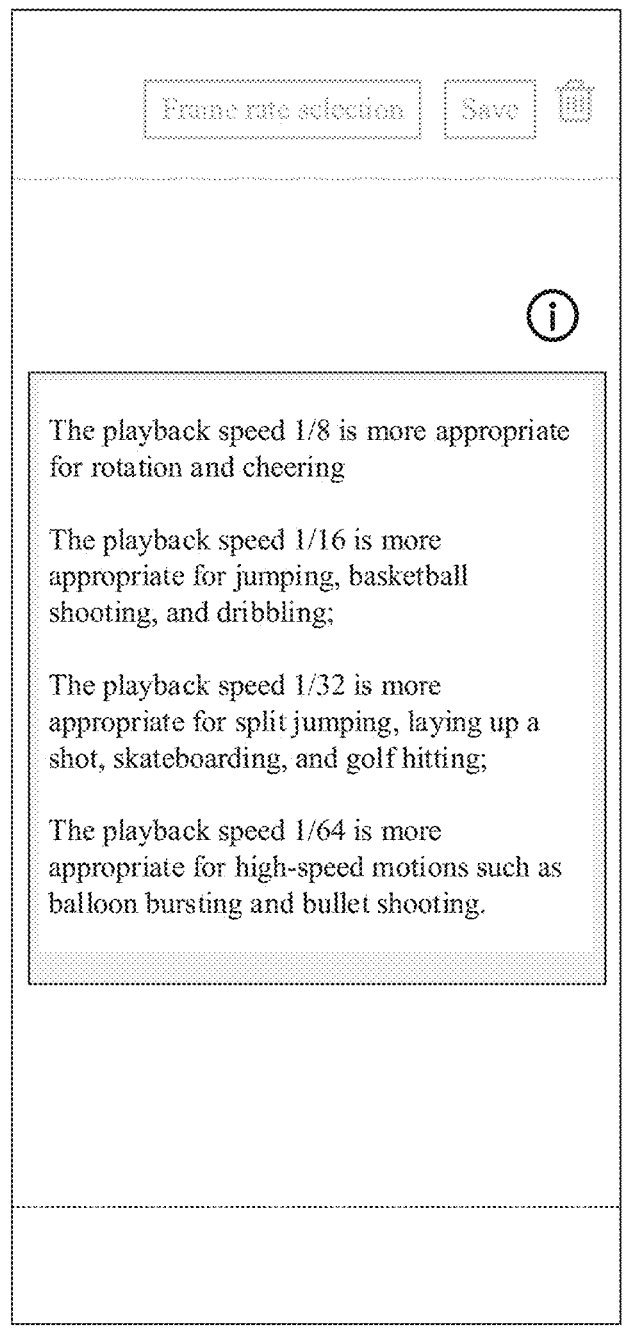

For example, as shown in FIG. 17(a), the user taps the speed selection control, and a GUI shown in FIG. 17(b) is displayed. The GUI includes controls 1701 for selecting different playback speeds, for example, ½, ¼, ⅛, and 1/16. ½ represents a speed that is ½ of an original motion speed of a shot object, and ¼ represents a speed that is ¼ of an original motion speed of a shot object. The user may select a speed different from an original motion speed of a shot object to generate a new slow-motion video. As shown in FIG. 17(c), the GUI may further include a control 1702 for providing a prompt for the user. After the user taps the control 1702, a GUI shown in FIG. 17(d) is displayed. The GUI displays prompt information to indicate frame rates more appropriate for different motions to the user. For example, a playback speed ⅛ is more appropriate for rotation and cheering; a playback speed 1/16 is more appropriate for jumping, basketball shooting, and dribbling; a playback speed 1/32 is more appropriate for split jumping, laying up a shot, skateboarding, and golf hitting; and a playback speed 1/64 is more appropriate for high-speed motions such as balloon bursting and bullet shooting. Therefore, the user may select a more appropriate frame rate to generate a slow-motion video.

Figure 18A:
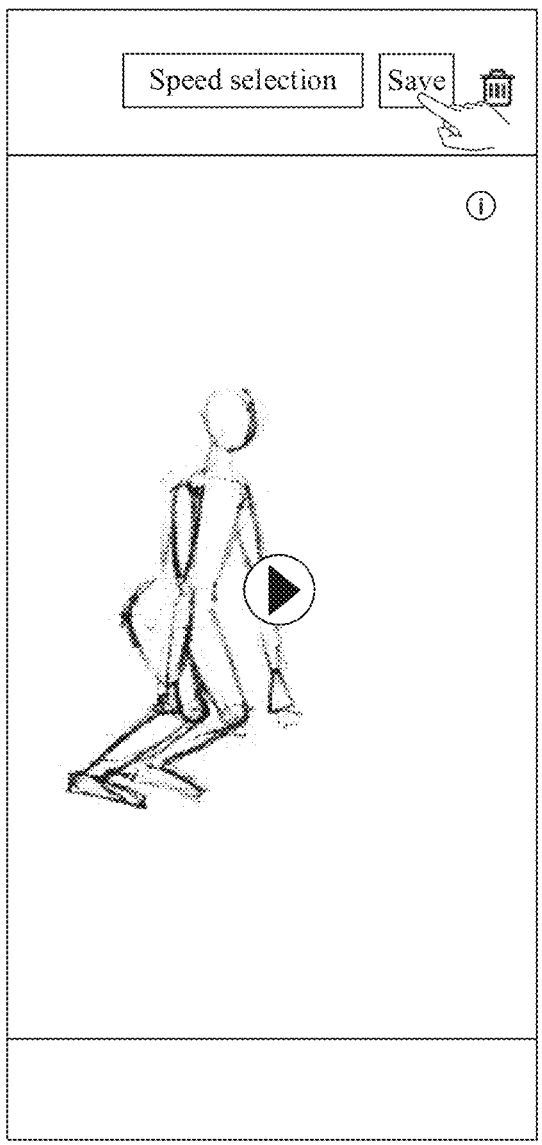
FIG. 18(a) and FIG. 18(b) are a schematic diagram of another group of display interfaces according to an embodiment of this application.
Figure 18B:
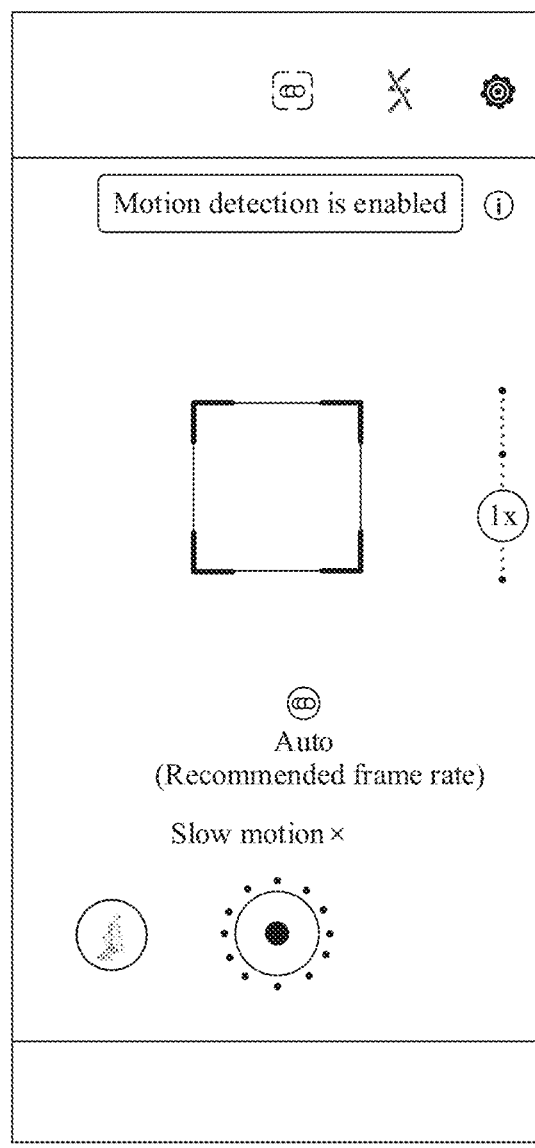

For example, as shown in a GUI in FIG. 18(a), the user may tap the storage control to store the slow-motion video in the gallery, and a GUI shown in FIG. 18(b) is displayed. In this case, the slow-motion video is stored, in a form of a small image, in a control for associating with the gallery.

In a possible implementation, in the auto mode, the electronic device may generate a slow-motion video at a recommended frame rate, and store the slow-motion video in the gallery. The electronic device can achieve a slow-motion effect corresponding to a higher frame rate by using a frame interpolation method and achieve a slow-motion effect corresponding to a lower frame rate through frame extraction.

Figure 19A:
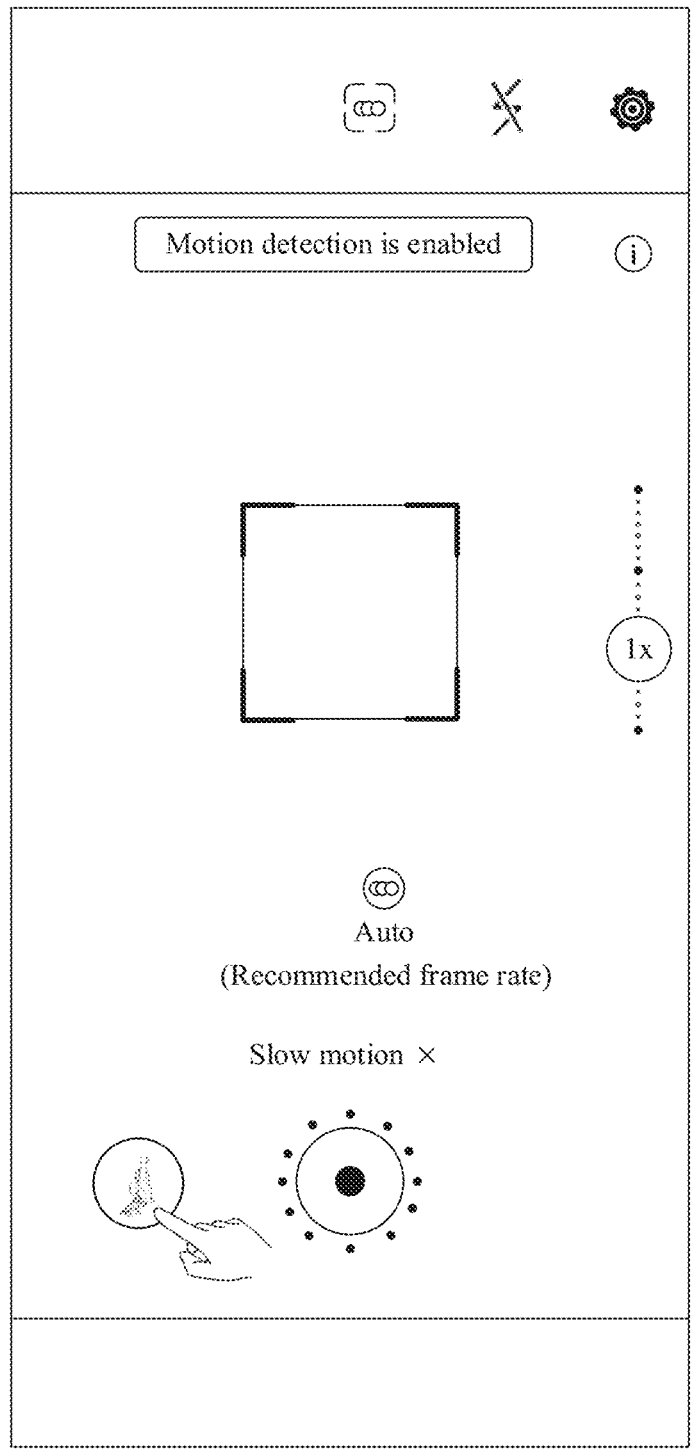
FIG. 19(a), FIG. 19(b), FIG. 19(c), and FIG. 19(d) are a schematic diagram of another group of display interfaces according to an embodiment of this application.
Figure 19B:
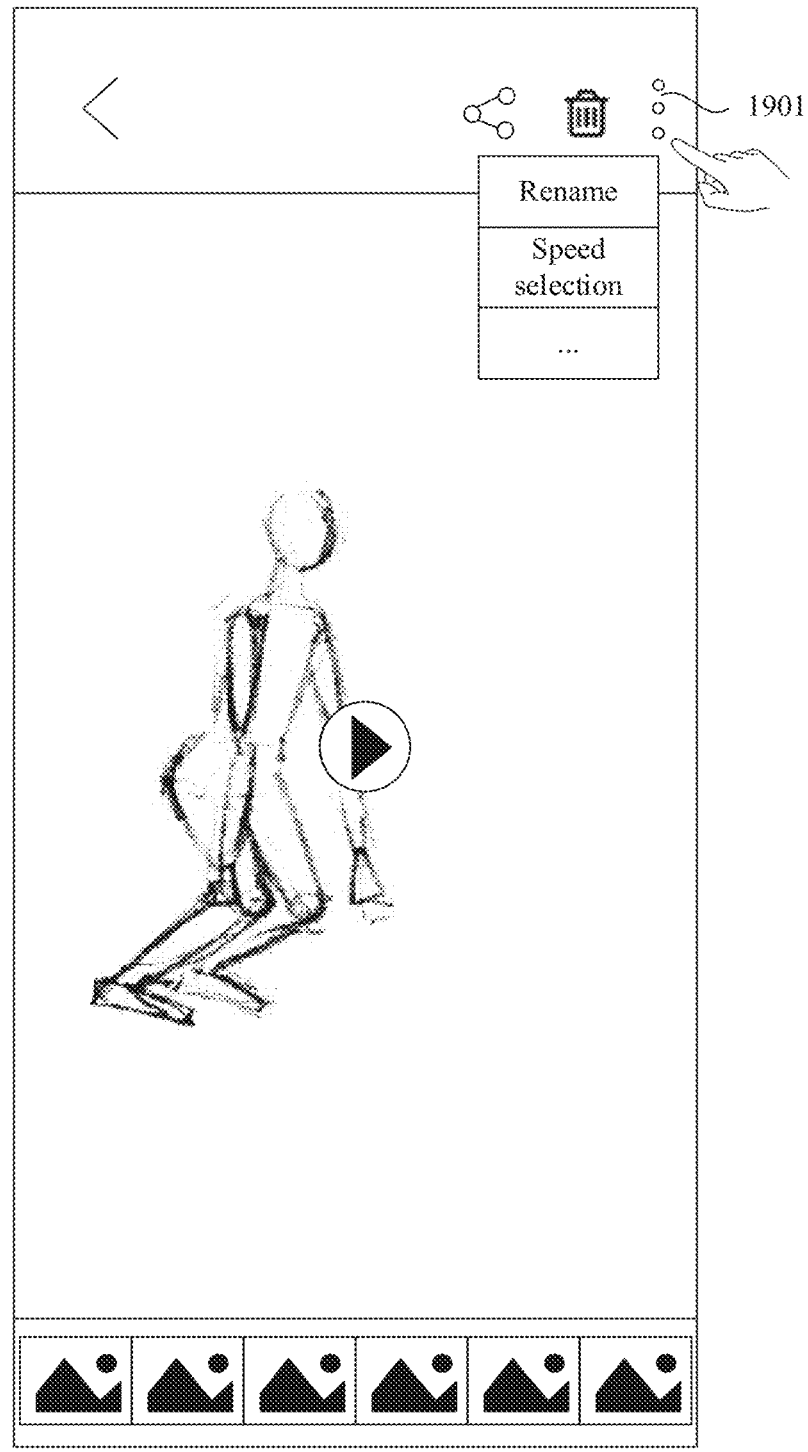
Figure 19C:
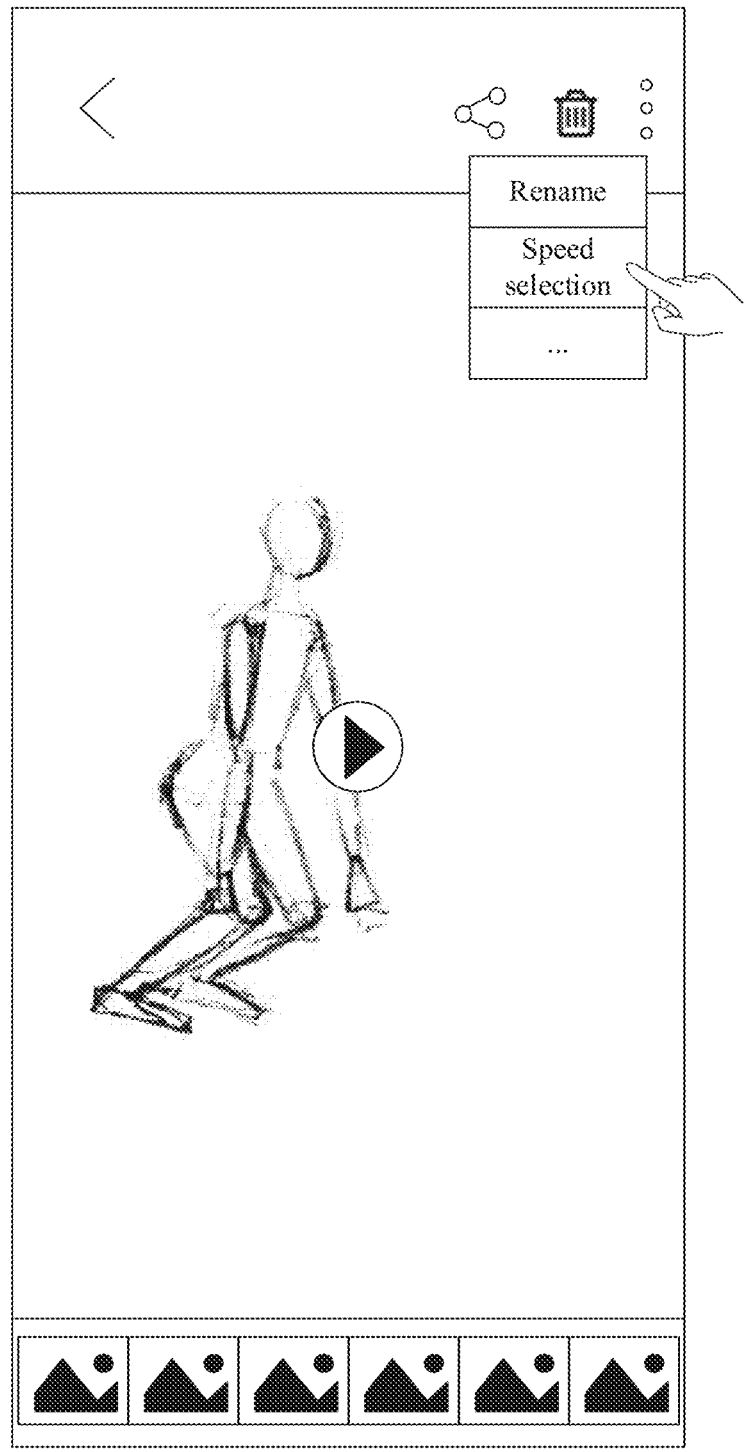
Figure 19D:
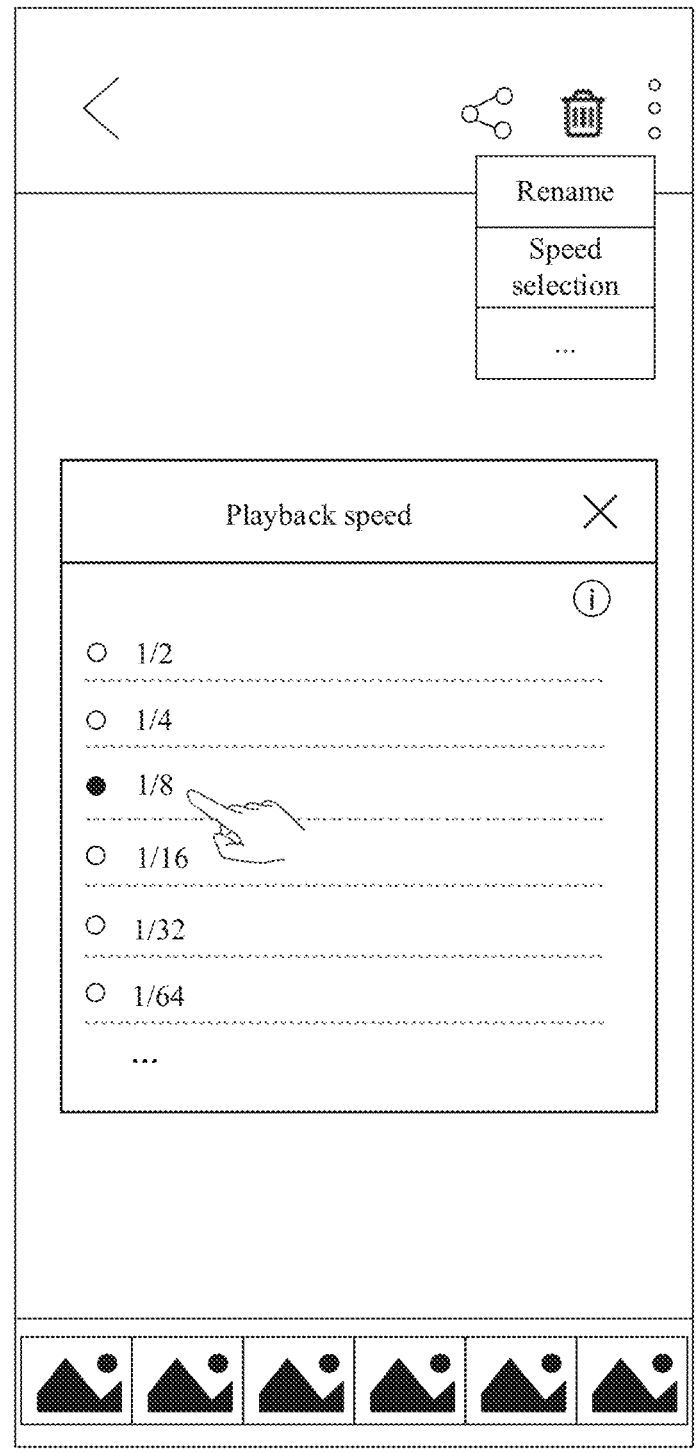
Figure 20A:
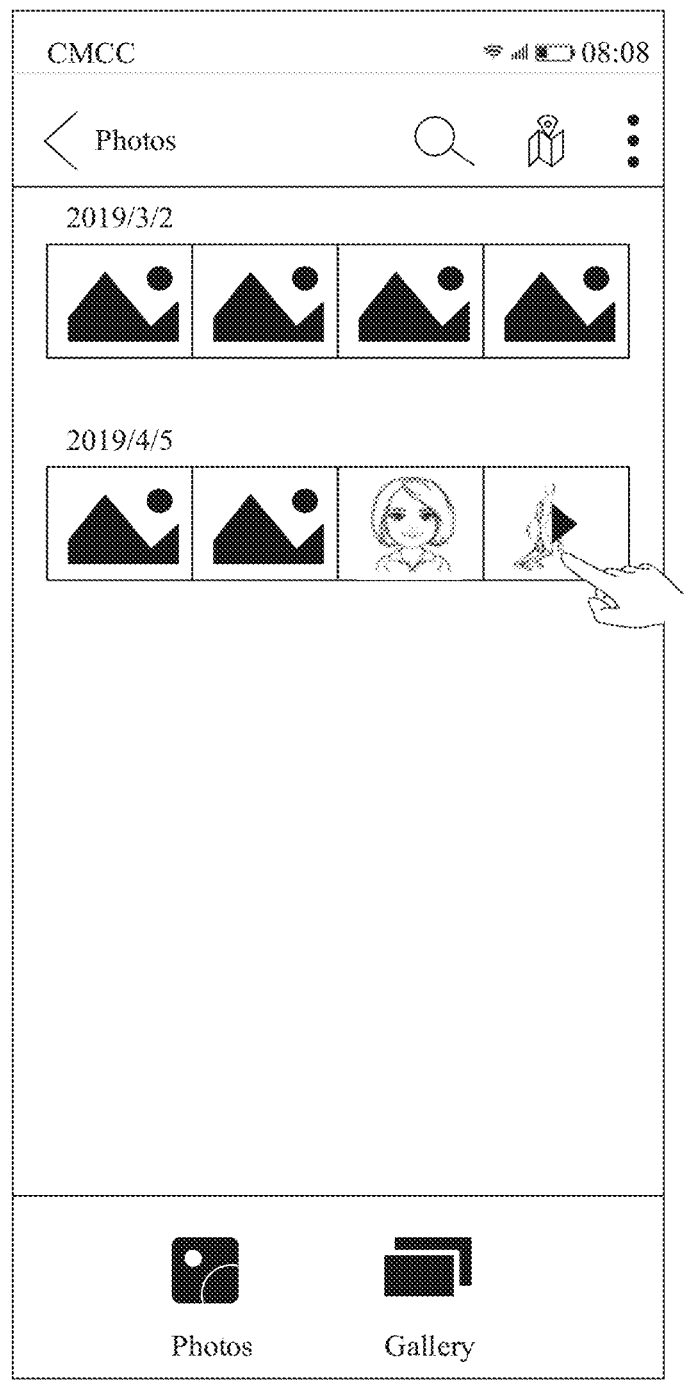
FIG. 20(a), FIG. 20(b), FIG. 20(c), and FIG. 20(d) are a schematic diagram of another group of display interfaces according to an embodiment of this application.
Figure 20B:
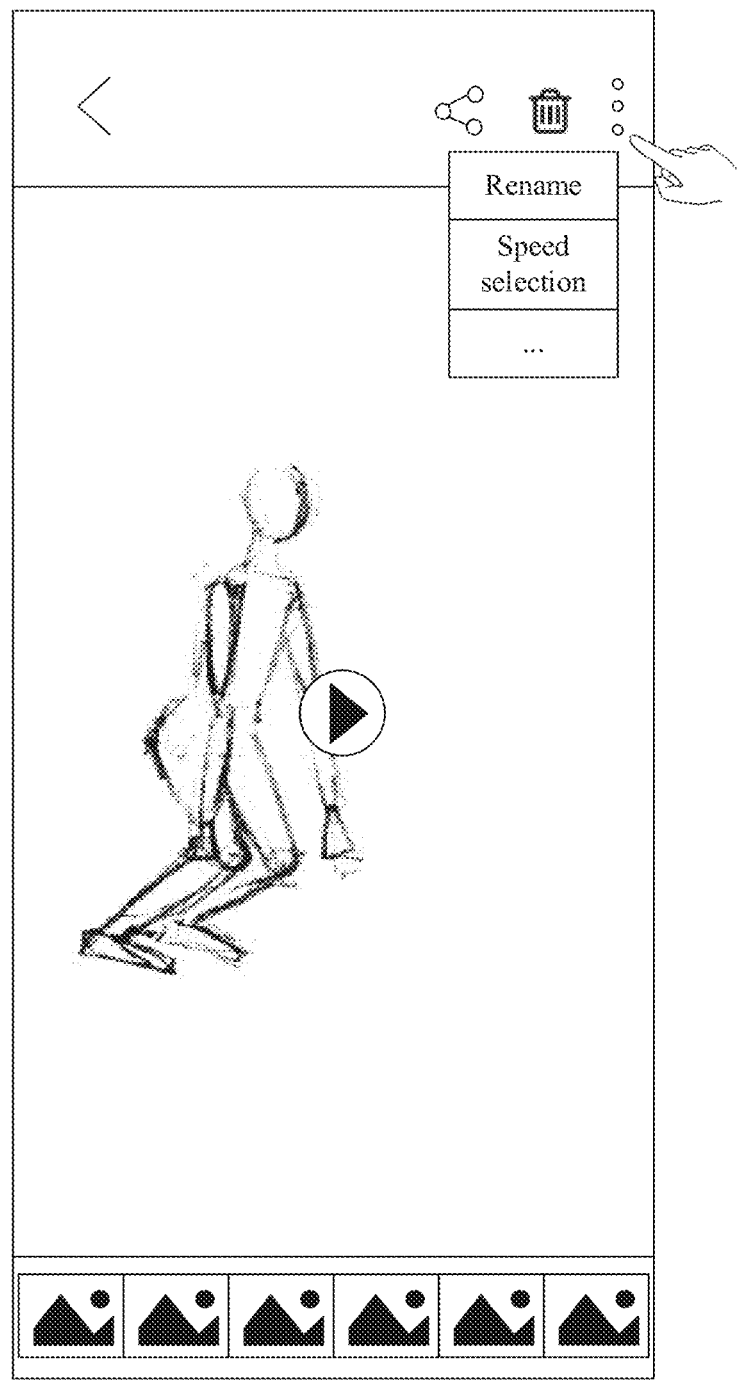
Figure 20C:
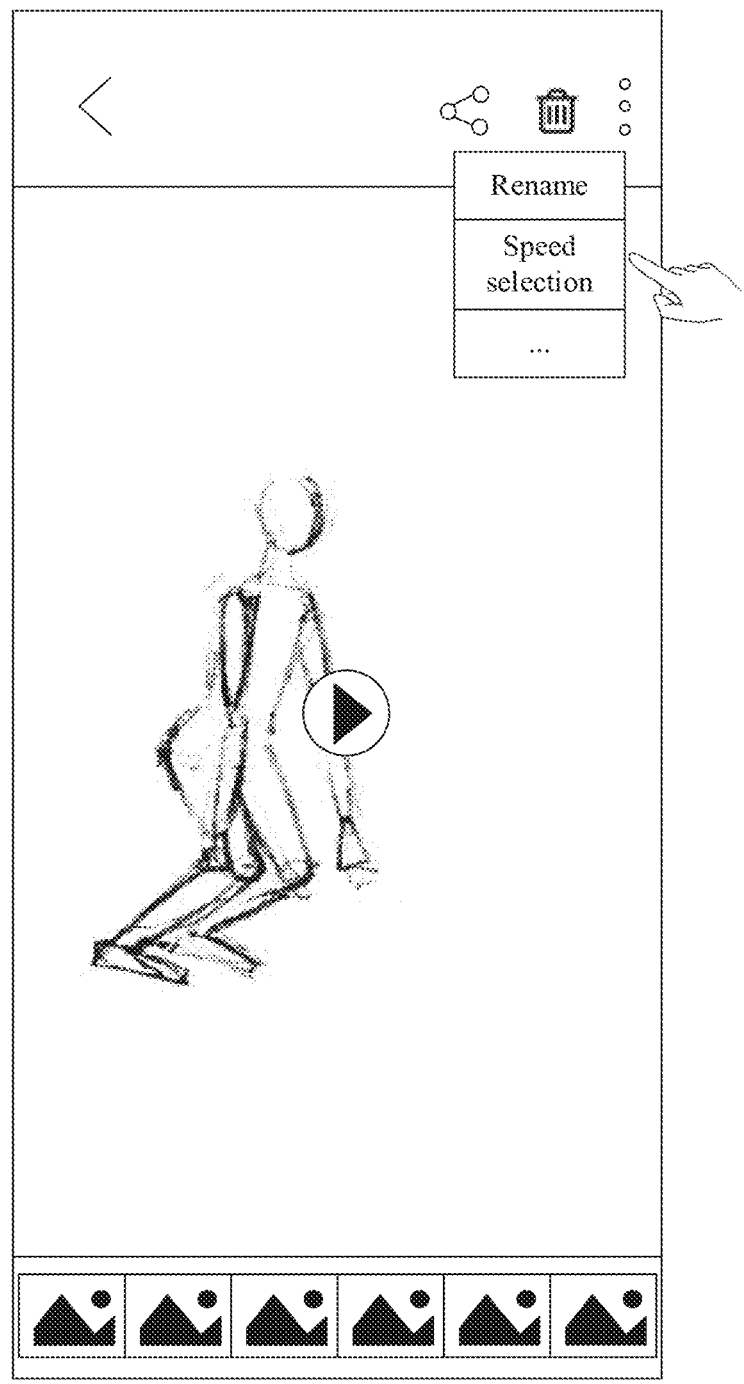
Figure 20D:
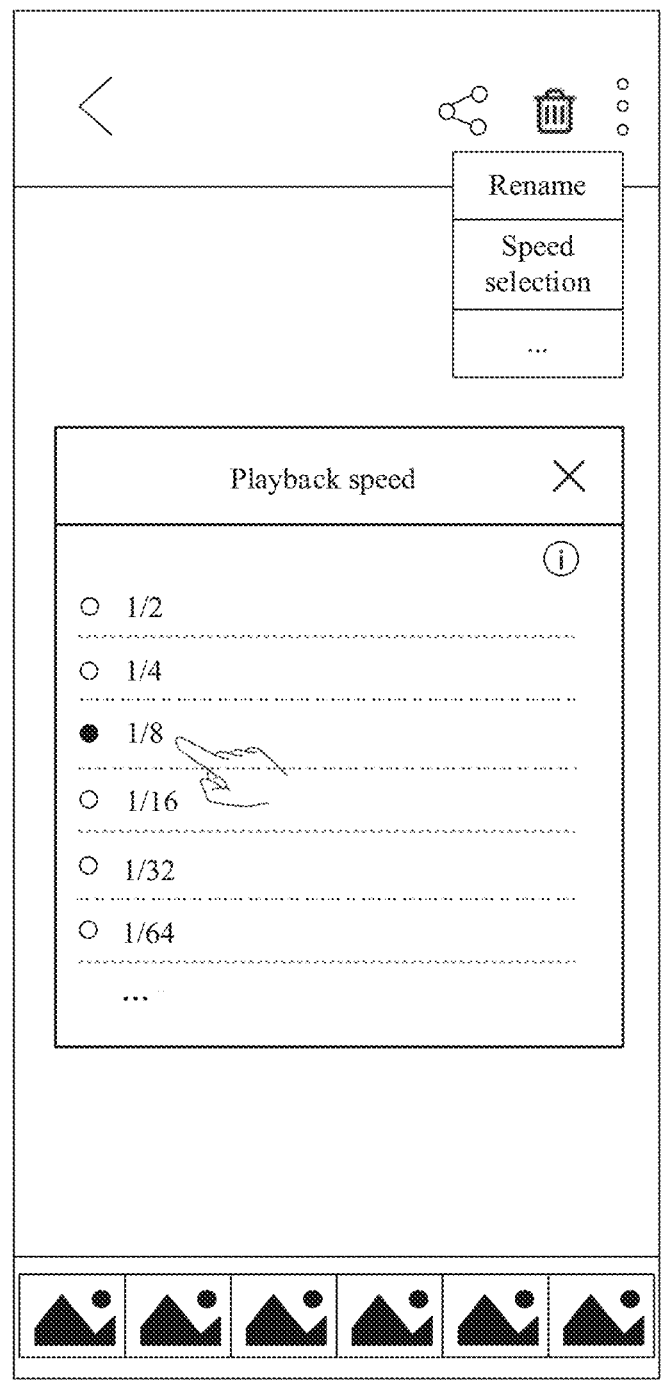

For example, after shooting a slow-motion video, the electronic device stores the slow-motion video in the gallery, and displays a GUI shown in FIG. 19(a). The user may tap the control for associating with the gallery in the preview interface, to view the shot slow-motion video, and a GUI shown in FIG. 19(b) is displayed. As shown in FIG. 19(b), the user may tap more controls 1901 to view information about the shot slow-motion video. The controls 1901 include a speed selection control, and the user may select a playback speed to change the shot slow-motion video. For example, as shown in a GUI in FIG. 19(c), the user taps the speed selection control, and a GUI shown in FIG. 19(d) is displayed. In this case, the user may select a playback speed to generate a new slow-motion video.

In an embodiment, as shown in FIG. 20(a), FIG. 20(b), FIG. 20(c), and FIG. 20(d), the user may alternatively view the shot slow-motion video by using the gallery, and perform speed selection to change a slow-motion playback effect.

Figure 21C:
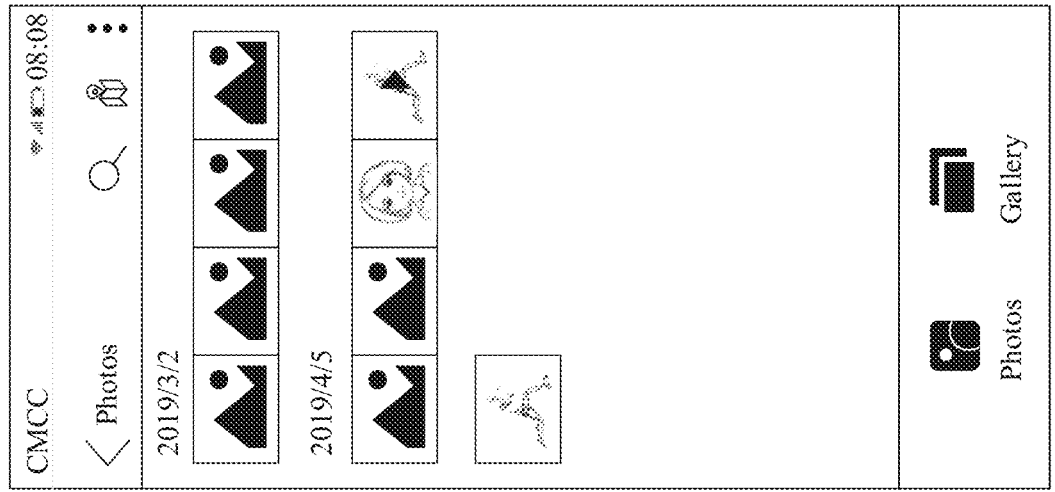
FIG. 21(a), FIG. 21(b), and FIG. 21(c) are a schematic diagram of another group of display interfaces according to an embodiment of this application.
Figure 21B:
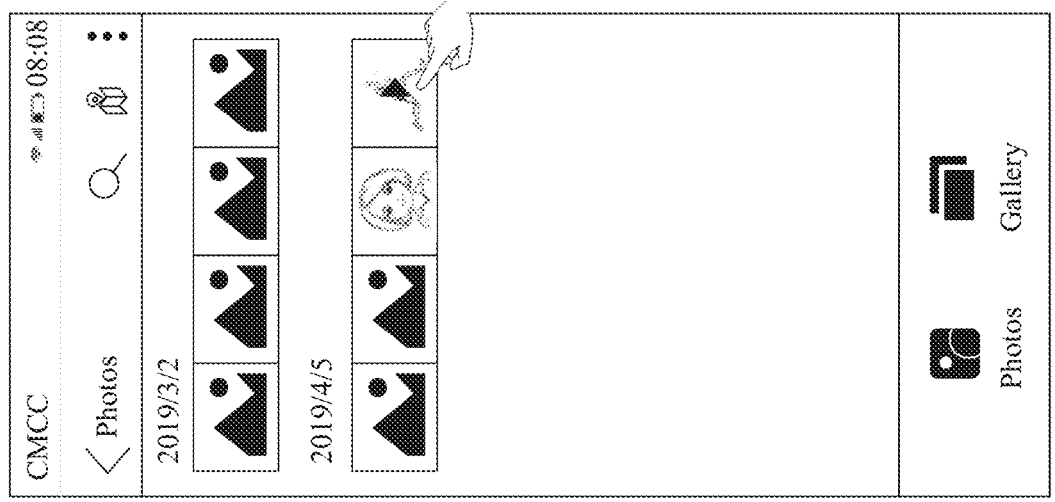
Figure 21A:
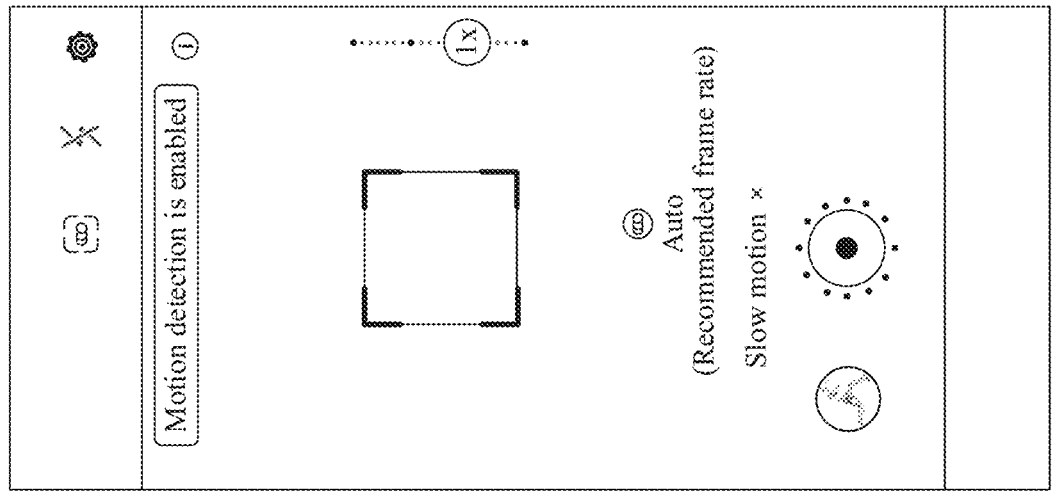

In another embodiment, the electronic device may perform dynamic rating on a selected slow-motion range for frame selection. A top rated video frame in a slow-motion process is selected as an optimal frame and stored in the gallery. Alternatively, the video frame may be used as a cover of a slow-motion video. In this embodiment, a dynamic rating module is preset in the electronic device. After selecting the slow-motion range, the electronic device may dynamically load a rating configuration parameter for each frame of image in the slow-motion range. For example, basketball shooting focuses more on an arm lifting angle; and for jumping, a body jumping height and a leg bending angle have larger rating weights. Based on this, the electronic device performs rating on the entire section of motion frames, and selects a top rated frame as the optimal frame. The selected optimal frame may be stored in the gallery alone or may be used as a cover of a slow-motion video. FIG. 12(a), FIG. 12(b), FIG. 12(c), FIG. 12(d), and FIG. 12(e) are still used as an example. The user records, by using the intelligent automatic slow-motion function, a video in which a good friend jumps while running. After recording is completed, a GUI shown in FIG. 21(a) is displayed. The electronic device analyzes video frames in a slow-motion range to obtain an optimal video frame, uses the optimal frame as a cover of the slow-motion video, and stores, in a form of a small image, the optimal frame in a control that is on the preview interface and that is used for associating with the gallery. When the user enables the gallery, an interface shown in FIG. 21(b) may be displayed, and the optimal frame as the cover of the slow-motion video is stored in the gallery together with the slow-motion video. Alternatively, an interface shown in FIG. 21(c) may be displayed, and the optimal frame and the slow-motion video are separately stored in the gallery.

For example, the optimal frame may alternatively be selected in a manner such as template matching. A method for selecting the optimal frame is not limited in this application document.

Figure 22:
FIG. 22 is a schematic diagram of generating a motion track image of a human body according to an embodiment of this application.

In an embodiment, a human body image segmentation network model may be preset in the electronic device, and the electronic device may perform image segmentation on a human body motion in a slow-motion range. After the human body motion is recognized, the electronic device separates each of human body images and a background in recorded video frames from each other, and segments the subject human body images from all the video frames to generate a motion track image of a human body. For example, as shown in FIG. 22, a motion track image of a human body may be used as a cover of a slow-motion video, or may be separately stored in the gallery.

In another embodiment, after triggering slow-motion video recording, the electronic device may recommend a slow-motion range to the user. A video in the recommended slow-motion range may be encoded to generate a slow-motion effect, normal-speed videos may be generated outside the range through frame extraction, and a "fast-slow-fast" video is finally generated and stored in the gallery.

In a conventional technology, after slow-motion video recording is triggered, slow-motion processing is usually performed on a fixed-duration range in the middle of a recorded video to generate a slow-motion video. In this embodiment of this application, the electronic device may perform motion recognition on a shot object, recognize a start frame and an end frame of a human body motion (for example, jumping, basketball shooting, or rotation) in a recorded video, and perform slow-motion processing on video frames in a motion range.

Figure 12D:
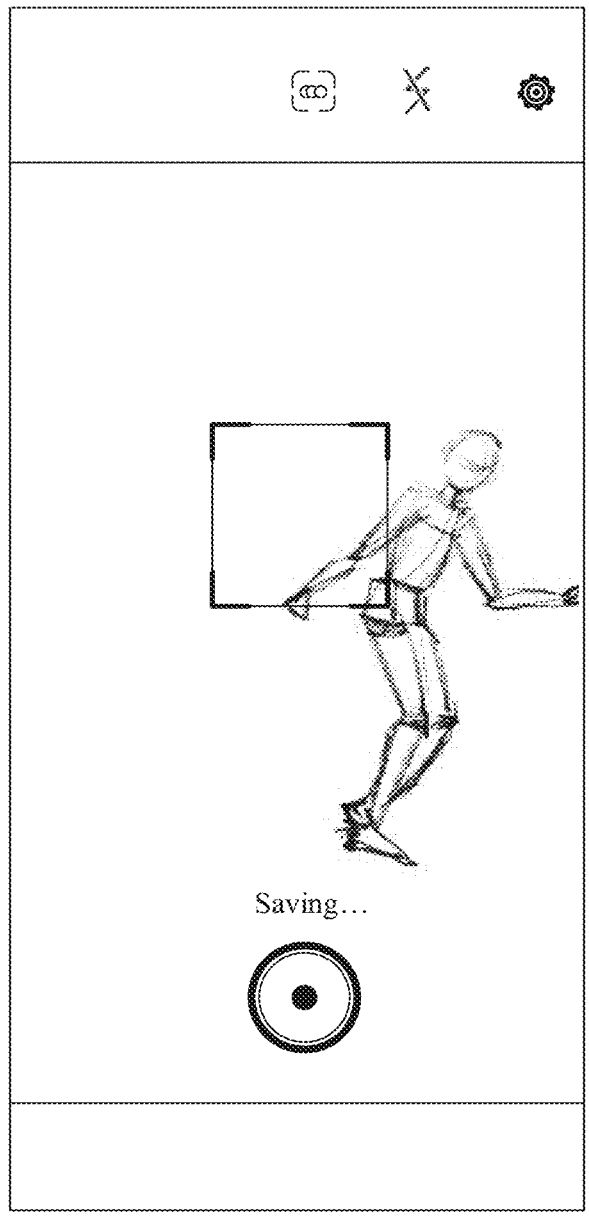

FIG. 12(a), FIG. 12(b), FIG. 12(c), FIG. 12(d), and FIG. 12(e) are still used as an example for description. The user records, by using the intelligent automatic slow-motion function of the electronic device, the scenario in which a good friend suddenly jumps while running. When shooting is completed, a GUI shown in FIG. 12(d) is displayed, and displays "saving". In this case, the electronic device may process a buffered video by using a preset software processing module, and recommend a slow-motion range to the user. In a slow-motion recording process, the electronic device may obtain joint information of the human body by using the preset key point detection model; and then obtain a motion type by using the motion detection model used to recognize a human body motion, and report the motion type to the software processing module. The electronic device may perform network model training on the software processing module in advance, label start frames and end frames of different human body motions in training samples, and recognize the start frames and the end frames of the different human body motions based on posture change rates of the human body by using a neural network. In this case, video frames between a start frame and an end frame of a human body motion are encoded to obtain a slow-motion video, and the slow-motion video is recommended to the user.

Based on big data statistics, when a human body performs a motion such as jumping, basketball shooting, or ball kicking, at a moment at which the motion occurs, postures of joints of the human body such as a head, hands, and legs change greatly. For example, the legs bend instantaneously when the human body performs jumping; a jumping state of the body and a bending degree of wrists change instantaneously when the human body performs basketball shooting; a body posture is instantaneously shifted to the left or to the right when the human body performs a rotation motion; and a height of a human body posture also changes when the human body performs a jumping or basketball shooting motion. Therefore, a start point of the motion of the human body may be determined by calculating posture change rates of the joints of the human body.

Figure 23:
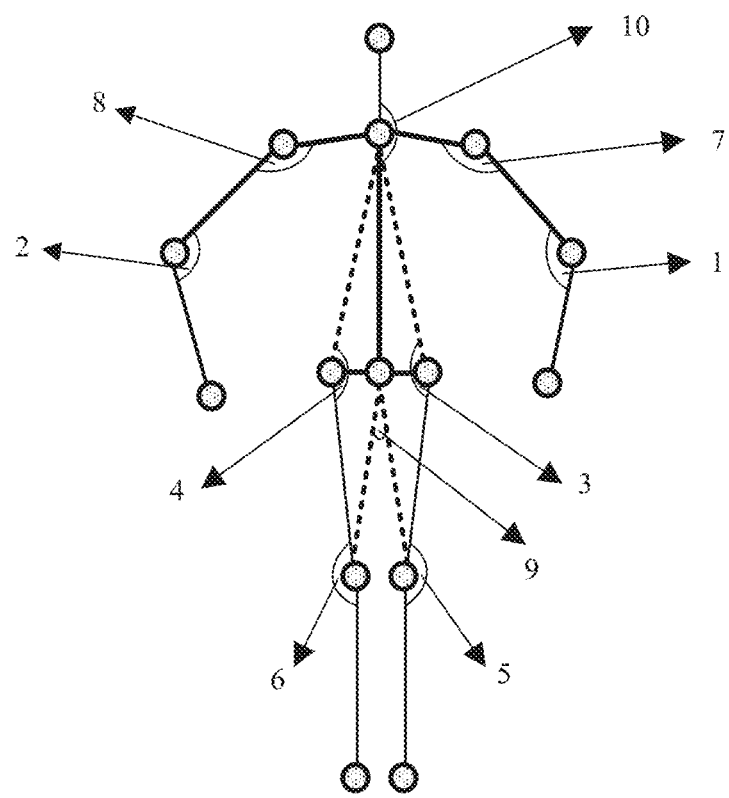
FIG. 23 is a schematic diagram of a human body joint model according to an embodiment of this application.

For example, as shown in FIG. 23, a human body joint model defined based on different parts of a human body such as a head, a neck, shoulders, elbows, wrists, a hip, knees, and ankles and joint angles used determine changes in human body postures are preset in the software processing model. Referring to FIG. 23, 15 joints may be selected from the human body, and 10 joint angles are defined. A joint angle 1 is an included angle formed by a line connecting a left wrist joint and a left elbow joint and a line connecting the left elbow joint and a left shoulder joint, and a joint angle 5 is an included angle formed by a line connecting a left ankle joint and a left knee joint and a line connecting the left knee joint and a left hip joint. By calculating a ratio of an angle change of each of the 10 included angles between two adjacent frames of images to a time interval between the two adjacent frames, a posture change rate corresponding to each joint angle can be obtained. For some human body motions such as basketball shooting and jumping, posture heights of the human body also need to be considered. Therefore, a result obtained by weighting the posture change rates corresponding to the 10 joint angles and a posture height change rate of the human body in each frame may be used as a posture change rate of a current frame.

A posture change rate corresponding to each joint angle of the human body varies greatly with a human body posture. Therefore, for different motions, different weight values may be assigned to a joint angle of the human body. For example, a person pays more attention to a posture change of legs of the human body when jumping, and higher weight values may be assigned to an angle 3, an angle 4, the angle 5, an angle 6, and a human body height; while the person pays more attention to a posture of upper arms of the person during basketball shooting, and higher weight values may be assigned to the angle 1, an angle 2, and a human body height. In addition, for a same human body motion, posture change rates corresponding to each joint angle of the human body at the beginning of the motion and at the end of the motion are also quite different. Therefore, weights of different joint angles at the beginning of the motion and at the end of the motion are also different.

Start frames and end frames may be defined for different human body motions in advance. Then, weight values of all joint angles of the different motions in the start frames and the end frames may be obtained through network training; or weight values of all joint angles of the different human body motions in the start frames and the end frames may be obtained from large data statistics. In this way, a posture change rate output of each frame of picture can be obtained by using the weight values and the posture change rates corresponding to the joint angles.

Figure 24A:
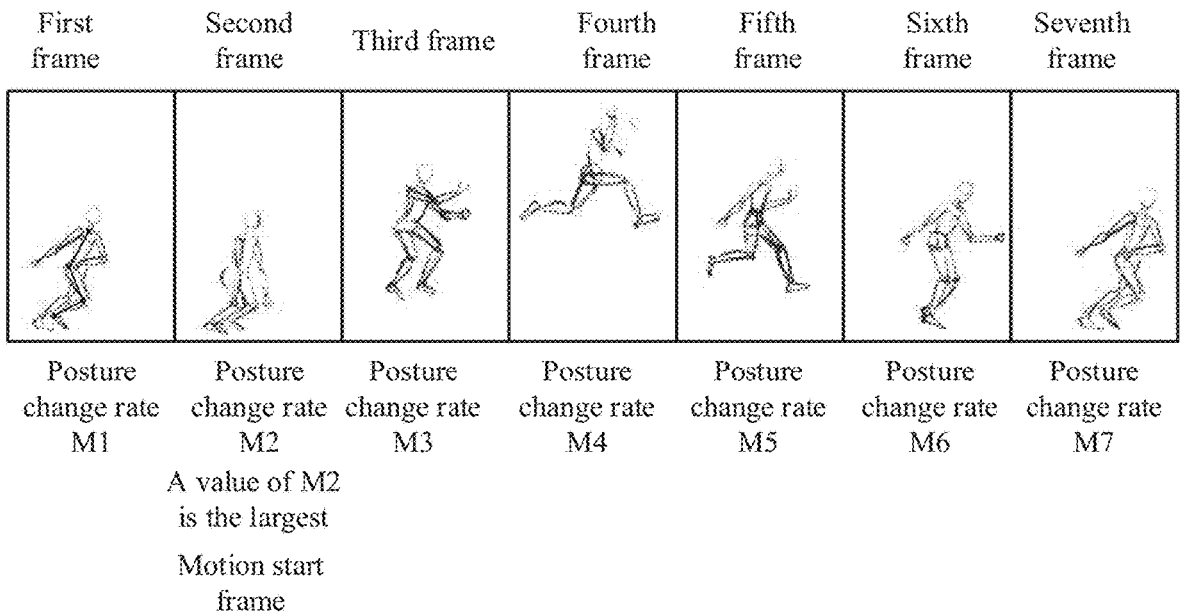
FIG. 24A is a schematic diagram of recognizing a motion start frame of a human body according to an embodiment of this application.
Figure 24B:
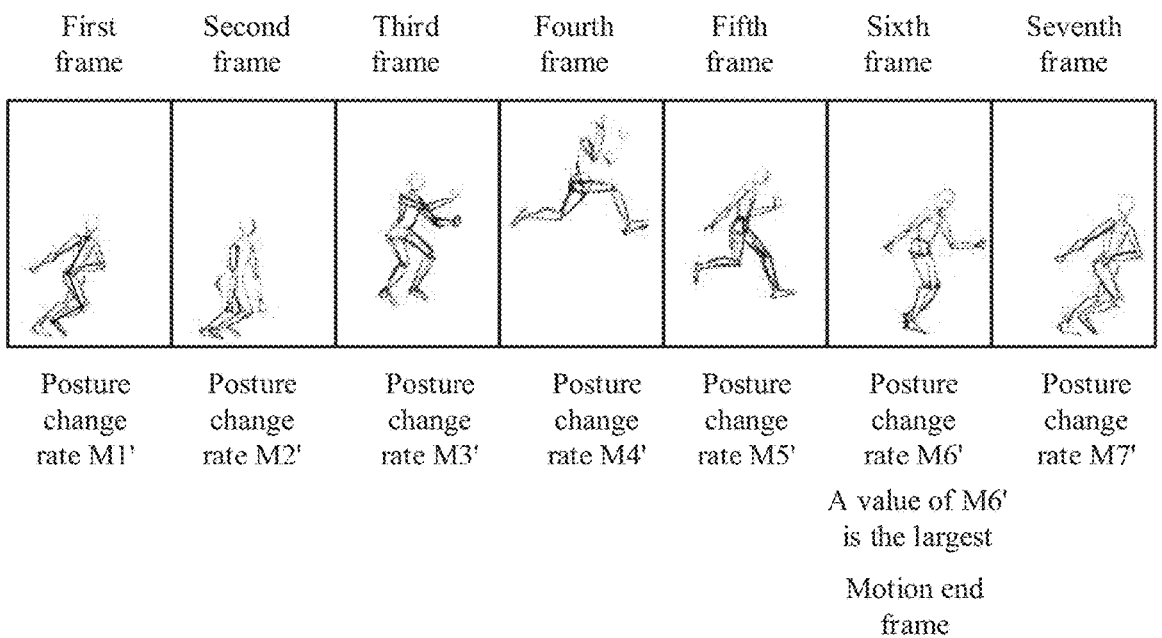
FIG. 24B is a schematic diagram of recognizing a motion end frame of a human body according to an embodiment of this application.

For example, as shown in FIG. 24, the electronic device may perform frame extraction on a buffered video to obtain seven video frames. In this case, the electronic device has already learned that a motion of a human body in the video frames is "jumping". When the electronic device reads a start frame of the "jumping" motion by using a preset value, weights of 10 joint angles are respectively $a_1, a_2, \ldots,$ and $a_{10}$, and a weight of a human body height is $a_{11}$. The electronic device may learn, through real-time calculation, that posture change rates corresponding to the 10 joint angles of the human body in the $i^{th}$ frame of image are respectively $n_{i1}, n_{i2}, \ldots,$ and $n_{i10}$, and a height change rate is $n_{i11}$. In this case, the electronic device may calculate a posture change rate $M_i$ of the $i^{th}$ frame of image: $M_i = a_1 n_{i1} + a_2 n_{i2} + a_3 n_{i3} + \ldots + a_{10} n_{i10} + a_{11} n_{i11}$ (i=1, 2, 3 . . . ). A posture change rate output of the first frame of image is $M_1$, a posture change rate output of the second frame of image is $M_2, \ldots,$ and a posture change rate output of the seventh frame of image is $M_7$. It is determined that a value of $M_2$ is the largest. Therefore, referring to FIG. 24(a), the second frame of image is a motion start frame. Likewise, when the electronic device reads an end frame of the "jumping" motion by using a preset value, weights of the 10 joint angles are respectively $b_1, b_2, \ldots,$ and $b_{10}$, and a weight of the human body height is $b_{11}$. Similarly, it is learned through weighted calculation that, a posture change rate output of the first frame of image is $M_1'$, a posture change rate output of the second frame of image is $M_2', \ldots,$ and a posture change rate output of the seventh frame of image is $M_7'$. It is determined that a value of $M_6'$ is the largest. Therefore, referring to FIG. 24(b), the sixth frame of image is a motion end frame.

Figure 12E:
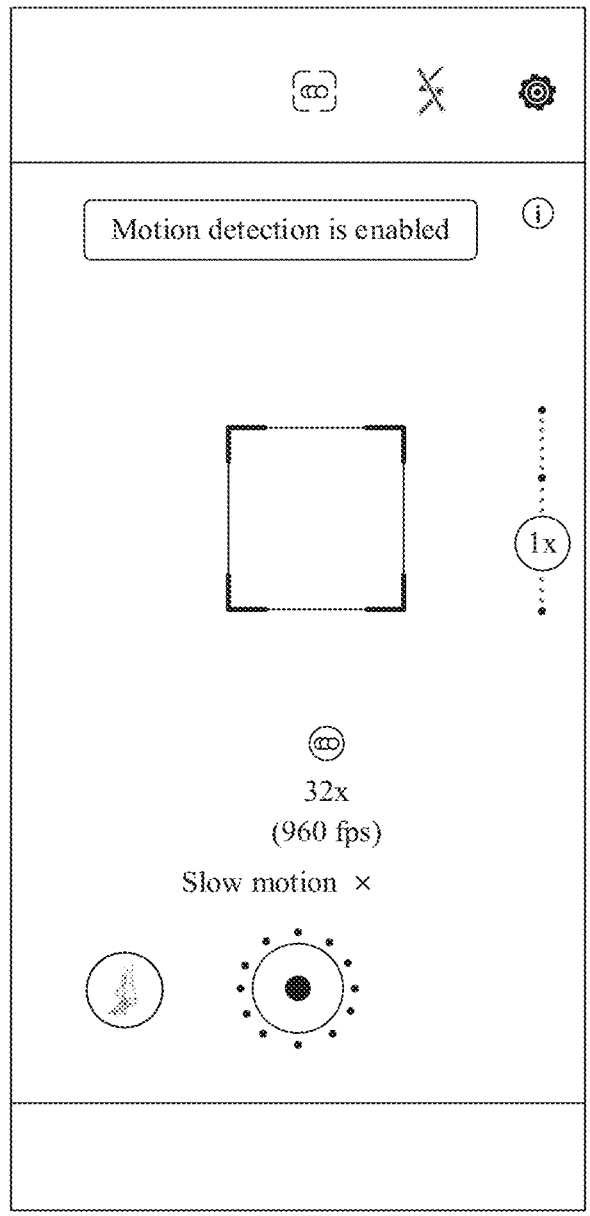

Therefore, when processing the buffered recorded video the electronic device may determine the start frame and the end frame of the human body motion by using the posture change rates of the human body. Once it is detected that a motion is started, a current frame is labeled as a start frame of the motion; and when it is detected that the motion is ended, a current frame is labeled as an end frame of the motion. The start frame and the end frame correspond to a start frame and an end frame of a slow-motion range. Video frames in the slow-motion range may be encoded to generate a slow-motion video, and video frames outside the slow-motion range may be used to generate normal-speed videos by performing frame extraction on buffered video frames; and finally a slow-motion video in a form of "fast-slow-fast" is generated and stored in the gallery. A GUI shown in FIG. 12(e) is displayed.

Figure 25A:
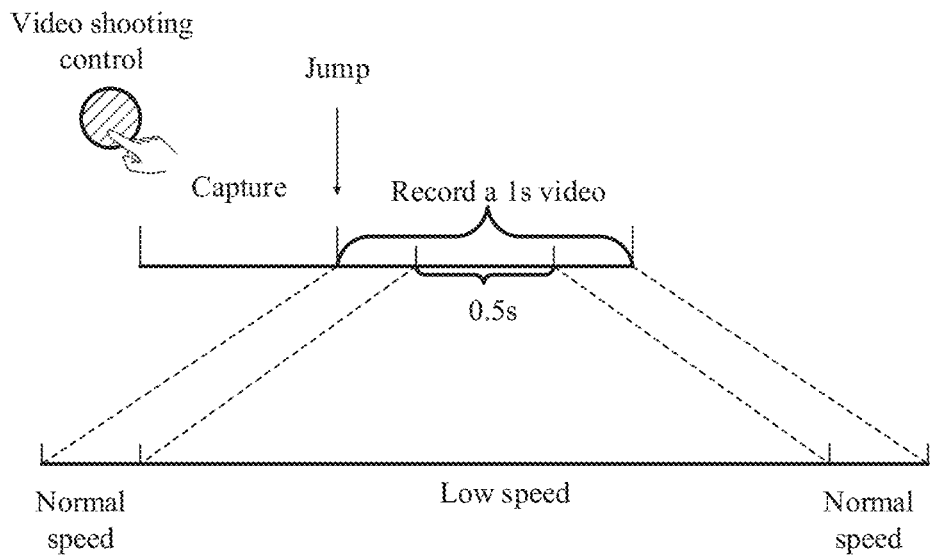
FIG. 25A is a schematic diagram of a process of automatically generating a slow-motion video based on a first preset motion of a human body according to an embodiment of this application.
Figure 25B:
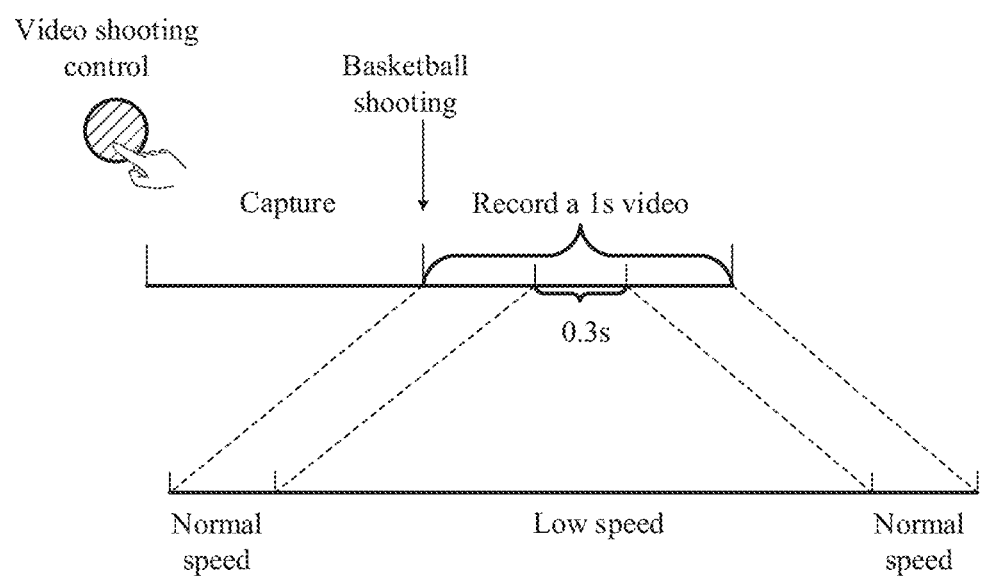
FIG. 25B is a schematic diagram of a process of automatically generating a slow-motion video based on a second preset motion of a human body according to an embodiment of this application.

In this embodiment, after the user taps a video shooting control, the electronic device may capture video frames in the preview window; and perform human body motion type recognition on the captured video frames; and automatically triggers slow-motion video recording when recognizing a human body motion. In a possible implementation, after automatically triggering slow-motion video recording, the electronic device may record a video with is fixed duration, and find a motion start frame and a motion end frame of the human body motion from the 1 s video to generate a slow-motion video clip; and may generate, outside a slow-motion range, 1 s normal-speed videos by performing frame extraction on the buffered video frames. As shown in FIG. 25A, after the user taps the video shooting control, a frame rate is, for example, 960 fps. The electronic device may capture video frames in the preview window in real time. Assuming that a motion of a shot human body in this case is a jumping motion, the electronic device records a 1 s video at 960 fps. By determining a start point and an end point of the motion, it is found that the start point and the end point are in the 1 s video, and duration of a motion range is 0.5 s. In this case, video frames corresponding to the 0.5 s motion range are encoded to obtain a low-speed video. Using the encoding rate of 30 fps as an example, a video in a form of "1 s normal speed+0.5×32 s low speed+1 s normal speed=1 s+16 s+1 s=18 s" is generated. As shown in FIG. 25B, after the user taps the video shooting control, a frame rate is, for example, 960 fps. The electronic device may capture video frames in the preview window in real time. Assuming that a motion of a shot human body in this case is a basketball shooting motion, the electronic device records a 1 s video at 960 fps. By determining a start point and an end point of the motion, it is found that the start point and the end point are in the 1 s video, and duration of a motion range is 0.3 s. In this case, video frames corresponding to the 0.3 s motion range are encoded to obtain a low-speed video. If the encoding rate of 30 fps is used as an example, a video in a form of "1 s normal speed+0.3×32 s low speed+1 s normal speed=1 s+9.6 s+1 s=11.6 s" is generated.

Figure 25C:
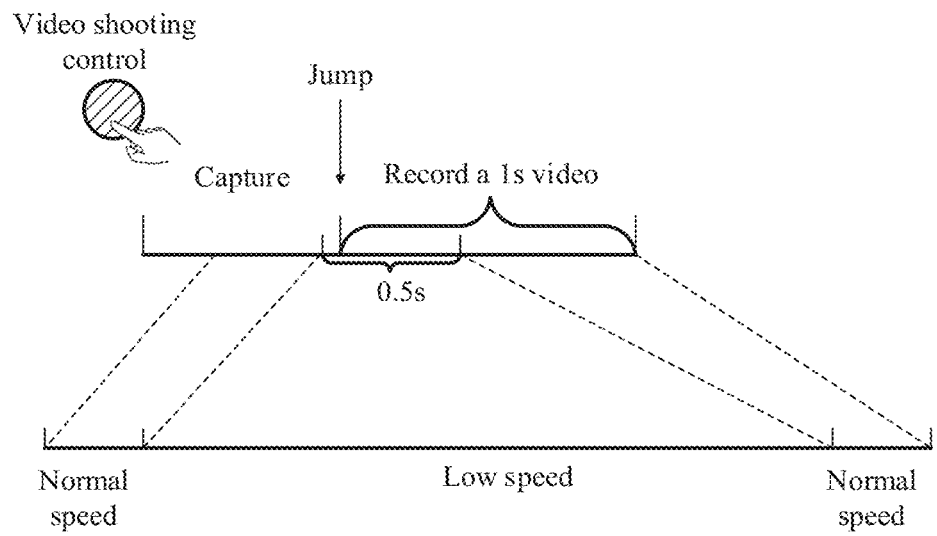
FIG. 25C is a schematic diagram of another process of automatically generating a slow-motion video based on a first preset motion of a human body according to an embodiment of this application.
Figure 25D:
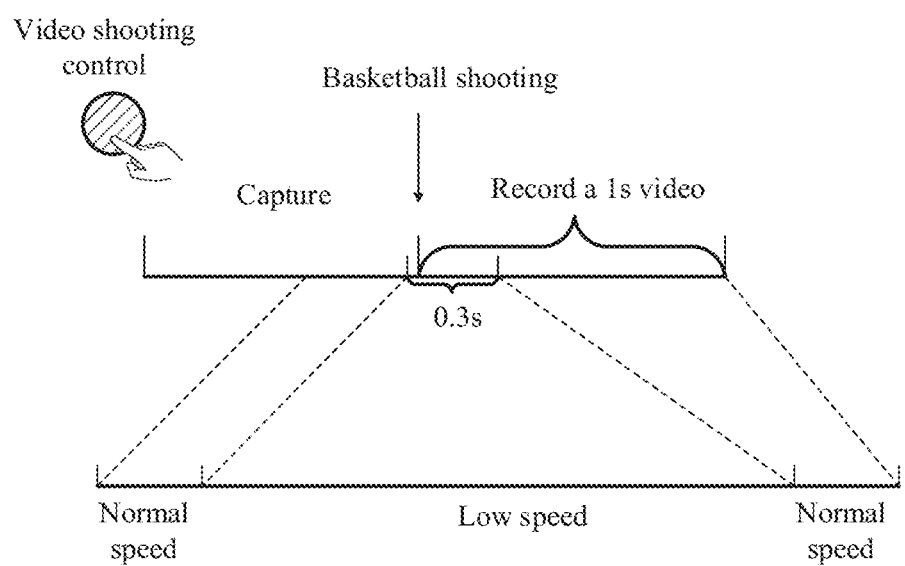
FIG. 25D is a schematic diagram of another process of automatically generating a slow-motion video based on a first preset motion of a human body according to an embodiment of this application.

In a possible implementation, after automatically triggering slow-motion video recording, the electronic device may record a video with 1 s fixed duration, and find a motion start frame and a motion end frame of a human body motion by using video frames captured before slow-motion recording is triggered and video frames recorded after slow-motion recording is triggered. As shown in FIG. 25C, after the user taps the video shooting control, a frame rate is, for example, 960 fps. The electronic device may capture video frames in the preview window in real time. Assuming that a motion of a shot human body in this case is a jumping motion, the electronic device records a 1 s video at 960 fps. By determining a start point and an end point of the motion, it is found that a motion start frame is in video frames captured before video recording is triggered, a motion end frame is in video frames recorded after video recording is triggered, and duration of a motion range is 0.5 s. In this case, video frames corresponding to the 0.5 s motion range are encoded to obtain a low-speed video. Using the encoding rate of 30 fps as an example, a video in a form of "1 s normal speed+0.5× 32 s low speed+1 s normal speed=1 s+16 s+1 s=18 s" is generated. As shown in FIG. 25D, after the user taps the video shooting control, a frame rate is, for example, 960 fps. The electronic device may capture video frames in the preview window in real time. Assuming that a motion of a shot human body in this case is a jumping motion, the electronic device records a is video at 960 fps. By determining a start point and an end point of the motion, it is found that a motion start frame is in video frames captured before video recording is triggered, a motion end frame is in video frames recorded after video recording is triggered, and duration of a motion range is 0.3 s. In this case, video frames corresponding to the 0.3 s motion range are encoded to obtain a low-speed video. Using the encoding rate of 30 fps as an example, a video in a form of "1 s normal speed+0.3× 32 s low speed+1 s normal speed=1 s+9.6 s+1 s=11.6 s" is generated.

Figure 13D:
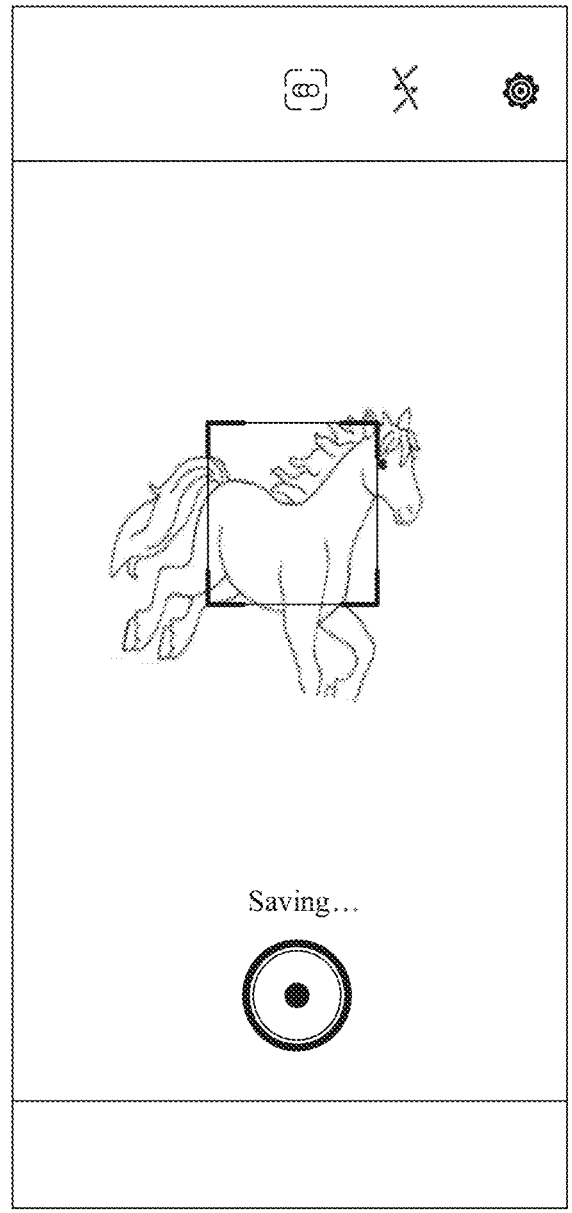
Figure 13E:
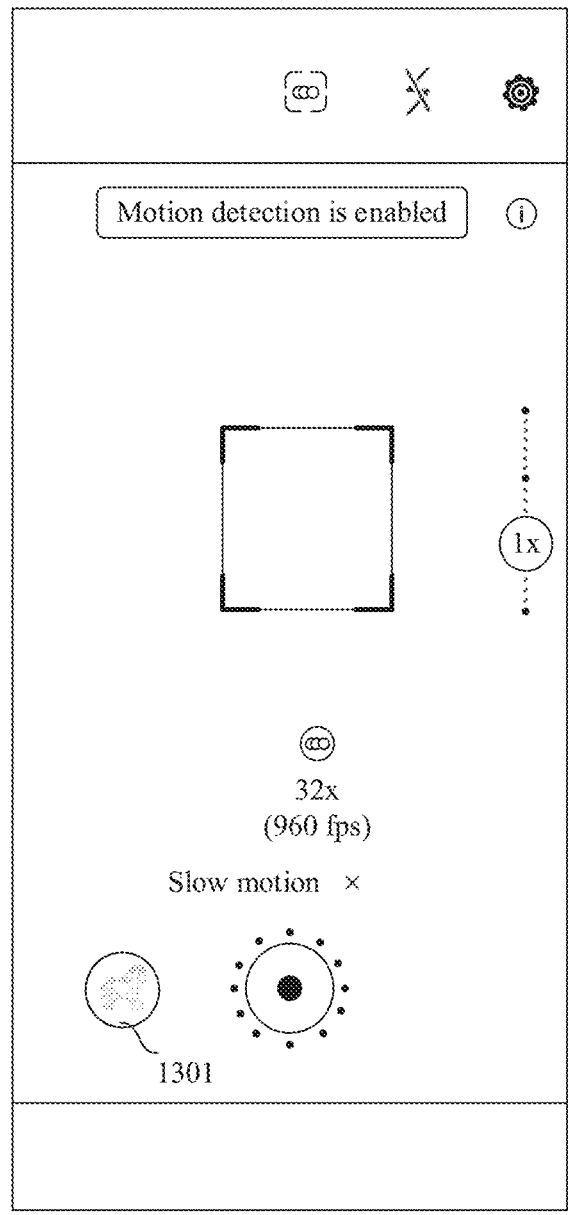
Figure 26:
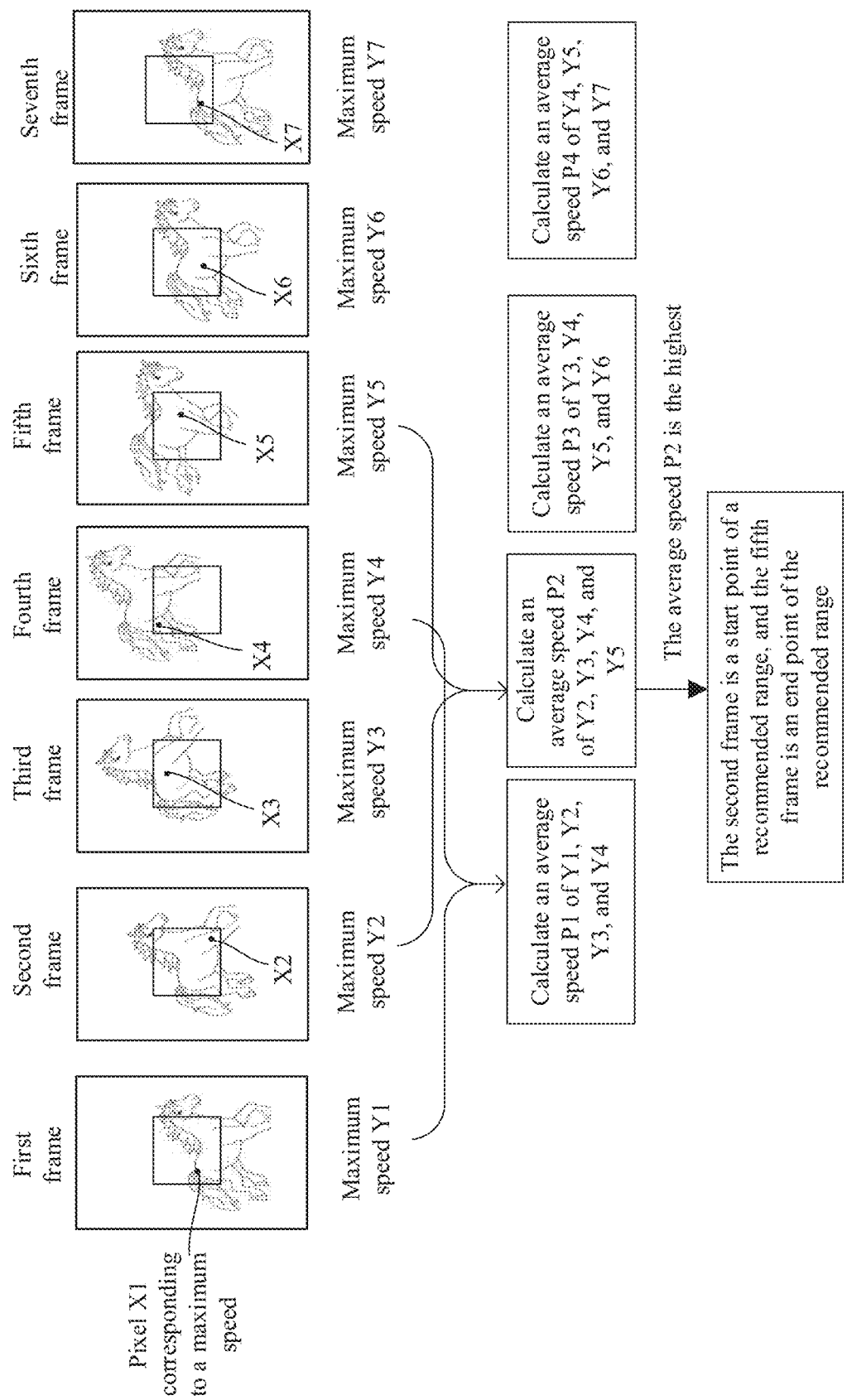
FIG. 26 is a schematic diagram of recognizing a start point and an end point of a recommended range by using an optical flow method according to an embodiment of this application.

In addition, when a motion type of a human body is not applicable to the preset motion detection model, or when a shot object is a non-human subject, the electronic device may perform slow-motion processing on a shot video by using the optical flow method. As shown in FIG. 13(a), FIG. 13(b), FIG. 13(c), FIG. 13(d), and FIG. 13(e), the user records, by using the intelligent automatic slow-motion function of the electronic device, the scenario in which a pony suddenly jumps while running. When shooting is completed, a GUI shown in FIG. 13(d) is displayed, and displays "saving". In this case, the electronic device may process a buffered video, and recommend a slow-motion range to the user. For example, the electronic device buffers is video frames after triggering slow-motion video recording. The electronic device first performs frame extraction on a buffered video frame sequence, for example, may perform frame extraction at 30 fps; and then performs optical flow calculation on pixels of a moving object that are on an imaging plane and that are in a sequence obtained after frame extraction, to obtain a motion speed change of each pixel by calculating a ratio of a distance between locations of a corresponding pixel in two adjacent frames of images to a time interval between the two adjacent frames. For example, as shown in FIG. 26, the electronic device may perform frame extraction on a buffered video to obtain seven video frames. Further, the electronic device may calculate speeds of all pixels of the first frame of shot picture in the detection box, where a speed of a point X1 is the highest, and output a maximum speed Y1; calculate speeds of all pixels of the second frame of shot picture in the detection box, where a speed of a point X2 is the highest, and output a maximum speed Y2; calculate speeds of all pixels of the third frame of shot picture in the detection box, where a speed of a point X3 is the highest, and output a maximum speed Y3; . . . ; and calculate speeds of all pixels of the seventh frame of shot picture in the detection box, where a speed of a point X7 is the highest, and output a maximum speed Y7. Units of an optical flow and a speed are not limited in this embodiment of this application. Then, the electronic device may calculate average speeds of pixels in fixed windows frame by frame based on the windows, and use a start point and an end point of a window corresponding to a maximum average speed as a start point and an end point of a slow-motion range. For example, the electronic device may perform average speed calculation on extracted frames by using 4 as a size of fixed windows. For example, an average speed of Y1, Y2, Y3, and Y4 is P1, and an average speed of Y2, Y3, Y4, and Y5 is P2, an average speed of Y3, Y4, Y5 and Y6 is P3, and an optical flow speed of Y4, Y5, Y6 and Y7 is P4. It is learned through calculation that a value of P2 is the lamest. Therefore, a start frame corresponding to calculation performed for the second time, namely, the second frame, is used as a start frame of a slow-motion range, and an end frame corresponding to calculation performed for the second time, namely, the fifth frame, is used as an end frame of the slow-motion range. The electronic device may perform encoding processing on video frames corresponding to the slow-motion range at the frame rate of 30 fps; generate, outside the slow-motion range, normal-speed videos at 30 fps by performing frame extraction on buffered video frames; and finally generate a slow-motion video in a format of "normal-speed video+low-speed video+normal-speed video" and store the slow-motion video in the gallery. As shown in FIG. 13(e), the user may view the shot slow-motion video by tapping a control 1301.

It should be noted that, in this embodiment of this application, optical flow calculation may be performed on pixels of a shot object that are in the detection box and that are in a sequence obtained after frame extraction, or optical flow calculation may be performed on pixels of a shot object in an entire image, to output a maximum speed in speeds of all the pixels. In this embodiment of this application, a size of a fixed window may be determined by duration of a slow-motion range. Because a time between every two video frames may be calculated by using a recording frame rate, different duration of slow-motion ranges may correspond to different fixed-window sizes. For example, when slow-motion video recording is performed at 960 fps, there may be 960 frames in a is buffered video. When a slow-motion range recommended by the electronic device to the user is 0.5 s, a size of a corresponding sliding window should be 480 frames. Then, the electronic device may encode the selected 480 frames at 30 fps to generate a 16 s slow-motion video.

Figure 27A:
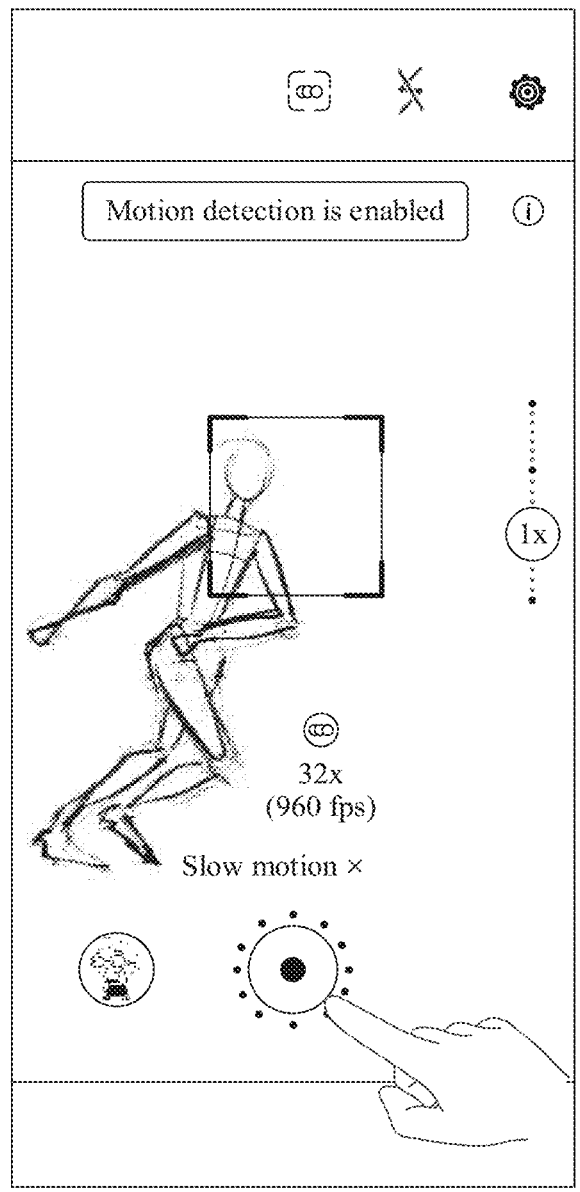
FIG. 27(a), FIG. 27(b), FIG. 27(c), and FIG. 27(d) are a schematic diagram of a slow-motion video recording process according to an embodiment of this application.
Figure 27B:
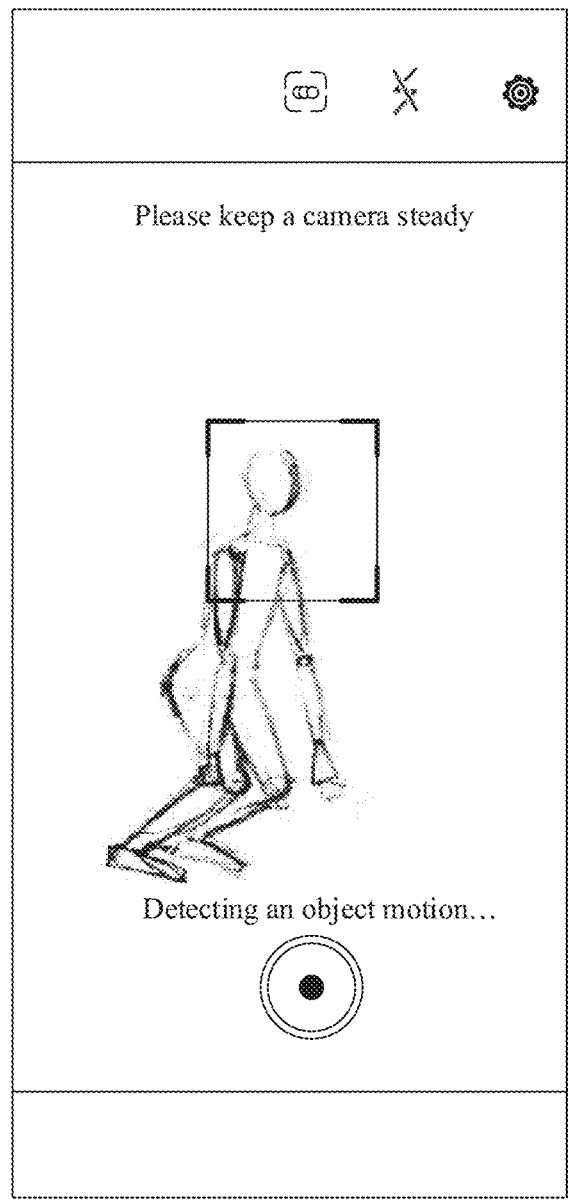
Figure 27C:
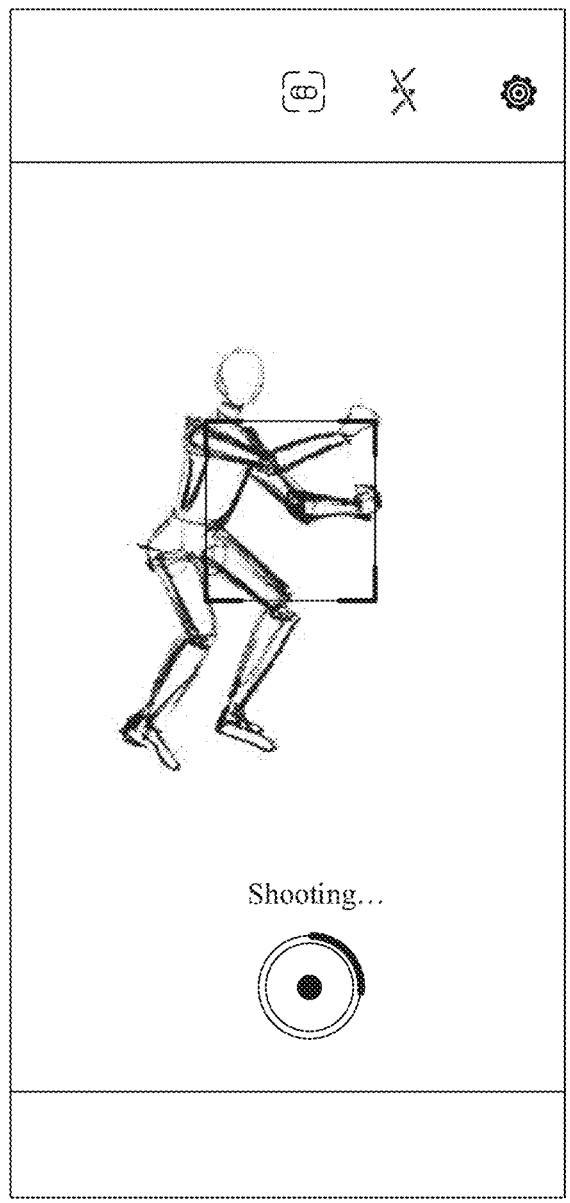
Figure 27D:
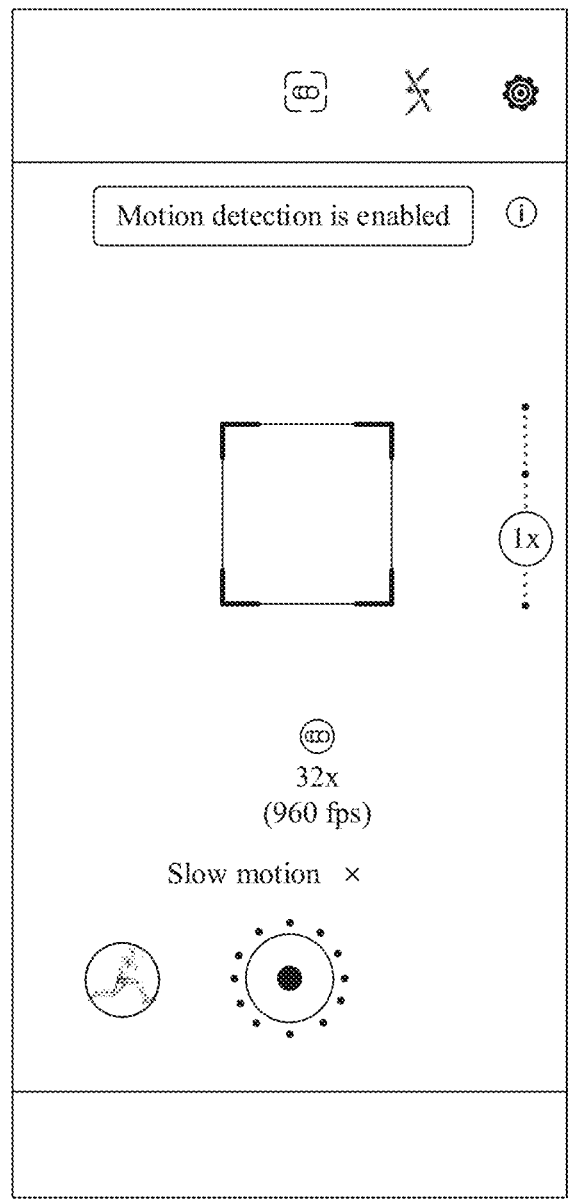

In another embodiment, the electronic device may perform real-time slow-motion processing on shot video frames. Therefore, a slow-motion video may be generated after shooting is completed. As shown in FIG. 27(a), FIG. 27(b), FIG. 27(c), and FIG. 27(d), the electronic device may perform motion detection on a shot human body in real time, and trigger intelligent slow-motion video recording when detecting a jumping motion of the human body. In addition, the electronic device may process shot video frames that are buffered, to find a motion start frame and a motion end frame. Therefore, after shooting is completed, a slow-motion video may be generated and stored in the gallery, and a GUI shown in FIG. 27(d) is displayed.

Figure 28A:
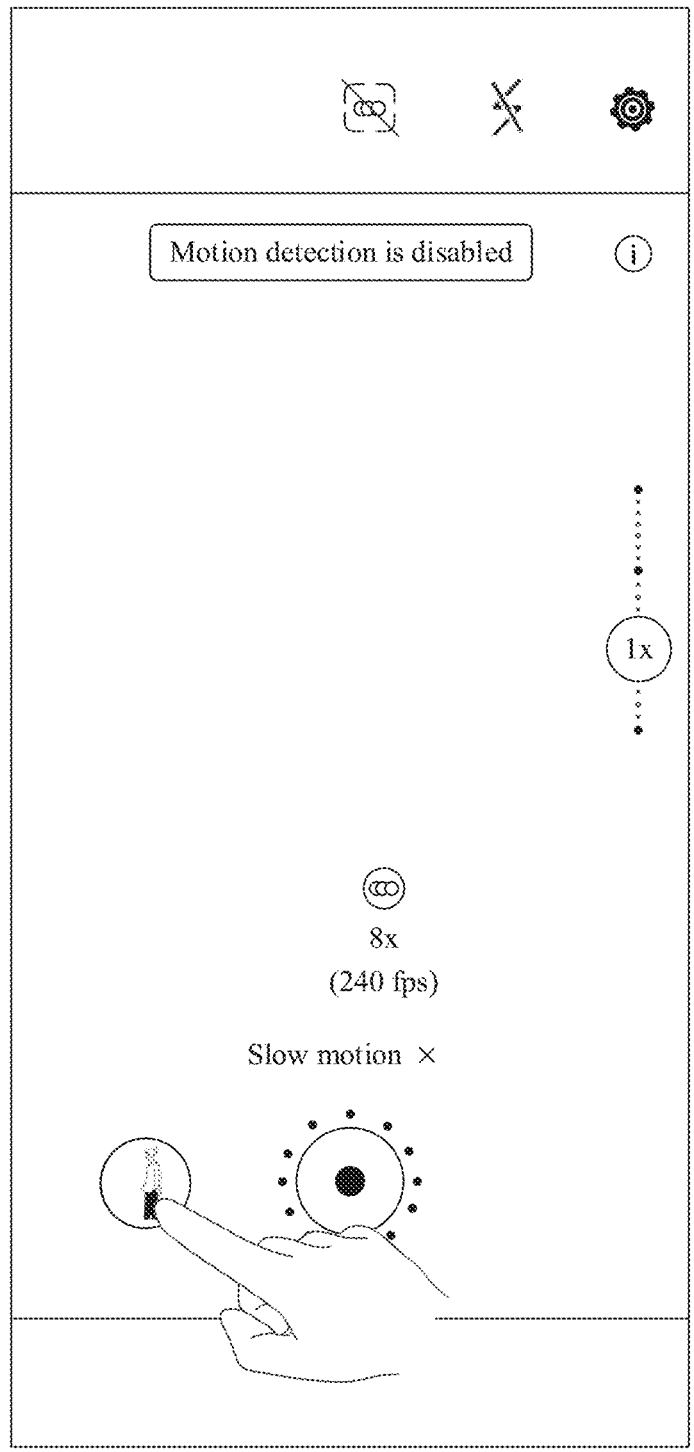
FIG. 28(a), FIG. 28(b), FIG. 28(c), and FIG. 28(d) are a schematic diagram of adjusting a slow-motion range according to an embodiment of this application.
Figure 28B:
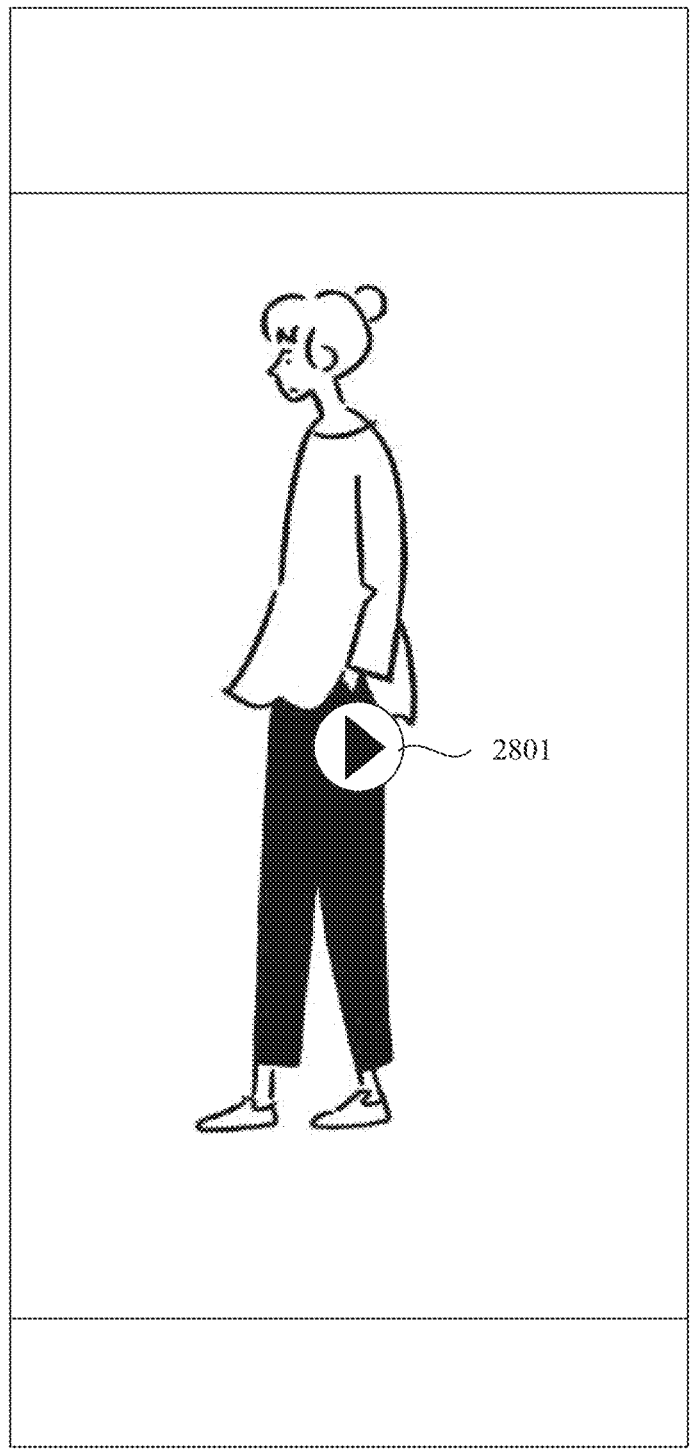
Figure 28C:
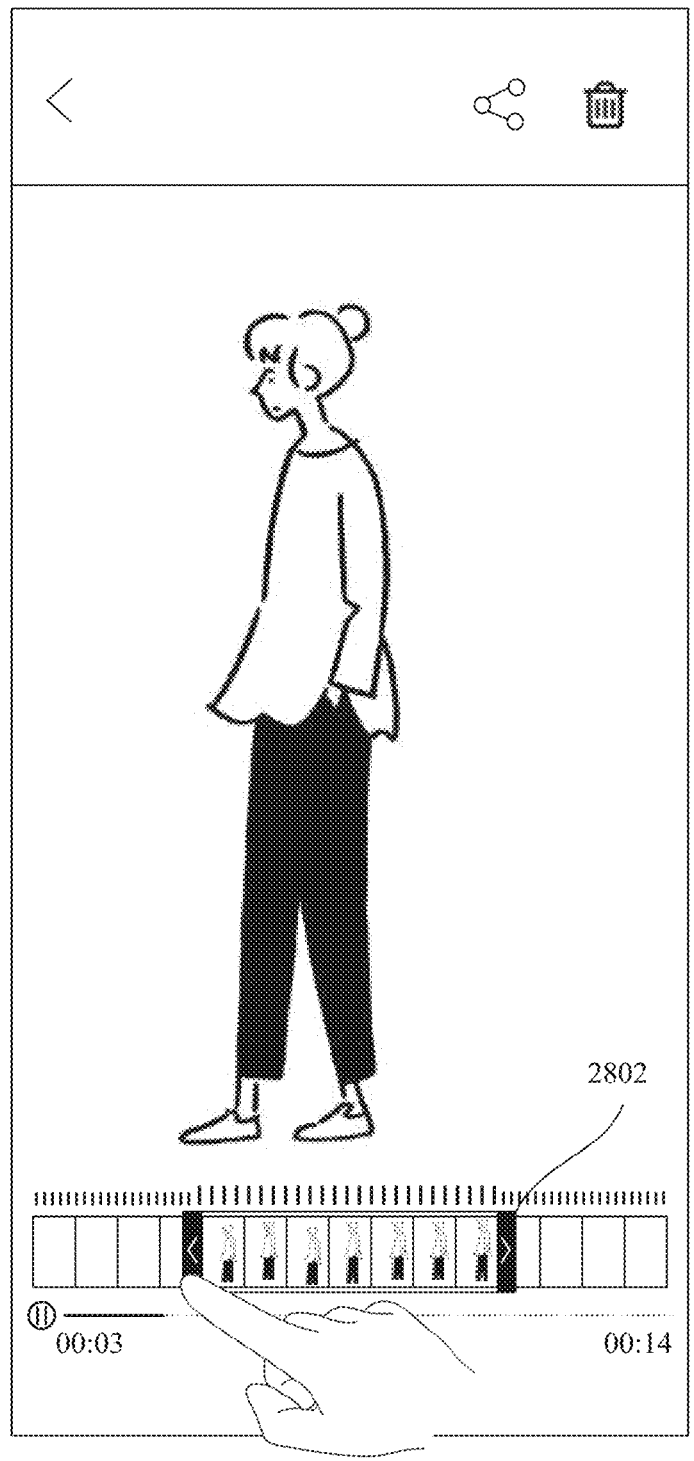

In another embodiment, after slow-motion recording ends, a slow-motion range may be recommended to the user, and a start point and an end point of the slow-motion range are presented to the user on a UI interface. Based on this, the user may adjust the start point and the end point to select any desired recording range to present a slow-motion effect. As shown in FIG. 28(a), after the user shoots a slow-motion video, the generated slow-motion video is displayed, in a form of a small image, in the control for associating with the gallery. After detecting an operation of tapping, by the user, the control for associating with the gallery, the electronic device displays a GUI shown in FIG. 28(b). The GUI may be referred to as a playback interface. After detecting an operation of tapping a playback control 2801 by the user, the electronic device plays back the slow-motion video on the playback interface. In an embodiment, the playback interface may further include a control 2802 for adjusting a slow-motion range. For example, the user may adjust a slow-motion range by dragging the control 2802. In another possible design, after shooting the slow-motion video, the electronic device may directly display a GUI shown in FIG. 28(c), and the user may adjust a slow-motion range in a timely manner.

In a possible implementation, during slow-motion video recording, the electronic device may buffer a video of an original frame rate with duration of one to two seconds, and select a 0.5-second video for slow-motion processing. Based on this, the user may adjust a slow-motion range.

In a possible implementation, after the electronic device generates a slow-motion video, the user may readjust a slow-motion range, and the electronic device may generate a new slow-motion video in a manner such as frame interpolation or frame extraction.

Figure 28D:
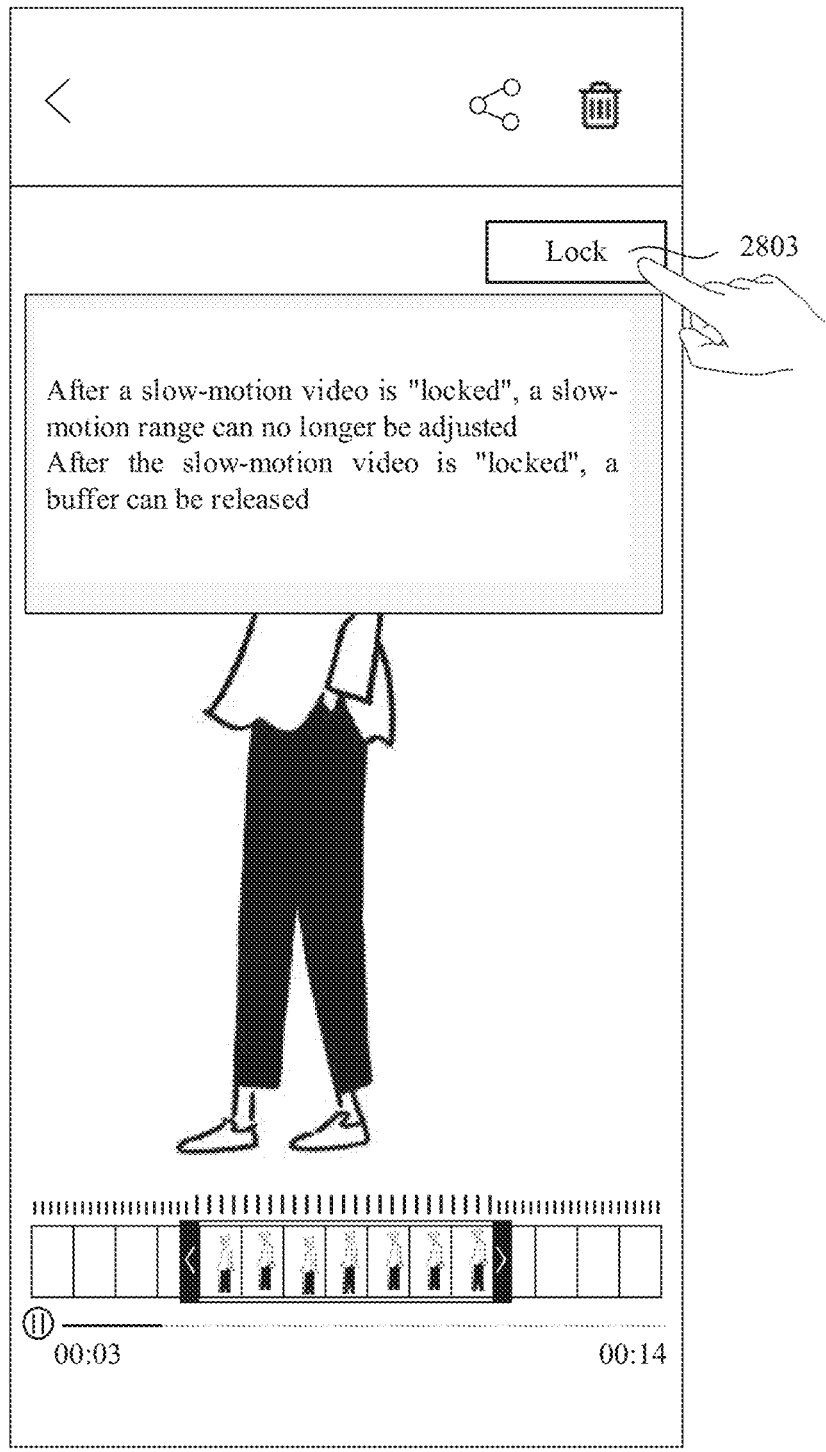

In an embodiment, the GUI shown in FIG. 28(d) may further include a "lock" control 2803. After the slow-motion video is "locked", the electronic device may release buffered video frames. This helps clear a buffer of the electronic device. However, after "locking" the slow-motion video, the user can no longer adjust the slow-motion range.

Figure 29A:
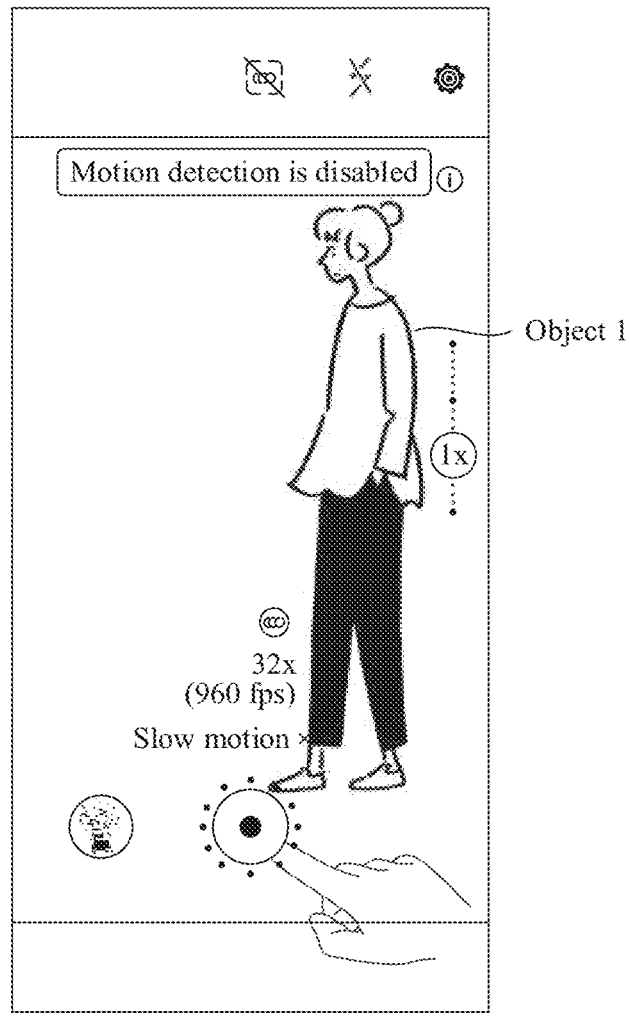
FIG. 29(a), FIG. 29(b), FIG. 29(c), and FIG. 29(d) are a schematic diagram of a process of recording a slow-motion video in a manual mode according to an embodiment of this application.

For example, as shown in FIG. 29(a), FIG. 29(b), FIG. 29(c), and FIG. 29(d), when the motion detection function is disabled, the user may manually trigger a recording control to start slow-motion video recording. As shown in FIG. 29(a), in this case, an object 1 is displayed in the preview window; and after detecting an operation of tapping the recording control by the user, the electronic device starts slow-motion video recording.

Figure 29B:
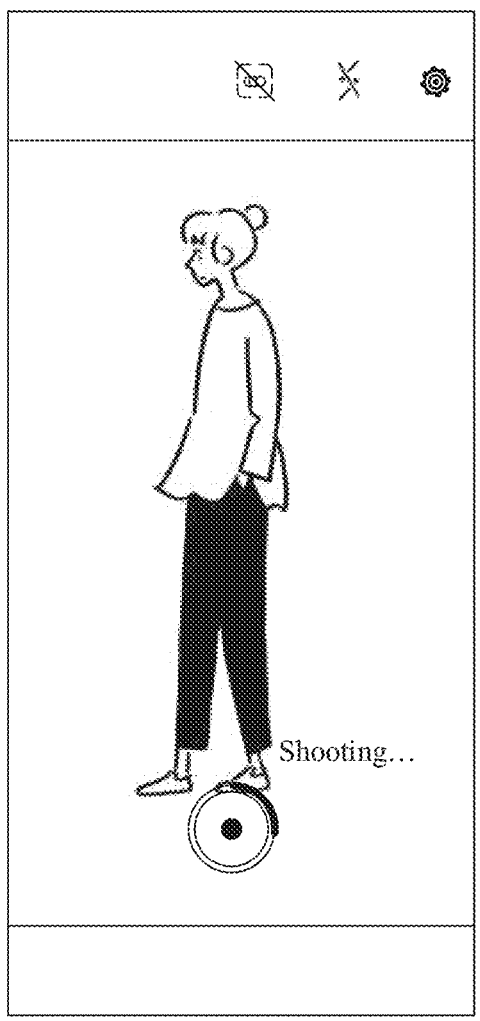
Figure 29C:
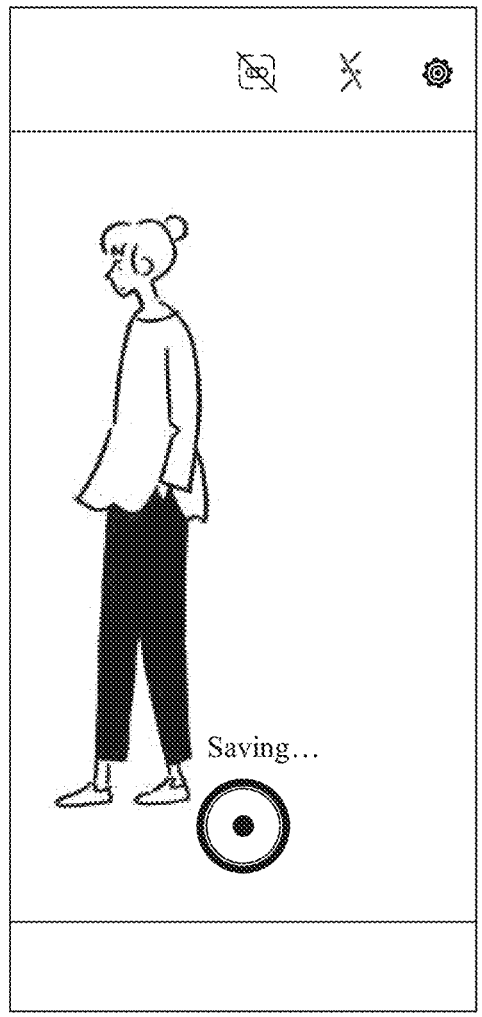
Figure 29D:
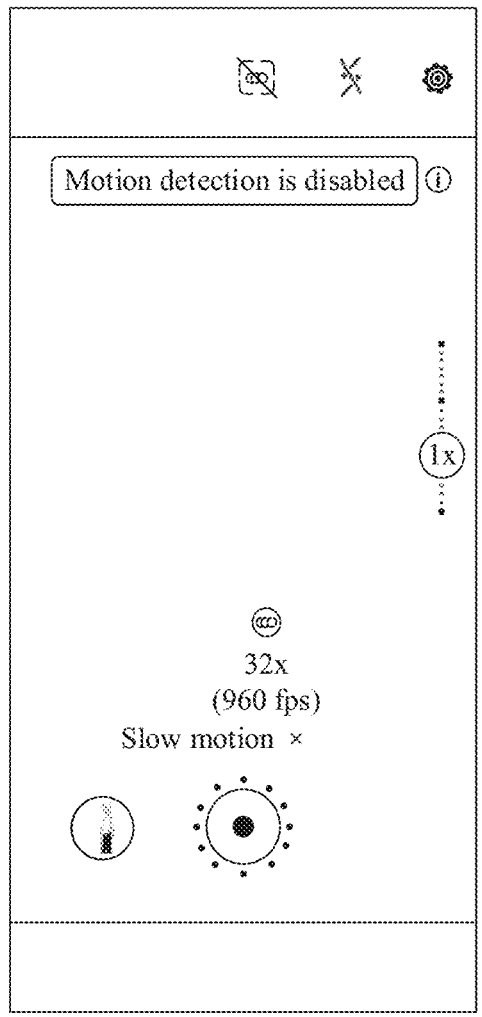

In a possible design, duration of a video recorded by the electronic device may be preset duration, and the preset length may be preset at delivery of the electronic device, or may be preset by the user. When the duration of the video is the preset length, the user only needs to trigger a video recording instruction to automatically complete video recording, without triggering a stop instruction. Therefore, manual operations of the user can be reduced, and relatively good intelligent recording experience can be provided for the user. For example, referring to Table 1, when the user selects the recording frame rate of 960 fps, the preset recording duration is 0.5 s. As shown in FIG. 29(a), after detecting an operation of tapping the recording control by the user, the electronic device starts slow-motion video recording. In this case, a GUI shown in FIG. 29(b) is displayed, a prompt "shooting" is displayed on the preview interface. For example, the electronic device may buffer is video frames. After shooting is completed, a GUI shown in FIG. 29(c) is displayed, and the preview interface may display a prompt "saving". In this case, the electronic device may process the buffered video frames, select a 0.5 s video from the buffered video to generate a slow-motion video, and store the slow-motion video in the gallery. A GUI shown in FIG. 29(d) is displayed, and the generated slow-motion video is displayed, in a form of a small image, in the control for associating with the gallery. Then, the user may tap the control for associating with the gallery to view the shot slow-motion video.

Figure 30A:
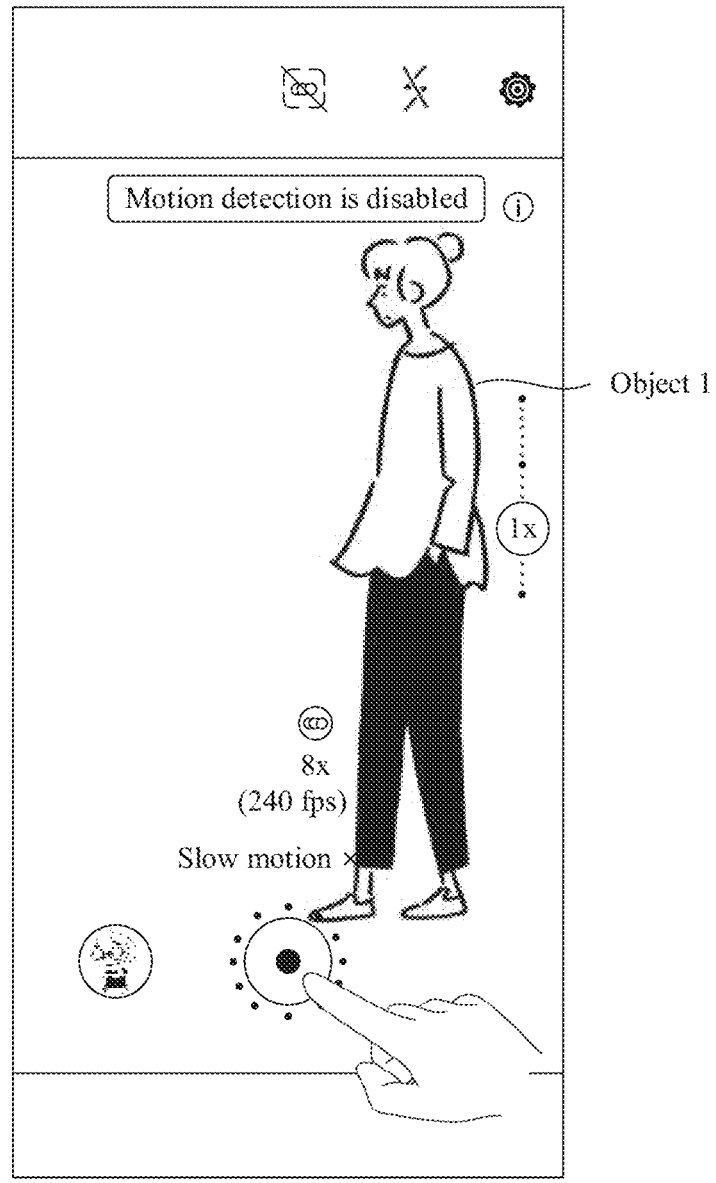
FIG. 30(a), FIG. 30(b), FIG. 30(c), and FIG. 30(d) are a schematic diagram of another process of recording a slow-motion video in a manual mode according to an embodiment of this application.
Figure 30B:
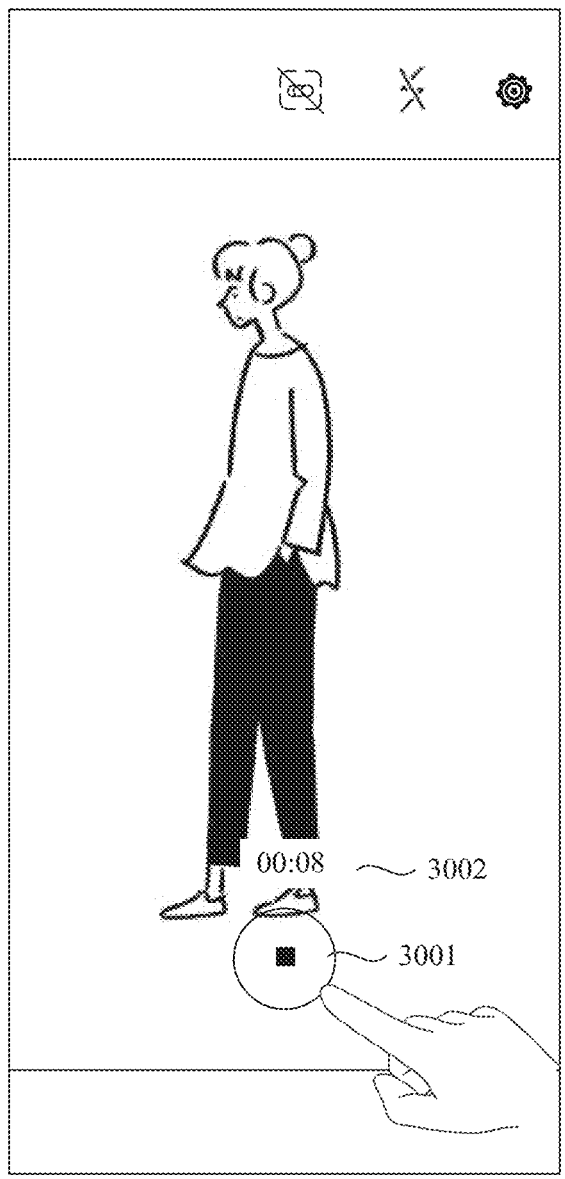
Figure 30C:
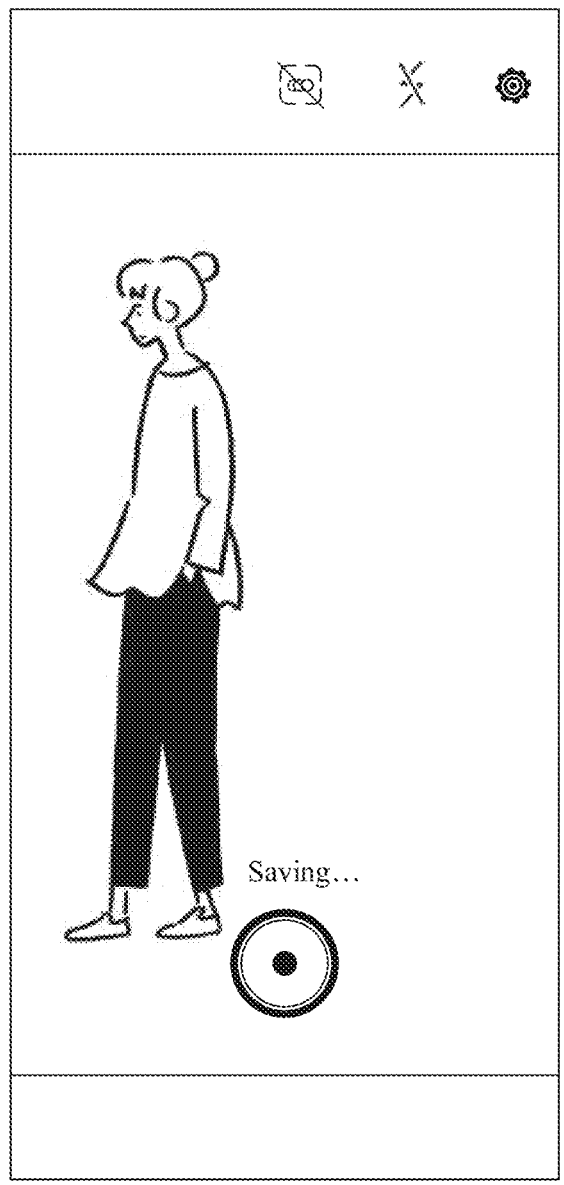
Figure 30D:
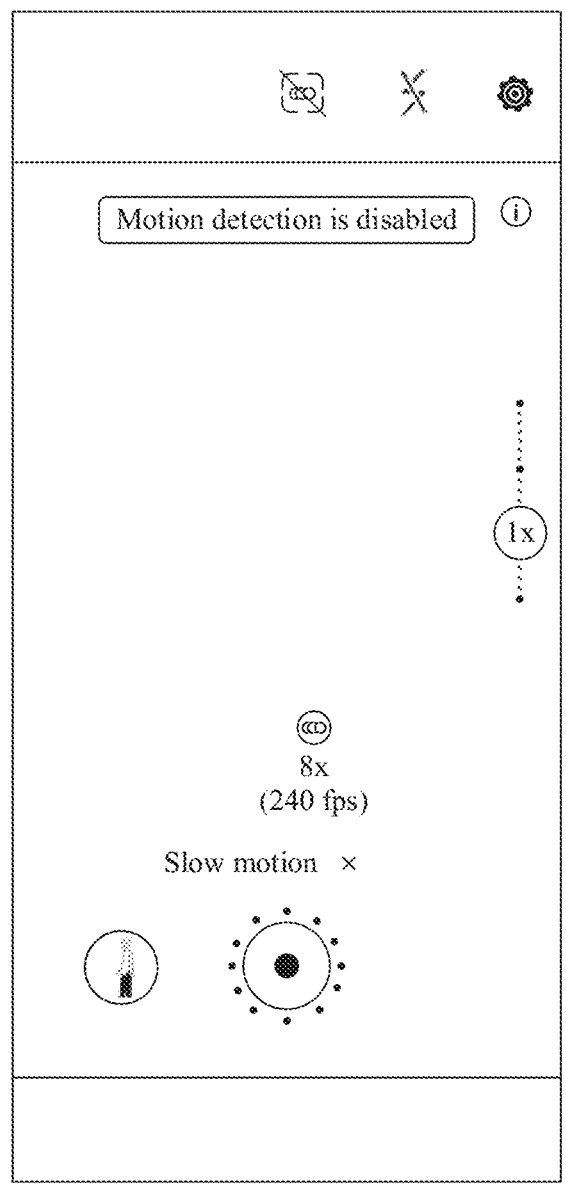

In a possible design, duration of a video recorded by the electronic device may be infinitely long. For example, when a recording frame rate is 120 fps or 240 fps, the recording duration may be unlimited. As shown in FIG. 30(a), after detecting an operation of tapping the recording control by the user, the electronic device starts slow-motion video recording. Video recording does not end until the user taps a recording ending control. Referring to FIG. 30(b), in this case, a preview interface includes a control 3001 for ending video recording, and further includes a control 3002 for displaying recording duration. After detecting an operation of tapping, by the user, the control 3001 for ending recording, the electronic device stops slow-motion video recording, and displays a GUI shown in FIG. 30(c). The preview interface may display a prompt "saving". In this case, the electronic device may process a shot video, generate a slow-motion video, and store the slow-motion video in the gallery. A GUI shown in FIG. 30(d) is displayed, and the generated slow-motion video is displayed, in a form of a small image, in the control for associating with the gallery. Then, the user may tap the control for associating with the gallery to view the shot slow-motion video.

In an embodiment, after generating a slow-motion video, the electronic device may process the slow-motion range to achieve more effects such as fast motion, rewinding, and loop playback, or may alternatively generate a video in another format such as GIF. In an embodiment, the electronic device may further perform AI automatic dubbing on the slow-motion video, and select, for the slow-motion video based on a shooting object, a motion type, and a shooting scenario, background music matching the slow-motion video, to generate a slow-motion video with the background music. In an embodiment, after generating a slow-motion video, the electronic device may further add a watermark to the slow-motion video.

It can be understood that, to implement the foregoing functions, the electronic device includes a corresponding hardware structure and/or software module for performing each function. A person skilled in the art should easily be aware that, in combination with algorithm steps in the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the electronic device or the server may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. In an actual implementation, another division manner may be used.

An embodiment of this application discloses an electronic device, including a processor, and a memory; an input device, and an output device that are connected to the processor. The input device and the output device may be integrated as one device. For example, a touch sensor may be used as the input device, a display may be used as the output device, and the touch sensor and the display may be integrated as a touchscreen.

Figure 31:
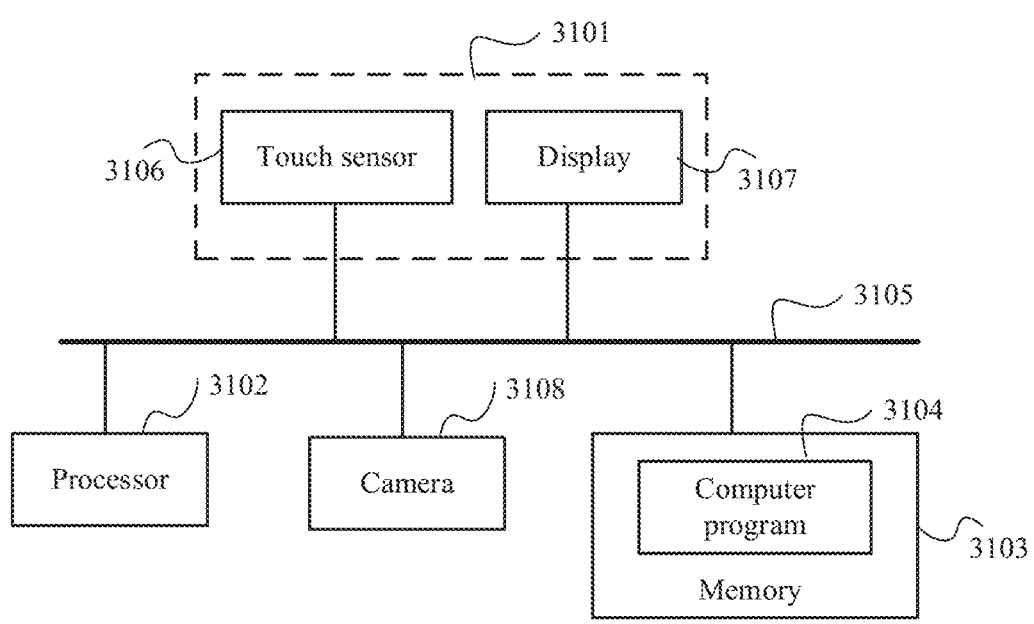
FIG. 31 is a schematic diagram of a structure of an electronic device according to an embodiment of this application.

In this case, as shown in FIG. 31, the electronic device may include a touchscreen 3101 including a touch sensor 3106 and a display 3107, one or more processors 3102, one or more cameras 3108, a memory 3103, one or more application programs (not shown), and one or more computer programs 3104. The foregoing components may be connected to each other through one or more communications buses 3105. The one or more computer programs 3104 are stored in the memory 3103 and are configured to be executed by the one or more processors 3102. The one or more computer programs 3104 include instructions, and the instructions may be used to perform the steps in the foregoing embodiments. All related content of the steps in the foregoing method embodiments may be cited in function descriptions of corresponding physical devices. Details are not described herein again.

For example, the processor 3102 may specifically be the processor 110 shown in FIG. 2; the memory 3103 may specifically be the internal memory 116 and/or the external memory 120 shown in FIG. 2; the camera 3108 may specifically be the camera 193 shown in FIG. 2; the display 3107 may specifically be the display 194 shown in FIG. 2; and the touch sensor 3106 may specifically be the touch sensor in the sensor module 180 shown in FIG. 2. This is not limited in this embodiment of this application.

An embodiment of this application further provides a computer storage medium. The computer storage medium stores computer instructions. When the computer instructions are run on an electronic device, the electronic device performs the foregoing related method steps to implement the video recording method in the foregoing embodiments.

An embodiment of this application further provides a computer program product. When the computer program product is run on a computer, the computer is enabled to perform the foregoing related method steps, to implement the video recording method in the foregoing embodiments.

In addition, an embodiment of this application further provides an apparatus. The apparatus may be specifically a chip, a component, or a module. The apparatus may include a processor and a memory that are connected. The memory is configured to store computer executable instructions. When the apparatus runs, the processor may execute the computer executable instructions stored in the memory, to enable the chip to perform the video recording method in the foregoing method embodiments.

The electronic device, the computer storage medium, the computer program product, or the chip provided in the embodiments of this application is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for convenient and brief description, division into the foregoing function modules is taken as an example for illustration. In actual application, the foregoing functions can be allocated to different modules for implementation based on a requirement, that is, an inner structure of an apparatus is divided into different function modules to implement all or some of the functions described above.

In the several embodiments provided in this application, it should be understood that the disclosed apparatus and method, may be implemented in other manners. For example, the foregoing described apparatus embodiments are merely examples. For example, division into the modules or units is merely logical function division. There may be another division manner in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on a plurality of different places. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
   a camera;
   a display screen; and
   a processor coupled to the camera and the display screen and configured to:
   enable a camera application to start the camera;
   enable a motion detection function of the camera application;
   display, in response to enabling the motion detection function, a slow-motion video recording mode of the camera application on the display screen;
   detect, from a user, a video recording instruction input on the slow-motion video recording mode;
   start, using the camera and in response to the video recording instruction input, capturing a plurality of first video frames;
   record a second video frame set of the first video frames at a first frame rate when a motion of a human body in a first video frame set of the first video frames is a first preset motion;
   generate, based on the second video frame set, a first target video comprising a first slow-motion video clip, wherein the first slow-motion video clip comprises a plurality of second video frames in the second video frame set, wherein a first playback duration of the first slow-motion video clip at a first playback speed is a first duration when the motion is the first preset motion, wherein a second playback duration of the first slow-motion video clip at the first playback speed is a second duration when the motion is a second preset motion, wherein the first preset motion is different from the second preset motion, and wherein the first duration is different from the second duration; and
   use a target video frame as a cover of the first target video when a third preset motion of the human body appears in the target video frame in the second video frame set.

2. The electronic device of claim 1, wherein the processor is further configured to display a slow-motion preview interface comprising a motion detection control.

3. The electronic device of claim 2, wherein the processor is further configured to display the first video frames on the slow-motion preview interface.

4. The electronic device of claim 1, wherein the processor is further configured to obtain human skeleton point information of the human body based on the first video frame set, and wherein the motion is based on the human skeleton point information in the first video frame set.

5. The electronic device of claim 4, wherein the processor is further configured to determine, based on the first video frame set, to obtain the human skeleton point information when a shot object is the human body.

6. The electronic device of claim 1, wherein the processor is further configured to:
   generate the first slow-motion video clip based on a part of the second video frame set; or
   generate the first slow-motion video clip based on a part of the first video frame set and a part of the second video frame set.

7. The electronic device of claim 1, wherein the first target video further comprises a normal-speed video clip or a high-speed video clip.

8. The electronic device of claim 1, wherein the processor is further configured to:
   use a first video frame that is in the second video frame set and that comprises a start motion of the first preset motion as a start frame of the first slow-motion video clip; and
   use a second video frame that is in the second video frame set and that comprises an end motion of the first preset motion as an end frame of the first slow-motion video clip.

9. The electronic device of claim 1, wherein the first preset motion comprises rotating, cheering, jumping, basketball shooting, basketball dribbling, split jumping, laying up a basketball shot, skateboarding, and golf hitting.

10. The electronic device of claim 1, wherein the processor is further configured to:
    generate a first target image based on the second video frames, wherein a second motion of the human body in the first target image is the first preset motion; and
    store the first target image.

11. The electronic device of claim 1, wherein the processor is further configured to:
    generate a second target image based on the second video frames, wherein the second target image comprises a motion track of the first preset motion; and
    store the second target image.

12. The electronic device of claim 1, wherein the processor is further configured to:
    record a fourth video frame set when a second motion of the human body in a third video frame set is a third preset motion; and
    generate a second target video comprising a second slow-motion video clip, wherein the second slow-motion video clip comprises third video frames in the fourth video frame set, and wherein a third playback speed of the second slow-motion video clip is determined as a first speed when the motion of the human body is the third preset motion.

13. An electronic device, comprising:
    a camera;
    a display screen; and
    a processor coupled to the camera and the display screen and configured to:
    enable a camera application to start the camera;
    enable a motion detection function of the camera application;
    display, in response to enabling the motion detection function, a slow-motion video recording mode of the camera application on the display screen;
    detect, from a user, a video recording instruction input on the slow-motion video recording mode;
    start, using the camera and in response to the video recording instruction input, capturing a plurality of first video frames;
    record a second video frame set of the first video frames when a motion of a human body in a first video frame set of the first video frames is a first preset motion;
    generate, based on the second video frame set, a target video comprising a slow-motion video clip, wherein the slow-motion video clip comprises a plurality of second video frames in the second video frame set;

determine a first playback speed of the slow-motion video clip as a first speed when the motion is a first preset motion;
determine a second playback speed of the slow-motion video clip as a second speed when the motion is a second preset motion, wherein the first preset motion is different from the second preset motion, and wherein the first playback speed is different from the second playback speed; and
use a target video frame as a cover of the first target video when a third preset motion of the human body appears in the target video frame in the second video frame set.

14. The electronic device of claim 13, wherein the processor is further configured to display a slow-motion preview interface comprising a motion detection control.

15. The electronic device of claim 14, wherein the processor is further configured to display the first video frames on the slow-motion preview interface.

16. The electronic device of claim 13, wherein the processor is further configured to obtain human skeleton point information of the human body based on the first video frame set, and wherein the motion is based on the human skeleton point information in the first video frame set.

17. The electronic device of claim 16, wherein the processor is further configured to determine, based on the first video frame set, to obtain the human skeleton point information when a shot object is the human body.

18. The electronic device of claim 13, wherein the processor is further configured to:
generate the slow-motion video clip based on a part of the second video frame set; or
generate the slow-motion video clip based on a part of the first video frame set and a part of the second video frame set.

19. A video shooting method, comprising:
enabling a camera application;
enabling a motion detection function of the camera application;
displaying, in response to enabling the motion detection function, a slow-motion video recording mode of the camera application;
detecting, from a user, a video recording instruction input on the slow-motion video recording mode;
starting, in response to the video recording instruction input, to capture a plurality of first video frames;
recording a second video frame set of the first video frames at a first frame rate when a first motion of a human body in a first video frame set of the first video frames is a first preset motion;
generating, based on the second video frame set, a first target video comprising a first slow-motion video clip, wherein the first slow-motion video clip comprises a plurality of second video frames in the second video frame set, and wherein a first playback duration of the first slow-motion video clip at a first playback speed is a first duration;
using a target video frame as a cover of the first target video when a second preset motion of the human body appears in the target video frame in the second video frame set;
starting, in response to the video recording instruction input, to capture a plurality of third video frames;
recording a fourth video frame set of the third video frames at the first frame rate when a second motion of the human body in a third video frame set of the third video frames is a third preset motion; and
generating, based on the fourth video frame set, a second target video comprising a second slow-motion video clip, wherein the second slow-motion video clip comprises a plurality of fourth video frames in the fourth video frame set,
wherein a second playback duration of the second slow-motion video clip at the first playback speed is a second duration,
wherein the first preset motion is different from the second preset motion and the third preset motion, and
wherein the first duration is different from the second duration.

20. The video shooting method of claim 19, wherein the first target video further comprises a normal-speed video clip or a high-speed video clip.

* * * * *